US010933388B1

(12) United States Patent
Falcone

(10) Patent No.: US 10,933,388 B1
(45) Date of Patent: Mar. 2, 2021

(54) H20-OXYGENATION METHOD AND OXYGENATED LIVE WELL

(71) Applicant: JMF WATERCRAFT DESIGN LLC, San Antonio, TX (US)

(72) Inventor: Jeff M. Falcone, San Antonio, TX (US)

(73) Assignee: JMF Watercraft Design LLC, San Antonio, TX (US)

(*) Notice: Subject to any disclaimer, the term of this patent is extended or adjusted under 35 U.S.C. 154(b) by 227 days.

(21) Appl. No.: 16/029,097

(22) Filed: Jul. 6, 2018

Related U.S. Application Data

(60) Provisional application No. 62/529,815, filed on Jul. 7, 2017.

(51) Int. Cl.
*B01F 3/04* (2006.01)
*B01F 5/04* (2006.01)
*B01F 5/06* (2006.01)
*B01F 15/00* (2006.01)
*B01F 15/02* (2006.01)
(Continued)

(52) U.S. Cl.
CPC ........ *B01F 3/04737* (2013.01); *A01K 63/042* (2013.01); *B01D 19/0005* (2013.01); *B01D 19/0047* (2013.01); *B01F 3/04078* (2013.01); *B01F 3/04085* (2013.01); *B01F 3/04106* (2013.01); *B01F 3/04496* (2013.01); *B01F 5/04* (2013.01); *B01F 5/0697* (2013.01); *B01F 15/00915* (2013.01); *B01F 15/00993* (2013.01); *B01F 15/0243* (2013.01); *B01F 2003/04879* (2013.01); *B01F 2215/0052* (2013.01)

(58) Field of Classification Search
CPC .......... B01F 5/04; B01F 3/04; B01F 3/04085; B01F 3/04078; B01F 3/04099; B01F 3/04106
USPC .......................... 261/76, 116, 121.1; 366/101
See application file for complete search history.

(56) References Cited

U.S. PATENT DOCUMENTS

| 835,886 | A | 11/1906 | Gunn |
| 2,020,850 | A | 11/1935 | Myhren et al. |
| 2,210,846 | A | 8/1940 | Aghnides |

(Continued)

FOREIGN PATENT DOCUMENTS

| CN | 104430138 A | 3/2015 |
| CN | 107530650 A | 1/2018 |

(Continued)

*Primary Examiner* — Robert A Hopkins
(74) *Attorney, Agent, or Firm* — Eric W. Cernyar

(57) ABSTRACT

A system for dissolving gases in water comprises a mixing chamber that holds gas and a container in fluid communication with the mixing chamber. In operation, the mixing chamber is flooded to purge the ambient air. A gas delivery system introduces gas into the mixing chamber to push the water out. A pump then pumps temperature and salinity-treated water into the mixing chamber, and a distributor sprays or disperses the water into the mixing chamber. An optional impingement plate and/or mixing medium trap gas bubbles and hold gas-saturated water within the mixing chamber. This produces a volume of substantially bubble-free, highly-saturated gas-infused water that is then released into the container to mix with the water contained therein. This system can be incorporated in aquariums, ice chests, buckets, and live wells found on boats, kayaks, trucks, and other transports.

32 Claims, 26 Drawing Sheets

(51) Int. Cl.
   *B01D 19/00*   (2006.01)
   *A01K 63/04*   (2006.01)

(56) References Cited

U.S. PATENT DOCUMENTS

| | | | |
|---|---|---|---|
| 2,633,343 A | 3/1953 | Aghnides |
| 2,771,998 A | 11/1956 | Holden |
| 2,825,541 A | 3/1958 | Moll et al. |
| 3,235,234 A | 2/1966 | Beaudoin |
| 3,473,481 A | 10/1969 | Brane |
| 3,746,323 A | 7/1973 | Buffington |
| 3,971,338 A | 7/1976 | Alexson |
| 4,210,534 A | 7/1980 | Molvar |
| 4,639,340 A | 1/1987 | Garrett |
| 4,735,750 A | 4/1988 | Damann |
| 4,749,493 A | 6/1988 | Hicks |
| 4,765,807 A | 8/1988 | Henriksen |
| 5,302,325 A | 4/1994 | Cheng |
| 5,314,076 A | 5/1994 | La Place et al. |
| 5,814,222 A | 9/1998 | Zelenák et al. |
| 5,868,944 A | 2/1999 | Wright et al. |
| 5,925,292 A | 7/1999 | Ziesenis |
| 5,961,895 A | 10/1999 | Sanford |
| 5,968,352 A | 10/1999 | Ditzler |
| 6,250,609 B1 | 6/2001 | Cheng et al. |
| 6,325,842 B1 | 12/2001 | Caldwell et al. |
| 6,811,296 B2 | 11/2004 | Weetman |
| 7,162,831 B1 | 1/2007 | Morton et al. |
| 7,396,441 B2 | 7/2008 | Senkiw |
| 7,631,615 B1 | 12/2009 | Mast |
| 7,718,405 B2 | 5/2010 | Brahmbhatt |
| 7,802,775 B2 * | 9/2010 | Emilsen ............... B01F 3/0446 261/76 |
| 8,349,191 B2 | 1/2013 | Wood |
| 9,345,238 B1 | 5/2016 | Higginbotham |
| 2008/0010894 A1 | 1/2008 | Stafford |
| 2010/0147690 A1 | 6/2010 | Audunson et al. |
| 2014/0311416 A1 | 10/2014 | Stiles, Jr. et al. |

FOREIGN PATENT DOCUMENTS

| | | |
|---|---|---|
| EP | 0244954 | 12/1990 |
| GB | 2177618 A | 1/1987 |
| JP | 2013111505 A | 6/2013 |
| KR | 101080708 B1 | 11/2011 |
| WO | WO1981/001700 | 6/1981 |
| WO | WO2012/103602 | 8/2012 |
| WO | WO2014076297 | 5/2014 |
| WO | WO2016169493 | 10/2016 |

* cited by examiner

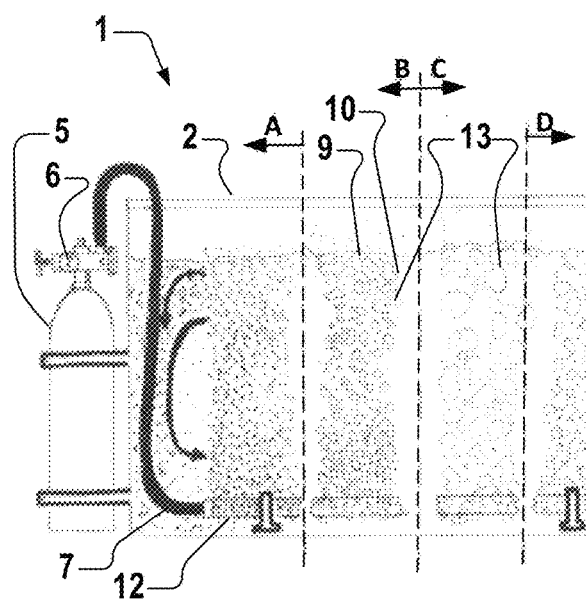
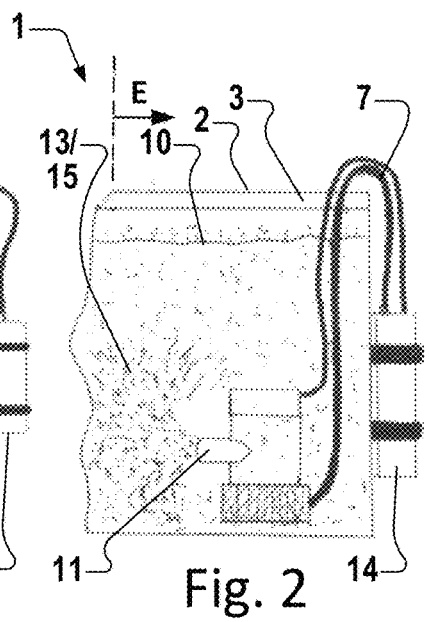
Fig. 1 PRIOR ART
Fig. 2 PRIOR ART
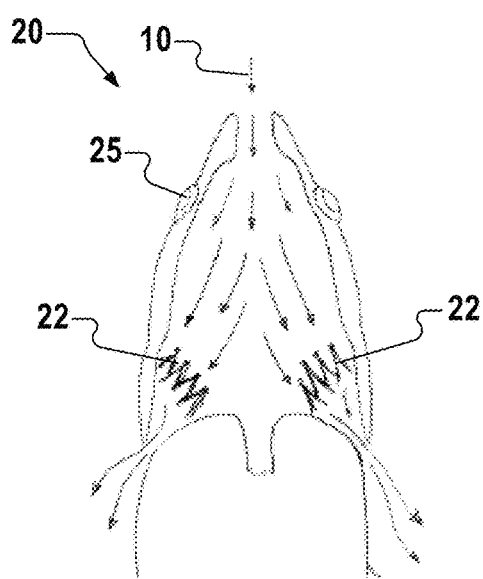
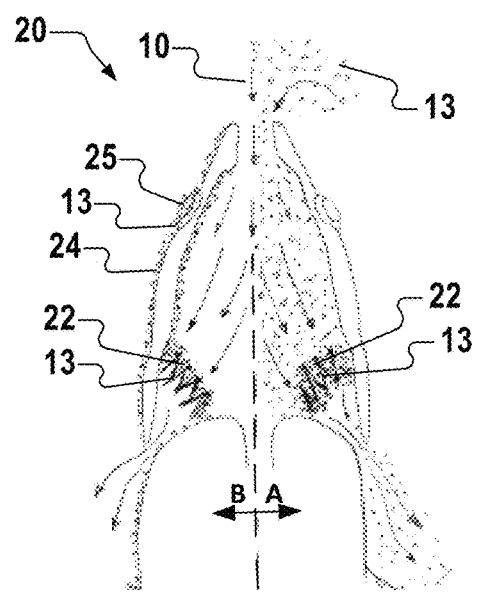
Fig. 3 PRIOR ART
Fig. 4 PRIOR ART
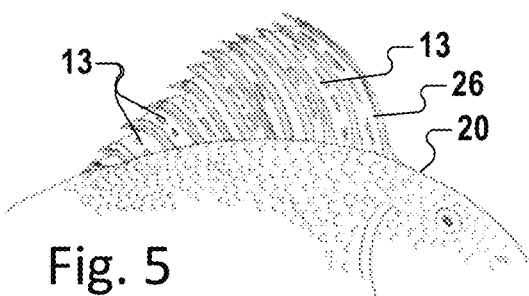
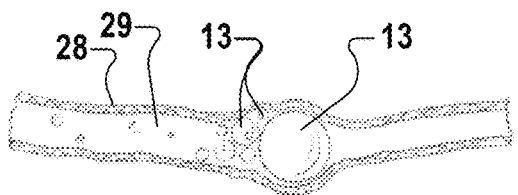
Fig. 5 PRIOR ART
Fig. 6 PRIOR ART

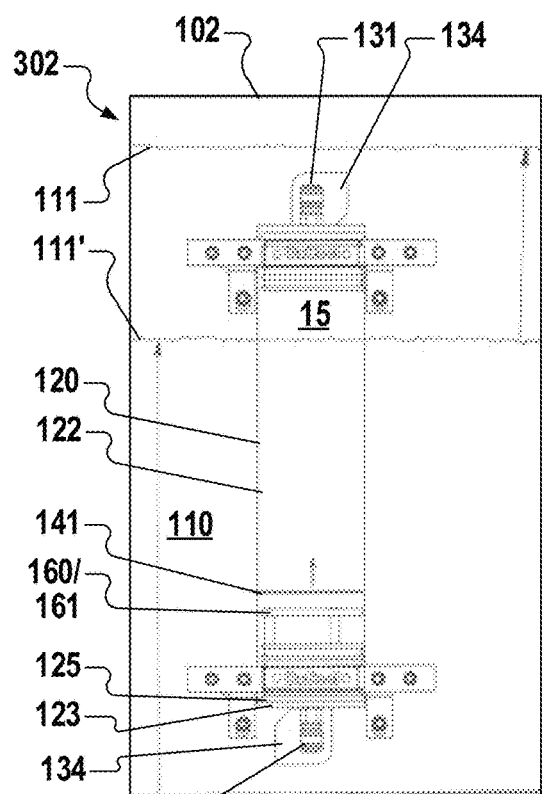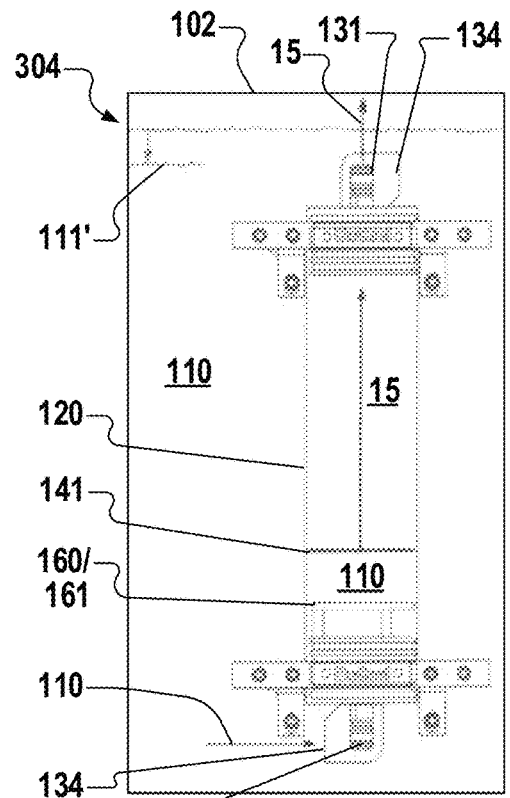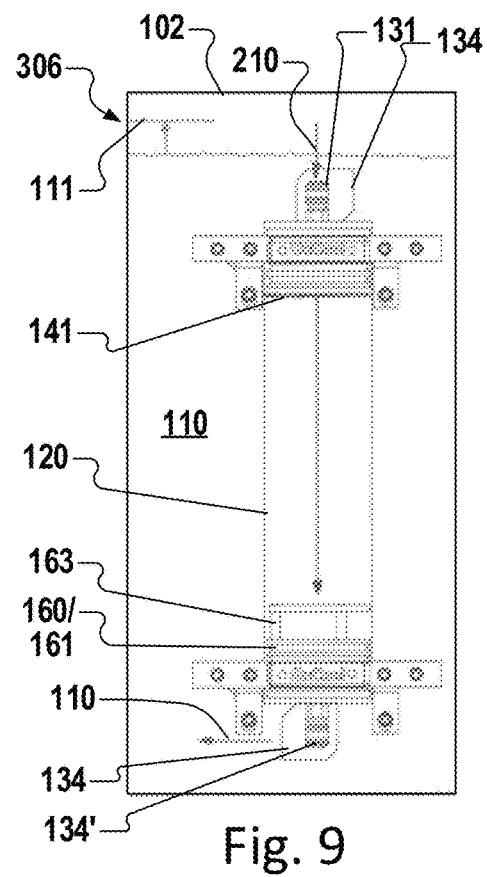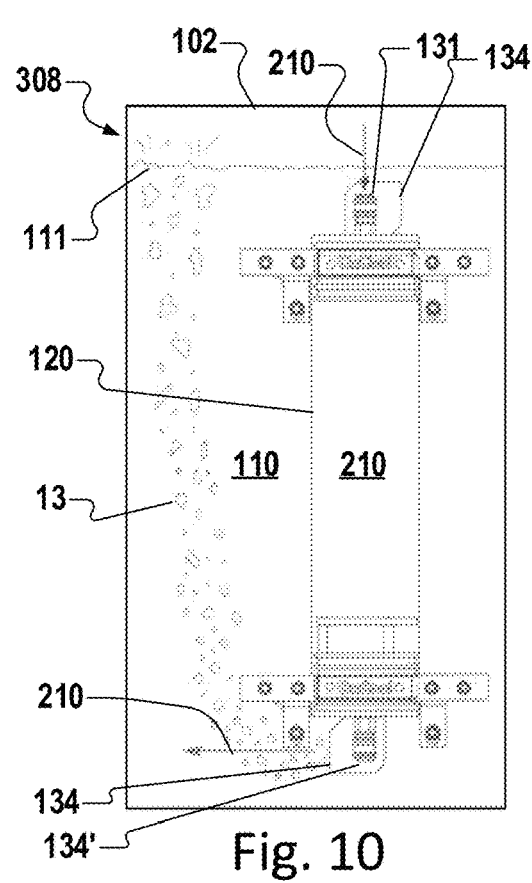

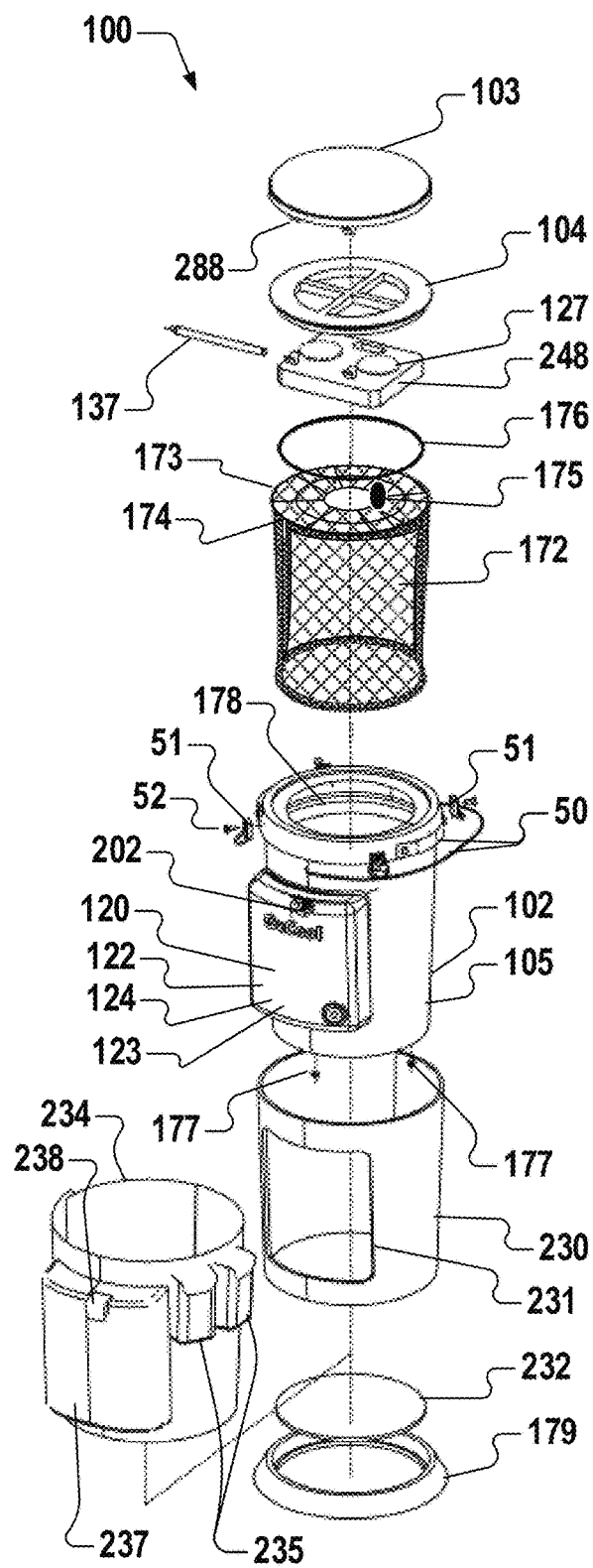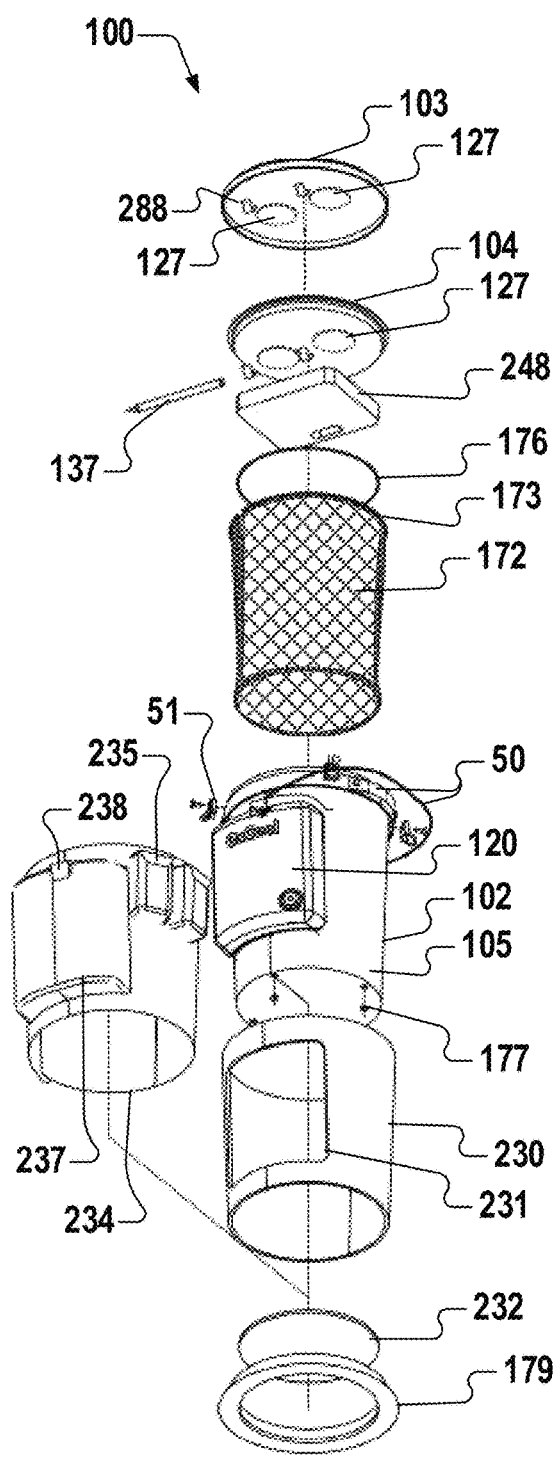
Fig. 61
Fig. 62

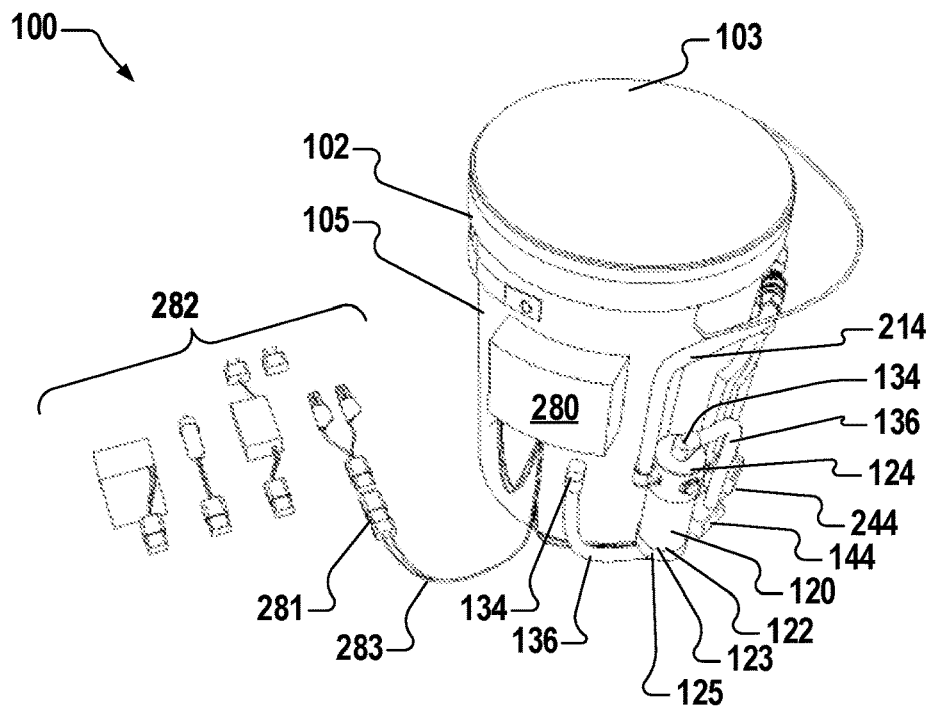
Fig. 65
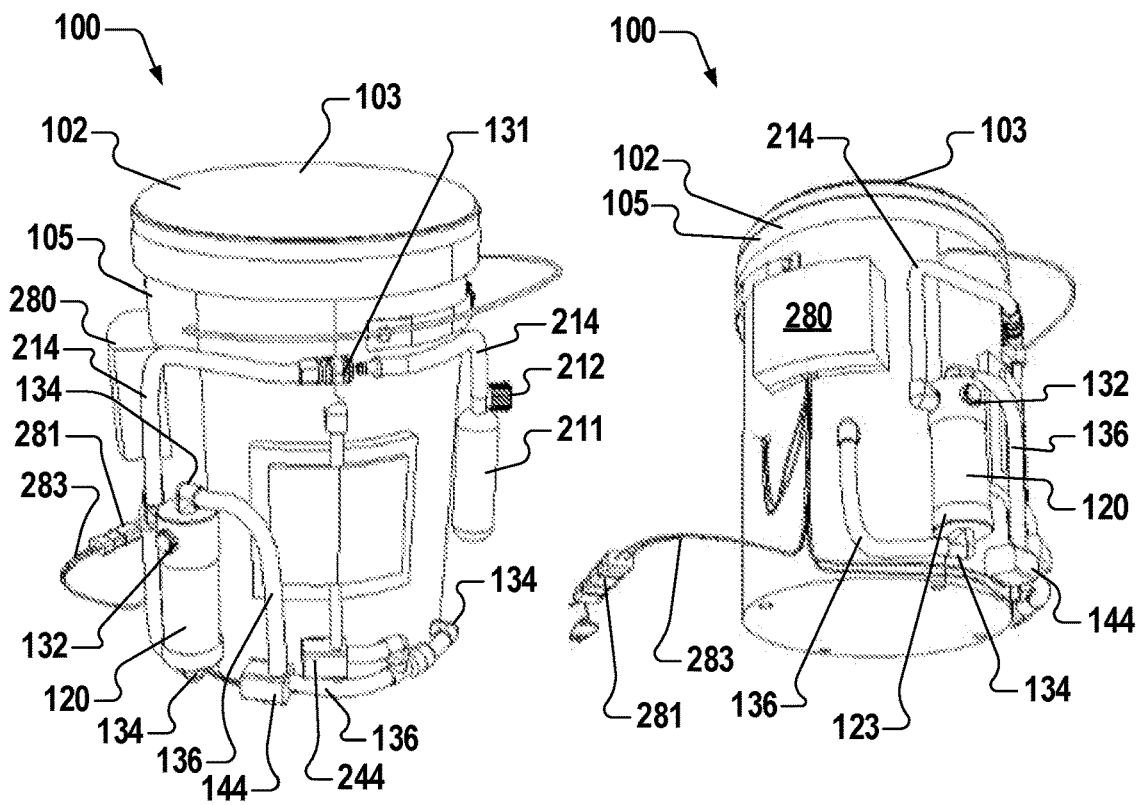
Fig. 66
Fig. 67

US 10,933,388 B1

H20-OXYGENATION METHOD AND OXYGENATED LIVE WELL

RELATED APPLICATIONS

This application claims the benefit of U.S. Provisional Patent Application No. 62/529,815, filed Jun. 7, 2017, entitled "Novel H20-Oxygenated Method and Portable Oxygenated Live Well," which is referred to herein as "the provisional application," and which is herein incorporated by reference.

TECHNICAL FIELD

The present disclosure generally relates to infusion of a gas into water, including systems, kits, and methods for producing gas-infused water, and more particularly relates to a live well that oxygenates water, and associated systems, kits, and methods of oxygenation, cooling, and maintenance of water in a live well.

BACKGROUND

In broad terms, manufacturers of aquaculture aeration systems infuse water with a regulated flow of gas bubbles or spray within a container of water. The result is inefficient infusion that is dangerous to fish, with excess gas breaking the surface of the water and creating a danger for humans in the area.

FIGS. 1-6 illustrate PRIOR ART attempts to oxygenate water 10 to keep fish 20 in a live well, tank, or aquarium 2. An oxygen source 5 typically is a high-pressure tank with regulator 6 and air hose 7 tied to a bar-type or "stone" bubble diffuser 12. Looking at FIG. 1 from left to right, section A represents a fine bubble stone with O2, section B a large bubble stone with O2, section C a large bubble stone with ambient air at low pressure, and section D a fine bubble stone with ambient air 15 at high pressure. Different gasses and pressures produce different sized bubbles 13. Big bubbles 13 travel faster to the surface 9 reducing water exposure for absorption time. Or, as in FIG. 2, a bilge pump or air pump 14 may be tied to a water pump 14 that uses ambient air 15 or oxygen 5 via an air hose 7. In either case, the system 1 releases bubbled oxygen 5' through water 10 in a failed attempt to mimic the natural habitat of the fish 20 (see FIG. 27, which will be revisited in detail later). The most obvious danger is the risk of bubbled oxygen 5' accumulated in the space under the lid 3 enchancing combustion of any fire. Bubbles 13 that reach the water surface 9 burst open and release their pure oxygen into the environment or into a closed aquarium 2.

FIG. 3 shows healthy water flow through a fish. However, as shown in FIGS. 4-6, the oxygen 5' itself may pose a danger to the fish 20 by clogging the fish's gill 22 laminae with bubbles 13 rather than allowing oxygen-rich water to flow across the gills 22. FIG. 4 section A (right side) illustrates a fish 20 breathing in such a system 1. FIG. 4 section B (left side) illustrates a fish 20 even after it is removed from the system 1.

Bubbles 13, whether comprising ambient air 15 or bubbled oxygen 5' present numerous problems. Micro bubbles 13 of pure bubbled oxygen 5' will stick to the surfaces of the fish 20, including skin 24 and eyes 25. This will also cause oxygen burns on any surface of the fish 20. FIG. 5 illustrates bubbles 13 disease internally, within the fins 26. In addition to stress, this causes bubble disease, asphyxia, bubble embolism (FIG. 6, where bubbles 13 block blood 29 flow in vessels 28), and other complications that lead to prolonged organ failure and eventual death.

In live well oxygenation systems on boats 40, the preservation of fish 20 outside their complex, natural environment has always been a challenge. When possible, all of the minimal needs of fish should be simulated so that they do not become sick or perish. In contrast, most of the current technology found in boat live wells and baitwells systems includes inexpensive pumps, timers, aerators, bubblers, and air infusers. The oxygen-carrying capacity of these wells and their ability to support fish are insufficient. With high summer surface water temperatures, such systems cannot maintain oxygen in solution to allow the fish to "catch their breath" after a strong fight or to accommodate the smallest of catches.

Tournament fishermen have tried to increase live release rates of fish 20; however, causes of tournament mortality include the current technology of ambient air and oxygen bubblers 12. For example, a typical system 1 utilizes a medical oxygen tank 5 and a medical pediatric low volume regulator 6 that meters bubbled oxygen 5' continuously in a volume per minute (LPM) manner. Continuous flow of pure oxygen bubbles 13 emitted from the bubbler 12 will transfer some oxygen 5' into solution. Ideally, this gas transfer should happen before the gas bubbles 13 reach the surface 9, releasing pure gas 5' above the water 10 inside the live well's air space and building up hazardous volumes within a confined area. The short time the gas bubble 13 travels to the surface 9 is the available oxygen gas absorption time. This is highly inefficient use of oxygen 5', with absorption efficiency in single digits and significant liters per minute of oxygen 5' at the surface 9.

The perceived solution to this problem is to acquire a ceramic bubbler 12 that produces very fine bubbles 13 that stay trapped in solution longer and allow for higher oxygen transfer rates. These ceramic bubblers 12 can produce bubbles 13 so fine as to make any live well tank 2 appear cloudy, and the oxygenated live well 2 becomes a killer of fish as described in FIGS. 1-6. Fine bubbles 13 prevent the water-soluble gas transfer of oxygen into, and carbon dioxide away from, the fish.

The process of pulling oxygen from water is a delicate process for fish 20 because water usually contains only about 2% oxygen, compared to breathable air 15 which is about 21% oxygen. In most oxygen bubbler systems 1, there is no measurement of the actual dissolved oxygen (DO) concentration in the container 2. The oxygen bubbler's 12 continuous flow rates (LPM) are at best a guess without a DO test meter. There is no established protocol to accurately compensate for the variety of environmental factors when calculating dissolved oxygen levels or to calculate live well container loading versus oxygen demand. These systems have no mechanism to observe dissolved oxygen levels when operational.

Above-well spray bars/heads may forcefully spray into the well's water surface 9 to aerate well water 10 with ambient air 15. One disadvantage is that a small amount of CO2 and a large amount of nitrogen is absorbed into the well water 10, with marginal transfer of oxygen. Heat is also transferred, reducing the well's ability to retain oxygen. The jet spray and noise of the spray bars stress the fish 20. This system 1 would need to be duplicated for every live well 10 on the boat 40. Spray bars with O2 bubbler systems 1 do not fare much better. The big disadvantage is the danger of the constant flow of oxygen that would continue to supply any fire until the valve on the supply bottle 5 could be deactivated. The maximum limit for storage of any oxygen tank 5 is 120° F., which is why boat companies do not install these systems 1 as a factory option.

There is need in the art for a better alternative that allows gas to quickly, safely, and substantially saturate the water without releasing bubbles in the water or "free" gas outside of the water, and that does so affordably.

SUMMARY

An oxygenated live well generally includes a container (filled with water), a mixing chamber (which may be located inside or outside of the container), a gas delivery system, and various parts used to move the water and gas. Tempering and control of the live well water provides an environment that is favorable for transporting fish with reduced harm or mortality. Portable live wells include certain aquariums, ice chests, buckets, and live wells found on boats, kayaks, trucks, and other transports. Non-portable live wells include large aquariums, aquaculture ponds, and the like. For fish, the gas introduced is oxygen.

In practice, generally, a controller or pump floods the mixing chamber with water in order to purge air. Then a controller, regulator, or low-pressure valve is used to flood the mixing chamber with gas, thus pushing the water that was in the mixing chamber out. The gas remains in the mixing chamber under some pressure from the water in the container. Next, water is distributed through the mixing chamber and across any medium that is in the chamber, saturating the water in the chamber with the gas. Highly gas-infused water issues from the chamber to oxygenate the water in the container. Cooling and heating systems may also be employed. When the water flow is stopped, gas-infused water waits in the mixing medium for the next flow of water. Substantially no bubbles issue from the mixing chamber, and substantially no pure gas accumulates beneath the container's lid.

Other systems, devices, methods, features, and advantages of the disclosed product and methods for forming an oxygenated live well will be apparent or will become apparent to one with skill in the art upon examination of the following figures and detailed description. All such additional systems, devices, methods, features, and advantages are intended to be included within the description and to be protected by the accompanying claims.

BRIEF DESCRIPTION OF THE DRAWINGS

The present disclosure may be better understood with reference to the following figures. Corresponding reference numerals designate corresponding parts throughout the figures, and components in the figures are not necessarily to scale.

It will be appreciated that the drawings are provided for illustrative purposes and that the invention is not limited to the illustrated embodiment. For clarity and to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, there is no restrictive one-to-one correspondence between any given embodiment of the invention and any of the drawings.

FIG. 1 illustrates a front view of a prior art oxygenation system.

FIG. 2 illustrates a side view of the prior art oxygenation system of FIG. 1.

FIG. 3 illustrates healthy water flow through a fish (prior art).

FIG. 4 illustrates water with gas bubbles sickening a fish (prior art).

FIG. 5 illustrates gas bubble disease within a fish's fin (prior art).

FIG. 6 illustrates an embolism in a fish (prior art).

FIG. 7 illustrates filling a container and mixing chamber with water according to one embodiment of the present invention.

FIG. 8 illustrates venting the mixing chamber.

FIG. 9 illustrates introducing a gas to the mixing chamber.

FIG. 10 illustrates stopping the flow of gas to the mixing chamber.

FIG. 61 is a top perspective exploded view of a bucket system.

FIG. 62 is a bottom perspective view of the bucket system of FIG. 61.

FIG. 65 is a top perspective view of a bucket system.

FIG. 66 is a front perspective view of the bucket system of FIG. 65.

FIG. 67 is a side perspective view of the bucket system of FIG. 65.

DETAILED DESCRIPTION

Figure 11:
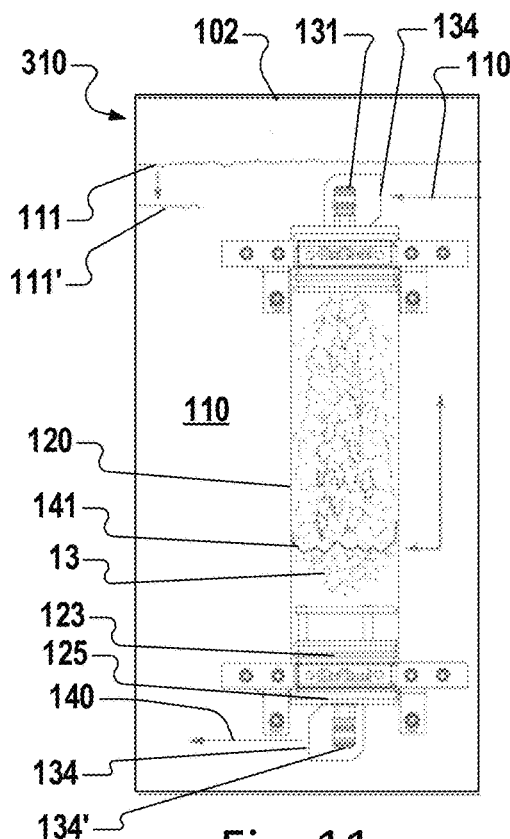
FIG. 11 illustrates pumping water into the mixing chamber.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

In describing preferred and alternate embodiments of the technology described herein, as illustrated in the Figures, specific terminology is employed for the sake of clarity. The technology described herein, however, is not intended to be limited to the specific terminology so selected, and it is to be understood that each specific element includes all technical equivalents that operate in a similar manner to accomplish similar functions.

Described below are embodiments of devices, systems, kits, and methods for infusing gas in water without constantly releasing bubbles of gas into the water. Particular attention is given to oxygenating water for keeping fish healthy, especially on a temporary basis during transport of the fish. Tempering/cooling of the water is also discussed as a critical parallel component of oxygenation, as is pH/salinity and maintenance of the system.

The General Technology

FIGS. 7-27 present the general method of the present invention along with some system elements that will be described in detail in later figures. FIG. 7 shows a container 102 of water 110 that has an empty, columnar mixing chamber 120 that comprises a body 122 composed of stainless steel, carbon, plastic, glass, or composites of these and/or other materials. A gas inlet/outlet fitting 131 and a water inlet/outlet fitting 134 are typically located at the housing top 124, and a second water inlet/outlet fitting 134 and a water drain fitting 134' are typically located at the housing bottom 125. As will be shown later, the housing 122 may be a shape other than columnar, and the use of terms "top" and "bottom" are relative, as are references to the housing's "front" and "back." In other words, "top" may equal "front," and potentially "top" may be "bottom," etc. Any fittings 131, 134, 134' may be self-sealing or locking quick disconnect (QD) valves for ease of use. Diverter plug 160 having diverter plate 160' is placed inside the housing 122 toward the housing's lower portion 123.

Beginning with FIG. 7, in use the container 102 and mixing chamber 120 (via lower water inlet/outlet 134) are filled 302 with water 110 that rises to a target fill line or water level 111 from a lower water level 111'. As a result, the mixing chamber's internal water level 141 rises, and the ambient air 15 in the mixing chamber 120 compresses.

In FIG. 8, the ambient air 15 is vented 304 out of the gas inlet/outlet fitting 131 (using vent/purge solenoid 218, shown later) as the water 110 from the container 102 enters the mixing chamber 120, raises the mixing chamber's internal water level 141, and pushes the ambient air 15 out. The container's water level will drop slightly to a lower water level 111' relative to the fixed volume of the mixing chamber 120, but the container 102 may be "topped off" using a water pump 144, 146 (not shown here).

In FIG. 9, gas 210 is introduced into the mixing chamber 306 via the gas inlet/outlet fitting 131 (using "gas in" solenoid 217, shown later). The mixing chamber's internal water level 141 is pushed down with the pressure of the gas injection, and water 110 evacuates the mixing chamber 120 through the lower water inlet/outlet fitting 134, thus increasing the container water level 111 to its original level. The gas flow stops 308 when, as shown in FIG. 10, the injected gas 210 causes a slight overflow of gas bubbles 13 that are comprised of that injected gas 210. For example, the gas 210 may be oxygen, and the container 102 may be a live well. In certain configurations, such bubbles 13 are a visual indicator that the mixing chamber 120 is "full" and, importantly, is a separate occurrence from the next and more immediate step that results in the gas 210 being dissolved in the water 110. In an automated or electronically controlled and calibrated process, any "burped" gas 210 may be minimized without need for visual confirmation of fill.

In FIG. 11, the mixing chamber is flooded with water 310, typically via a water pump 144, 146 and the top water inlet/outlet fitting 134 with the aid of gravity. As the water 110 is misted, sprayed or otherwise distributed through the gas 210 in the mixing chamber 120, the mixing chamber's internal water level 141 will rise, compressing the gas 210, and move toward an equilibrium level 142 (see FIGS. 13-16). The water volume in the container 102 also exerts pressure on the gas 210 in the mixing chamber 120. The pressure, water-to-air impact, and churning work together to dissolve the gas 210 while keeping most or all of the undissolved gas 210 in the mixing chamber. The gas-saturated water 140 of the mixing chamber 120 is forced out of the lower water inlet/outlet fitting 134. In this specification, water that is in the container 102 and introduced into the mixing chamber 120 is referred to as water 110, and water that contains dissolved gas 210 in the mixing chamber 120 and is released into the container 102 is referred to as gas-saturated water 140, though it is understood that the state of the water 110, 140 is in flux.

Figure 15:
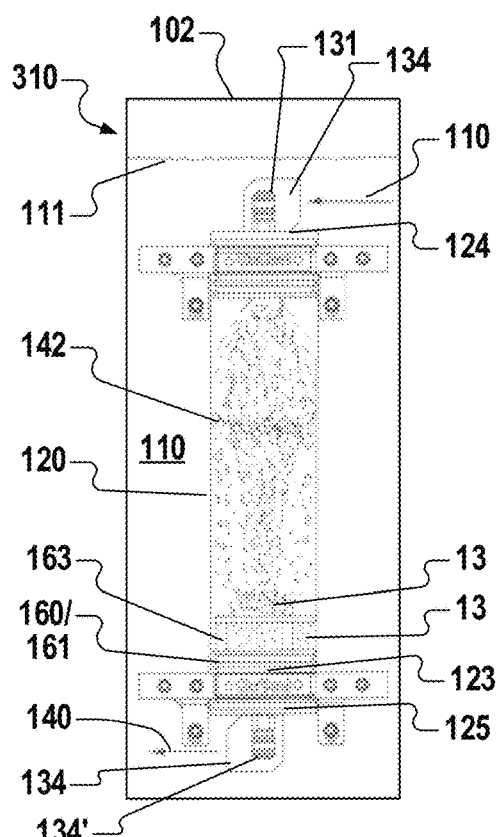
FIG. 15 illustrates an alternative configuration for the pumping of FIG. 11.
Figure 16:
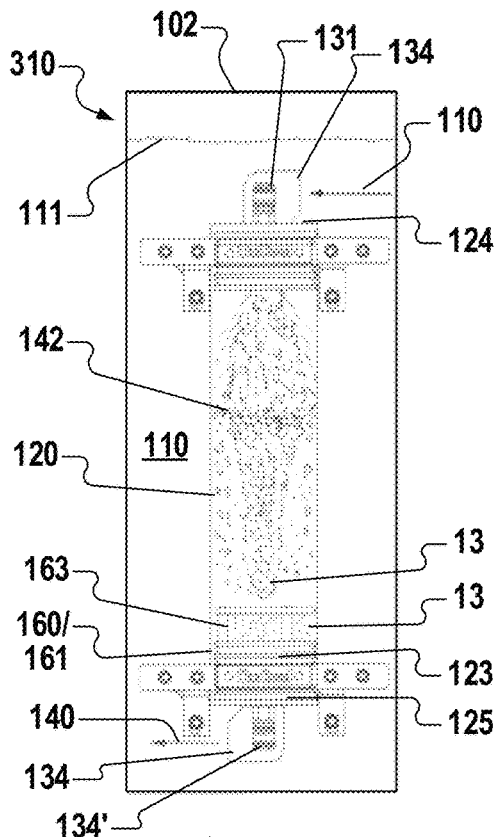
FIG. 16 illustrates an alternative configuration for the pumping of FIG. 11.

FIGS. 15 & 16 are two variants of FIG. 11 that illustrate the function of the diverter plug 160. FIG. 15 is a "bubble bounce" technique in which the water 110 is sprayed forcefully enough to cause any bubbles 13 of gas 210 to descend, usually in a cone formation, and impinge or strike the diverter plug 160 and bounce back toward the incoming water 110. An internal equilibrium water level 142 is reached with gas 210 above and water 140 with bubbles 13 below. The bouncing bubbles may be thought of as an impingement "cloud" from which bubbles 13 return up the sides of the mixing chamber 120 and recirculate. The diverter plug 160 comprises apertures 169 (shown elsewhere). Any gas bubbles 13 that pass through holes in the diverter plug 160 are restrained by a bubble trap 163 in a central portion of the diverter plug 160. Bubble-free, gas-saturated water 140 passes out of other apertures 169 through the lower water inlet/outlet fitting 134 and into the container 102. In FIG. 16, the flow of water 110 into the mixing chamber 120 is calibrated such that gas bubbles 13 to not forcefully bounce off of the diverter plug 160.

Figure 12:
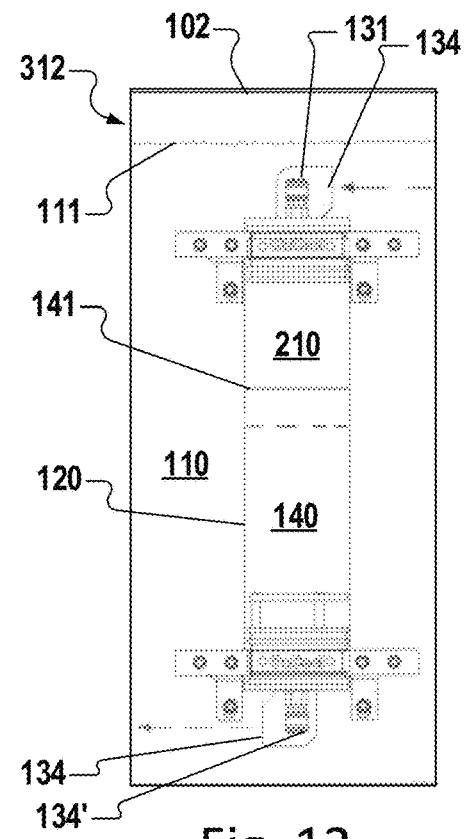
FIG. 12 illustrates stopping the flow of water into the mixing chamber.

In FIG. 12, the pump 144, 146 is turned off and the flow of water is stopped 312. The mixing chamber 120 is at rest with a full charge of gas-saturated water 140, with some unmixed gas 210 residing above the mixing chamber's internal water level 141. Upon a next use of the pump 144, 146 as indicated by the dashed lines, even if brief, more gas-saturated water 140 will be released into the container 102, and pressure on the remaining gas 210 will be increased.

Figure 13:
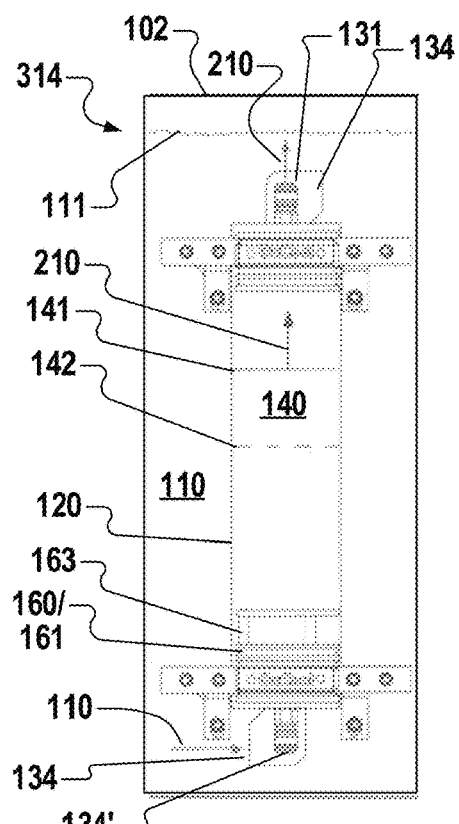
FIG. 13 illustrates venting gas from the mixing chamber.
Figure 17:
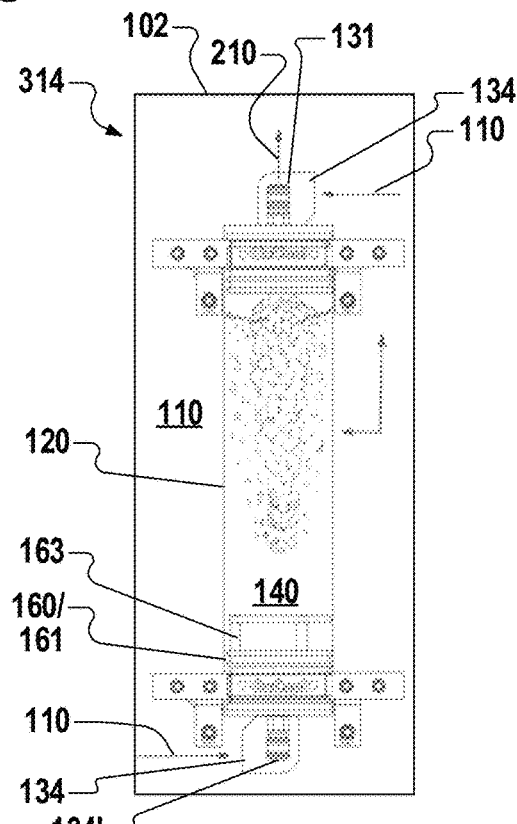
FIG. 17 illustrates an alternative configuration for the venting of FIG. 13.

In FIG. 13, the unmixed gas 210 and any other gas is vented 314 as a safety measure via the upper gas inlet/outlet fitting 131. As the level of gas 210 decreases, water 110 enters the lower water inlet/outlet fitting 134 and re-floods the mixing chamber 120 so its internal water level 141 increases. FIG. 17 shows a variant on FIG. 13 that is a "power purge" or powered venting in which the pump 144, 146 additionally floods the mixing chamber 120 for faster removal of gas 210.

Figure 14:
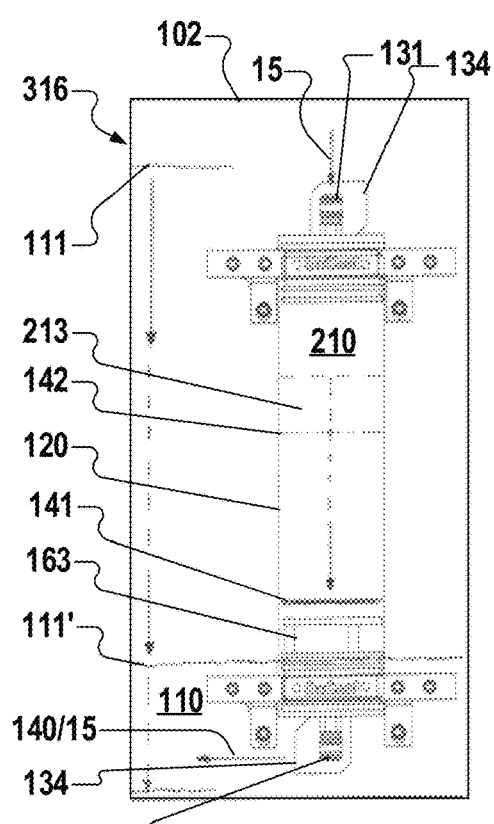
FIG. 14 illustrates reducing container water volume.

Finally, in FIG. 14 the user may reduce the container water volume 316 (or drain the mixing chamber 318). Allowing ambient air 15 to enter the mixing chamber 120 through the gas inlet/outlet fitting 131 and dropping the volume of water 110 in the container 102 creates a vacuum that pulls the ambient air 15 inside the mixing chamber 120 to mix with the undissolved gas 210 that becomes increasingly diluted. A phase or region of mixed gas 213 is created. The greater the volume of ambient air 15, the safer the mixing chamber 120. Safe, ambient air 15 passes out of the lower water inlet/outlet fitting 134 along with water 140.

Alternatively, the user can draw the water down to a "minimum" or lower water level 111', as shown, without venting. This novel function of the present invention allows for conservation of some unmixed gas 210 and some gas-infused water 140 in the mixing chamber 120, basically in vacuum storage. The remaining water 140 acts as an air lock. Thus, gas 210 is retained for next use, and oxygenated water 140 is trapped for immediate infusion upon command.

Figure 18:
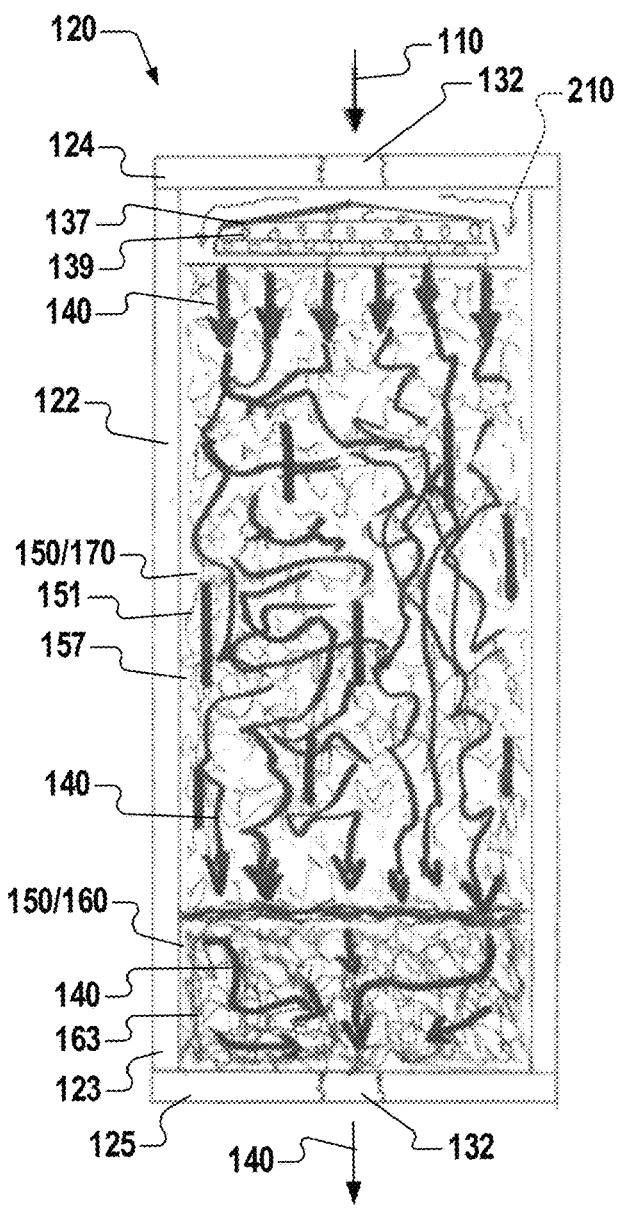
FIG. 18 illustrates a cylindrical mixing chamber with mixing medium.
Figure 19:
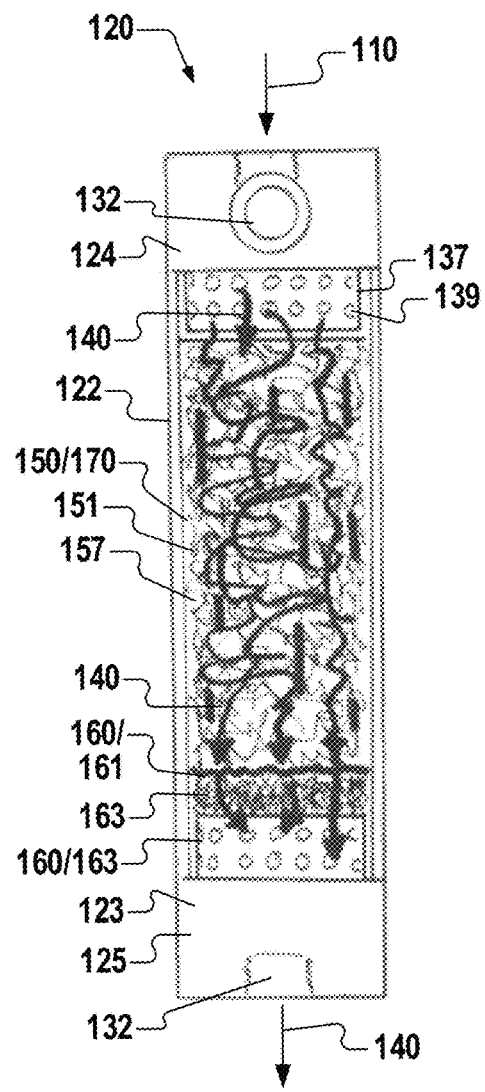
FIG. 19 illustrates a cylindrical mixing chamber with mixing medium.
Figure 20:
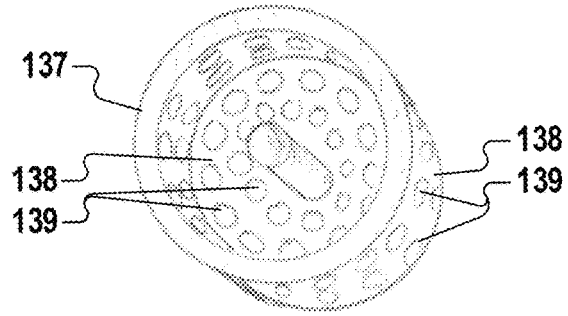
FIG. 20 is a perspective view of a water distributor.
Figure 21:
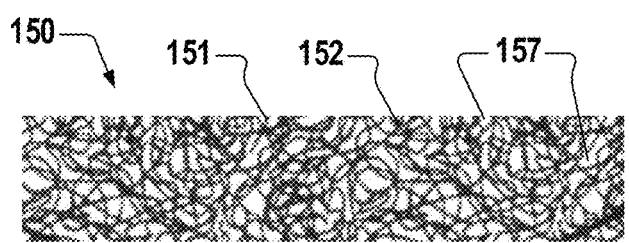
FIG. 21 shows a multi-strand matrix.
Figure 22:
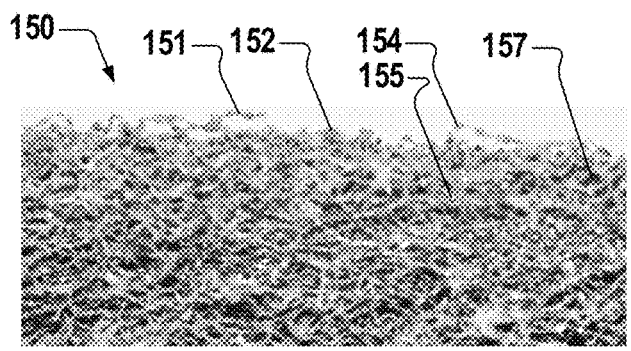
FIG. 22 shows a multi-strand matrix.
Figure 23:
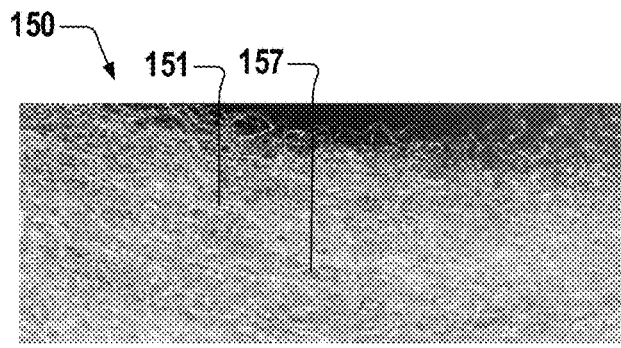
FIG. 23 shows a multi-strand matrix.
Figure 24:
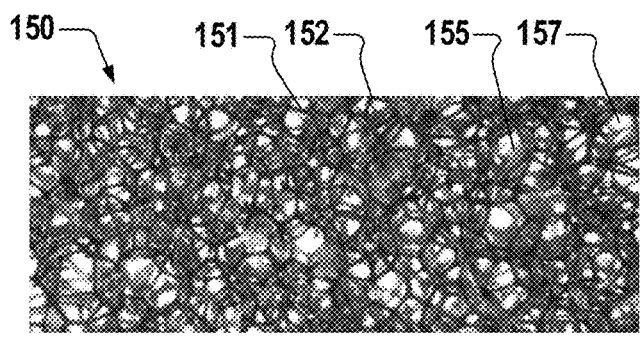
FIG. 24 shows a multi-strand matrix.
Figure 25:
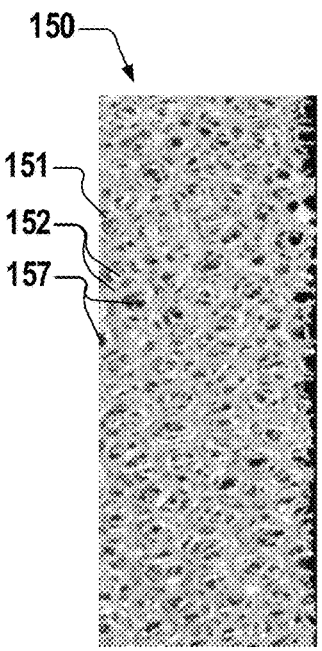
FIG. 25 shows a multi-strand matrix.
Figure 26:
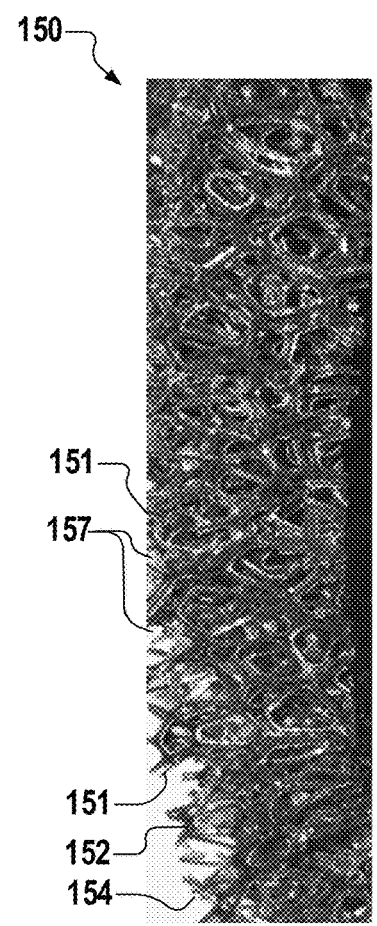
FIG. 26 shows a multi-strand matrix.

FIGS. 18-26 illustrate addition of a multi-strand matrix 150 as a mixing medium 170 in the mixing chamber 120 in order to increase efficiency of dissolving gas 300. In this embodiment, the mixing medium 170 allows water 110 to flow through its pores or voids 157 in a turbulent manner to promote mixture of the water 110 and gas 210, and holds bubbles 13 of gas 210 as well as gas-infused water 140. In FIGS. 18-19, port 132 permits gas 210 to flood the mixing chamber 120 having the mixing medium 170. In this specification, a port 132 may refer to an aperture plus bulkhead fitting, the aperture for the bulkhead fitting, or the bulkhead fitting paired with said aperture. Ports 132 are usually associated with various inlet/outlet fittings, other fittings, or tubing. After the gas 210 is in the mixing chamber 120, water 110 flows through a distributor 137 toward the mixing media 170. A multi-tiered distributor 137 of about 6" diameter is shown in FIG. 18, and a smaller strainer-like distributor 137 of about 2" diameter is shown in FIGS. 19-20. Distributors 137 are not limited to the representation of these drawings. Mixing chambers 120 may be much larger than 2-6" diameter, but in general they comprise one or more walls 138 having distributor apertures 139 that spread inflowing water 110 across the breadth of the mixing medium 170. A second multi-strand matrix 150 may serve as a diverter plug 160 and bubble trap 163, although that second multi-strand matrix is not required unless otherwise stated. FIG. 19 shows that the diverter plug 160 may act as an impingement plug 161 working in tandem with a diverter plug/gas trap 160/163 made of a different material. Gas-infused water 140 exits a port 132 on the opposite side of the mixing chamber 120. The housing top 124 and bottom 125 may resemble caps on a tube.

Examples of multi-strand matrices 150 are shown in FIGS. 21-26, although the present invention is not limited to these examples. A matrix 150 is a collection of strands 151 joined at nodes 152, each node 152 comprising at least two strands 151. The stands 151 may have granules or particles 154 on them, as well as resin 155 that may bind the strands 151 and/or create irregularly shaped strands 151. Numerous voids 157 create a multi-strand matrix 150 that in total is highly porous (the strands 151 themselves are not necessarily porous). One or more configurations of multi-strand matrix 150 may be employed in one mixing chamber 120 and may be optimized and arranged for desired functionality and cost. A preferred matrix 150 holds its form and does not deteriorate in a gas (oxygen) and water-filled environment. Various weaves and densities may be tuned and/or used in combination for specific performance to hold water and gas while also having flow-thru capability.

Among the examples of highly porous multi-strand matrix 150 found to have desirable properties for the present invention are two products manufactured by 3M (Minnesota Mining and Manufacturing Co.). One is the Buf-Puf™ web comprising 6 denier fibers bonded at their mutual contact points with a hardened prebond resin. Another example is the heavy duty Scotch-Brite™ Scouring Pad non-woven web comprising 15 denier fibers and including inorganic abrasive particles bonded to the fibers of the nonwoven web with a hardened resin. See U.S. Pat. No. 2,958,593 to Hoover et al. These pads are described as non-woven, three-dimensional, fibrous, lofty webs of extremely open structure having an extremely high void volume (i.e., low density) and formed of many interlaced randomly extending, durable, resilient fibers which have a diameter of from about 25 microns to about 250 microns. A waterproof relatively hard rigid binder forms a three dimensionally integrated structure throughout said web that comprises a tri-dimensionally extending network of intercommunicated voids constituting at least about 75% of the volume of said article. The preferred webs are nonwoven webs formed of nylon or polyester thermoplastic organic filaments having a size on the order of 3 to 500 denier and a web thickness in the range of 2 to 50 mm. The filaments may have a cross-section which is round, square, triangular, rectangular or a blend of various cross-sections. 3M's intent was to develop abrasive scouring pads for cleaning surfaces, and they did not envision use of their pads for dissolving gas in water 300. The present invention is not limited to a 3M pad material or to their description of the multi-strand matrix 150 unless specifically stated.

Figure 27:
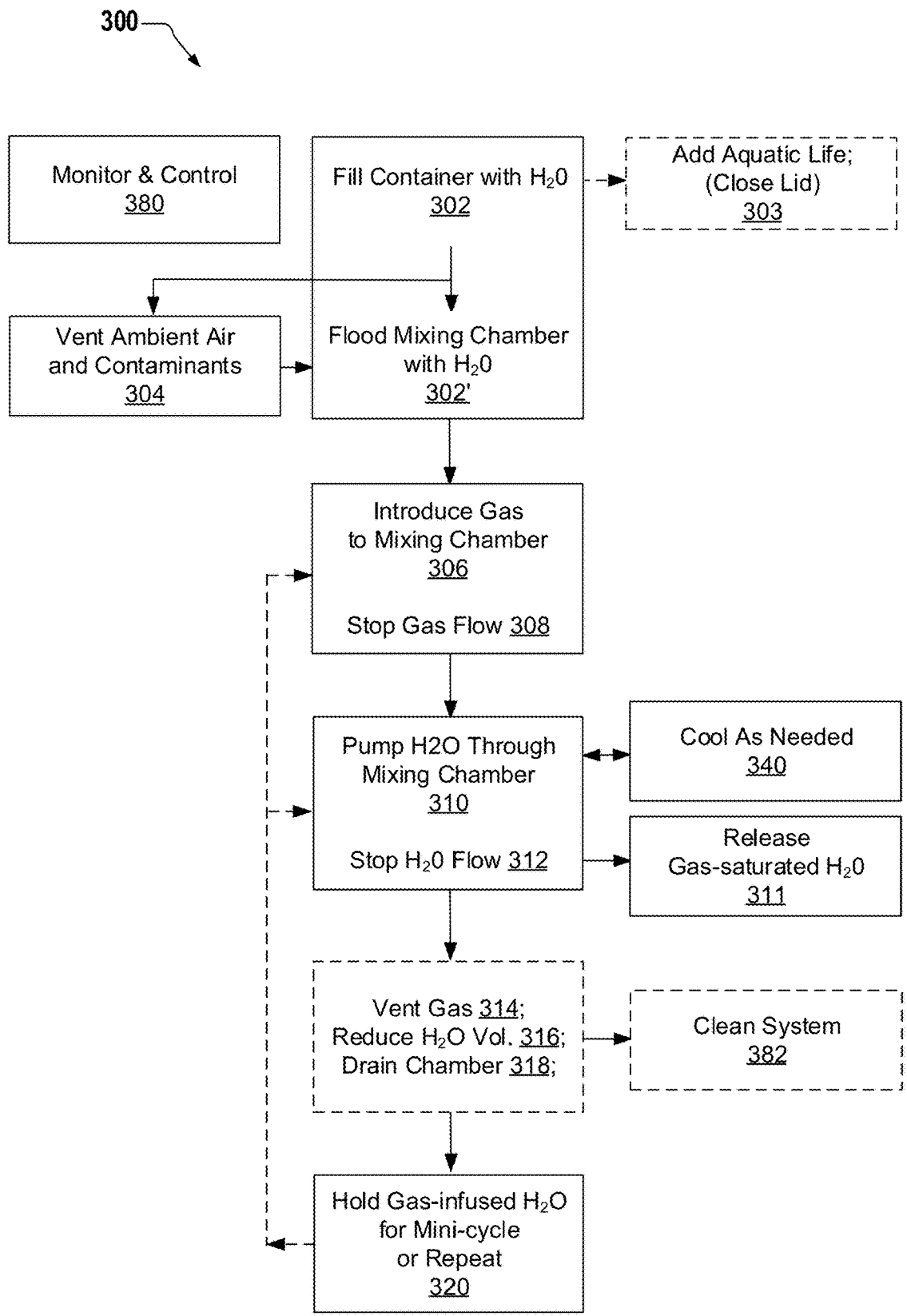
FIG. 27 is a flow chart of the general method of dissolving gas in water.

In summary, per the flow chart of FIG. 27, the general method of dissolving gas 300 comprises: the user fills the container (and mixing chamber) with water 302, adds aquatic life (and closes the container lid) 303, vents or purges the mixing chamber of ambient air or other gas 304, introduces a discrete amount of gas into the mixing chamber 306 and stops the flow of gas 308, turns the water pump on to flood the mixing chamber with water 310 (thus dissolving the gas and releasing gas-infused water 311 that is substantially free of bubbles), stops the flow of water 312 (holding gas-infused water and gas for future use 320), and repeats steps 306-312 as necessary. The user may cool the water 340. Additionally, the user may vent gas(es) 314, reduce container water volume 316, drain the mixing chamber 318, and/or clean the container and system 382. The user may monitor and control the system and surroundings 380 manually or via a controller 280. One of skill in the art will understand that certain steps in the method 300 may be omitted, grouped differently, or performed in different order if the result is similar performance. For example, one may dissolve gas 300 without draining the mixing chamber 318, as the method of dissolving gas 300 may comprise a subset of the listed steps.

Figure 28:
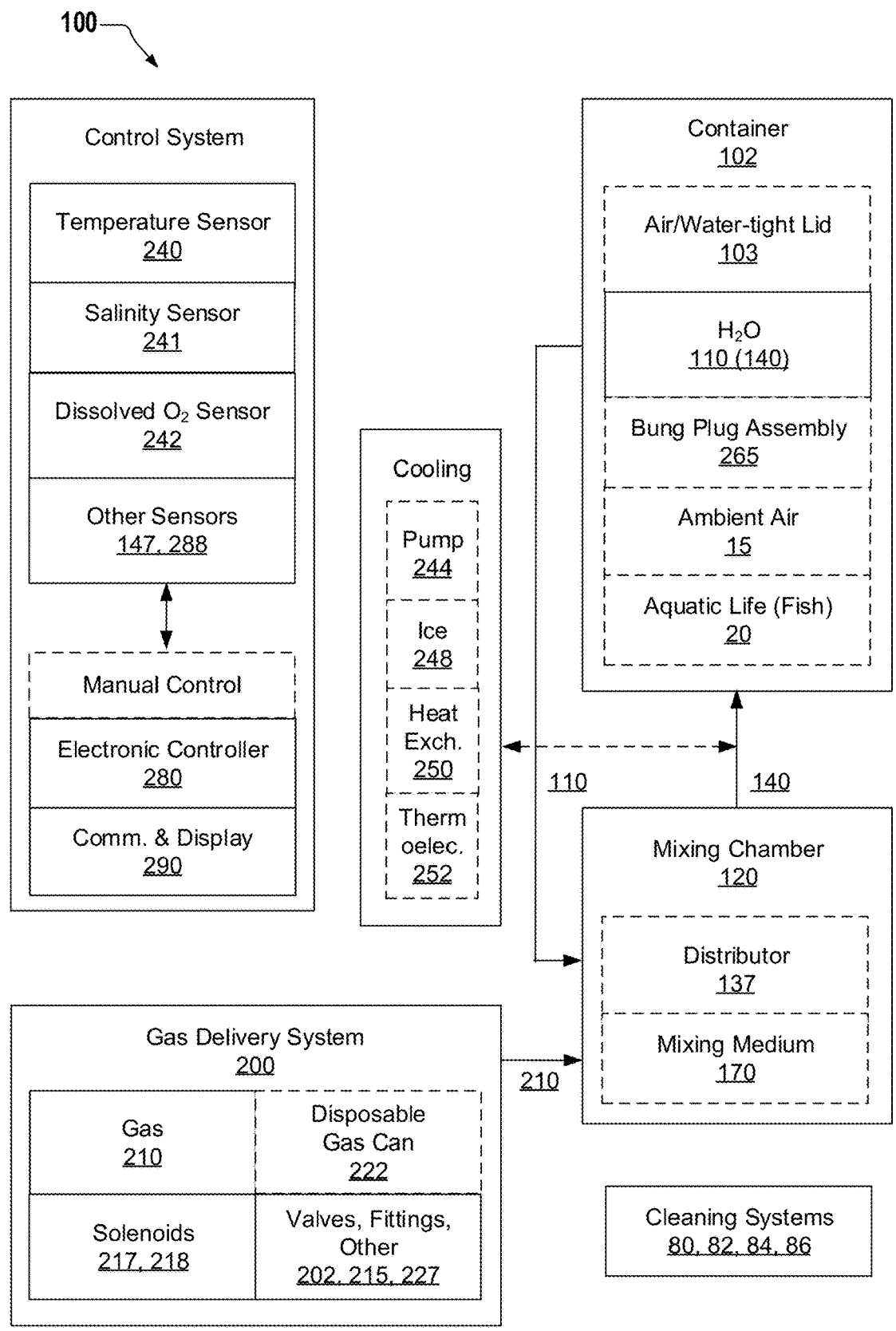
FIG. 28 is a chart of the general system for dissolving gas in water.

The general system for dissolving gas 100, per the flow chart of FIG. 28, comprises: An electronic controller 280 with communication and display 290 capabilities, sensors, water pumps, a gas delivery system 200, cooling systems, a mixing chamber 120, and a container 102. Manual control is optional. The controller 280 interacts with at least a temperature sensor 240, salinity sensor 241, dissolved gas sensor 242, and other sensors 147 and 288. The controller 280 activates thermocline water pump with intake 146/11 to fill the container with water 110 and water fill pump 144 to send water 110 (140) into the mixing chamber 120, which may have a distributor 137 and mixing medium 170. Gas-saturated water 140 passes from mixing chamber 120 to container 102, which may have lid 103, water 110 (140), bung plug assembly 265, ambient air 15, and aquatic life (fish) 20. The electronic controller 280 may also activate a water cooling pump 244 to a variety of cooling mechanisms including artificial ice 248, heat exchanger 250, and thermoelectric cooler 252. The controller 280 may also activate a gas delivery system 200 that may include gas 210, a disposable gas can 220, solenoids 217 and 218, valves 202, 215, and 227. After reading this specification, one of skill in the art will realize the number of parts and configurations envisioned for this system 100 and that this brief description is not limiting.

One advantage to this design is simplicity. Only the flow of water 110 is adjusted, versus the flow of gas 210, because the gas volume is fixed in the mixing chamber 120. A valve or controller 280 prevents water 110 and gas 210 from flowing simultaneously, and pumps 144, 146 are specific to the GPH required for the best gas absorption rate in a given size of mixing chamber 120. In essence, these may be fixed volume pumps. A fixed flow orifice may be utilized. The result is simpler, more effective, and more practical than the prior art. Pumps 144, 146 may be configured based upon pulse-width modulation, variable voltage amplitude, variable or fixed current, phase control, programmable combinations of these configurations.

Ice Chest Oxygenated Live Well System

Figure 29:
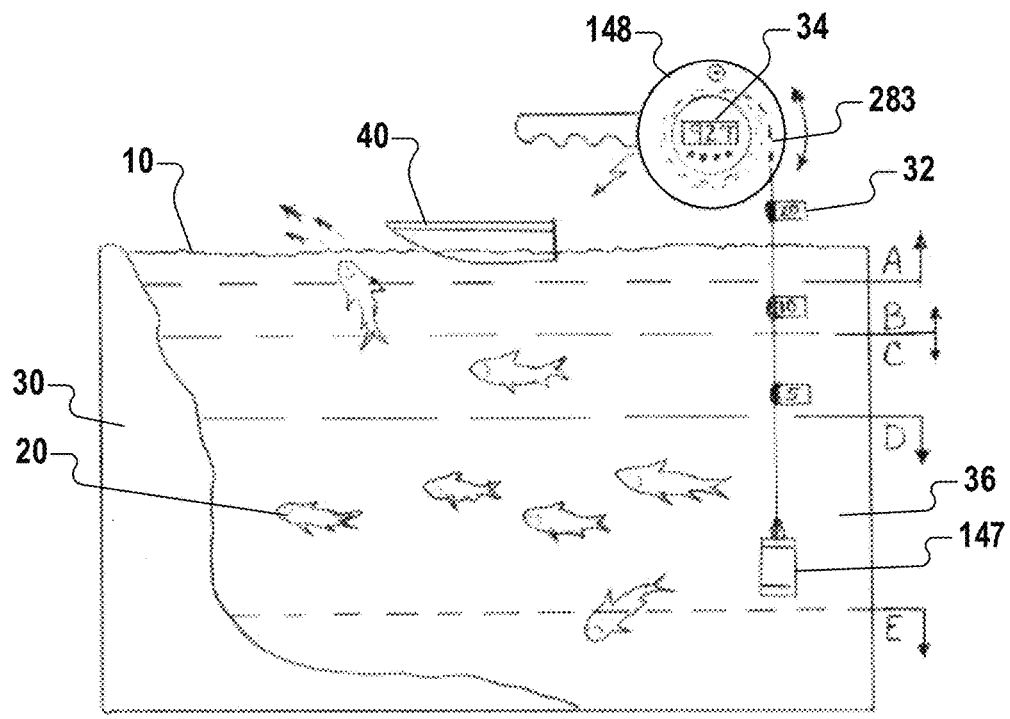
FIG. 29 illustrates a sensor probe in a fish's native habitat.
Figure 30:
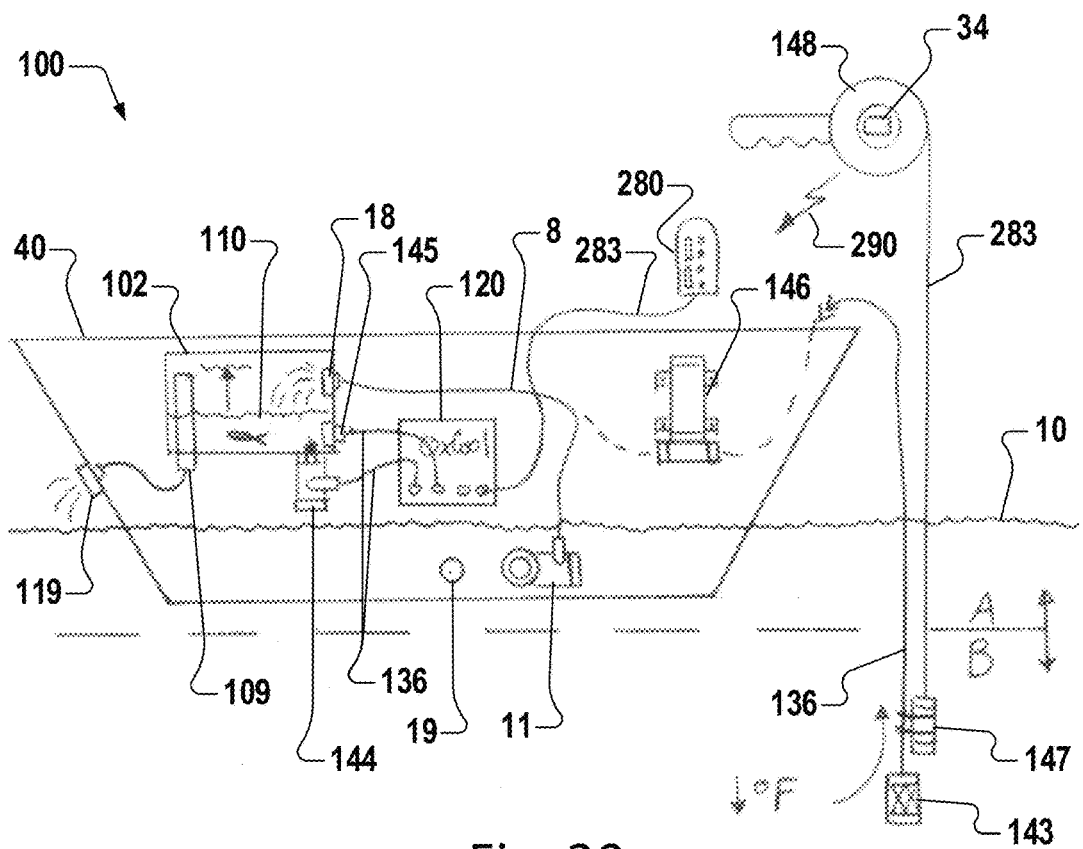
FIG. 30 illustrates a boat equipped with the present system in the native habitat.
Figure 31:
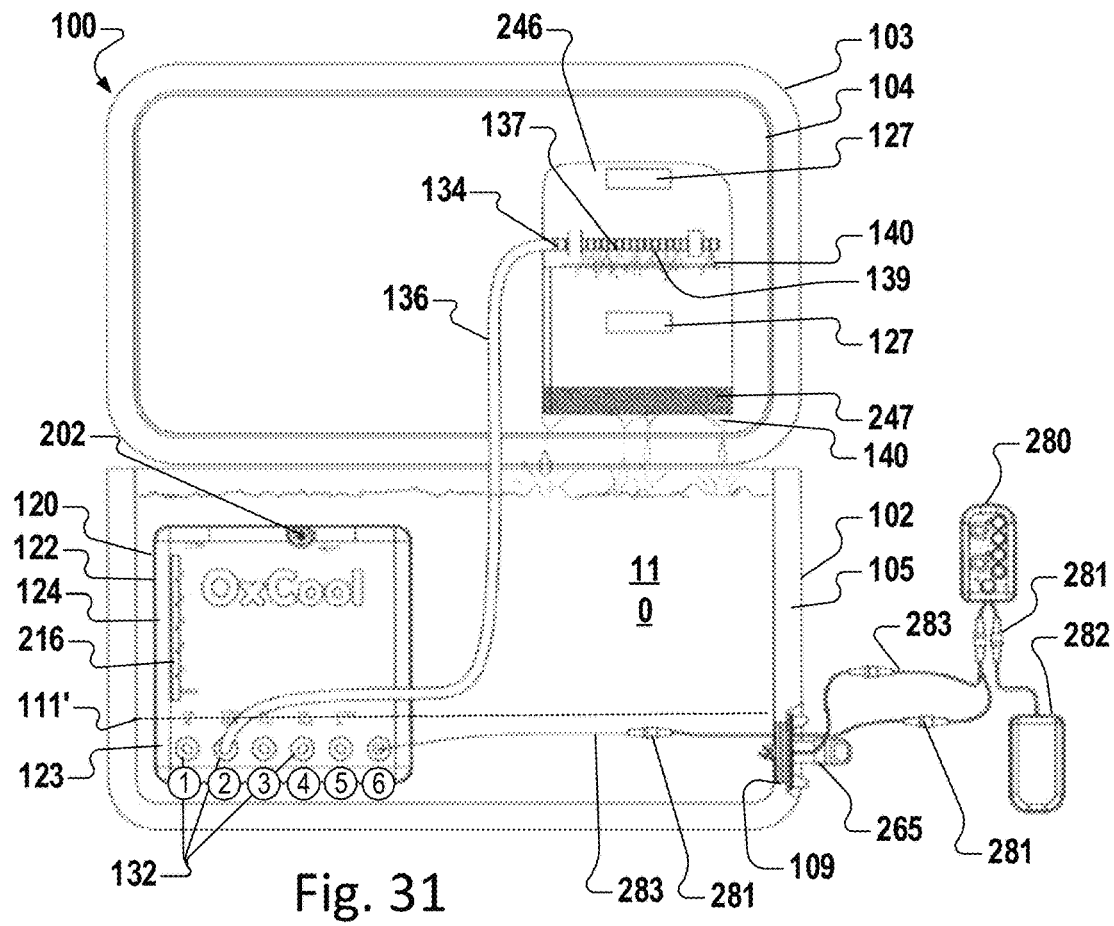
FIG. 31 is a front cut-away view of an ice chest system for dissolving gas in water using the mixing chamber, with artificial ice cooling.

FIGS. 29-30 illustrate the natural habitat of fish 20 in relation to preservation of those fish 20 via the present invention. A body of water 10 (next to land 30) comprises various strata or dines, represented here as sections A-E, with A being the hottest and E being the coldest. In this drawing, the thermocline 36 (D) contains the most fish 20 because it has the best combination of temperature and oxygen. Fish may rise to the hot surface to feed momentarily and may descend at times to anoxic region E. A boat 40 taking surface water 10 into its holding tank may pull 90 [degree] temperatures, and water 10 at the bottom may be 40 degrees cooler, for example.

Saltwater 10 adds complexity. Pulling surface freshwater (such as occurs with a rain, drought, hurricanes, and river in-flows) from dine A will kill baitfish and other fish 20 in the live well. Cline B is brackish, and salinity increases with depth to hyper-salinized dine E. Fish 20 will dwell at the thermocline 36 where they find the best combination of temperature, oxygen, and salinity. Currently there is no commercial solution for accounting for changes in salinity.

The controller 280 of the present invention may utilize feedback from a variety of sensor probes 147 including, but not limited to, depth, water temperature 34, oxygen, salinity, and pH. Sensor spool 148 unwinds and rewinds wire 283 attached to the probe(s) 147, and the wire 283 may carry depth markers 32 and a thermocline water intake 143. Live well 102 temperature 34 has a significant effect on dissolved oxygen levels available to fish 20 and, thus, fish-holding capacity of a container 102. Using the thermocline water intake 143 a fish 20 caught at target depths 36 could be put in the live well 102 at the same temperature 34 from which the fish 20 was caught (and will eventually be returned), greatly reducing stress.

FIG. 30 is a simplified drawing of the system of dissolving gas 100 in a boat 40 having container 102 that may be fed water 10 from a water pump with intake 11 or the thermocline water intake 143 utilizing a thermocline pump 146. Controller 280, water pump 144 (which may be a recirculation pump), and mixing chamber 120 optimize the water in the system 110. A drain 119 from the container 102 and a boat drain 19 are both shown.

Turning now to FIGS. 31-60, we expound upon this simple explanation and look at an intermediate-sized embodiment of the system 100. FIGS. 31-34 show a cut-away view of a container 102 that is a cooler or ice chest having walls 105 and a lid 103 with a seal 104 that is typically fluid-tight. The container 102 may have hard or soft walls depending on intended use. Drain hole 109 is sealed with a removable bung plug assembly 265 configured to allow wires 283 and or tubing 136 to pass from inside the container 102 to outside. Controller 280, which may be an electronic pendant, is connected to the rest of the system 100 and to a power source 282 by electric connectors 281. The controller 280 may reside outside the container 102 or within (see FIGS. 33-34). The power source 282 may be a battery or a variety of other adaptable sources.

Within the ice chest or container 102 is mixing chamber 120 that has a rectangular housing 122 with ports 132 at the lower portion 123 of the housing front 124. The mixing chamber 120 is not limited to a rectangular or tubular shape, nor to six ports 132, but may have a different configuration of shapes and ports 132 that provide similar functionality. Also seen on the housing front 124 is a gas volume gauge 216 and a vent fitting 202. The housing 122 may be made of plastic, carbon, or a variety of materials or combinations of materials that are durable in water 110 that fills the container 102. Water level 111 illustrates the target fill line, and lower water level 111' illustrates a minimum water line above the ports 132 on the lower portion of the mixing chamber housing 122. In these examples, the first port 132 is dedicated to "$H_2O$ in to mixing chamber," the second port 132 to "water out to cooling," the third to "gas fill," the fourth to "gas-infused water out," the fifth to "water in for cooling," and the sixth to wiring 283 for power 282 and controller 280. Ports 132 are not limited to the positions or order shown, and at times some ports 132 are not used.

Figure 33:
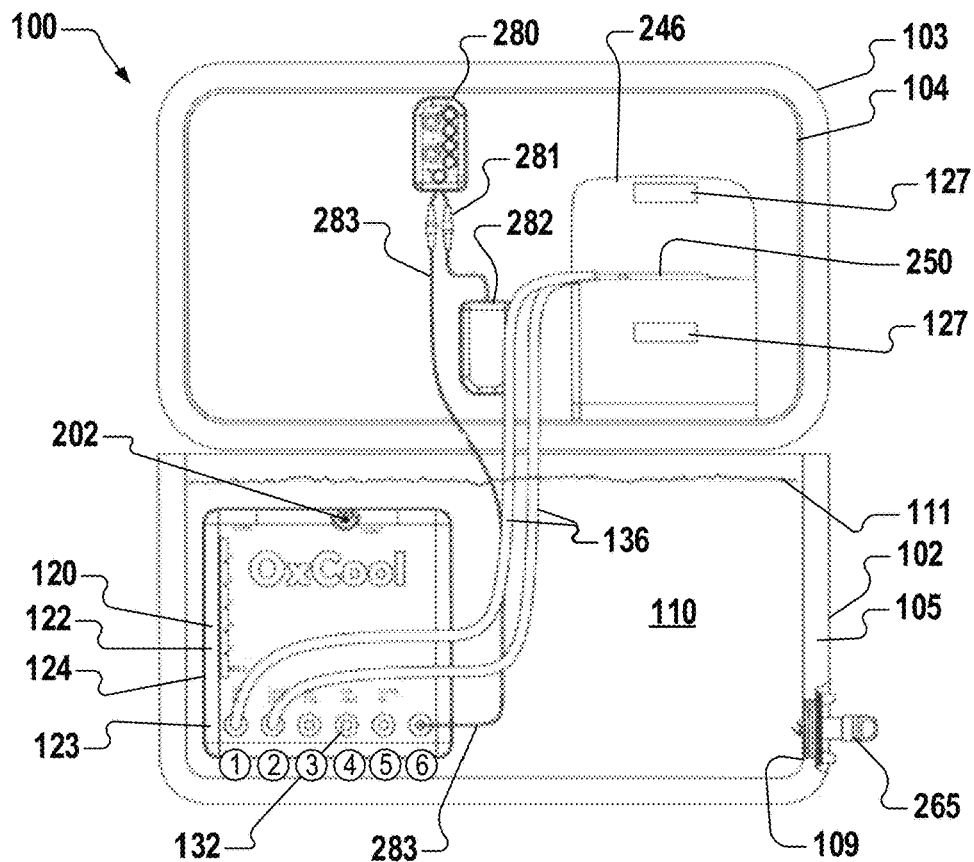
FIG. 33 is the ice chest system of FIG. 32 with internal controller and power.
Figure 34:
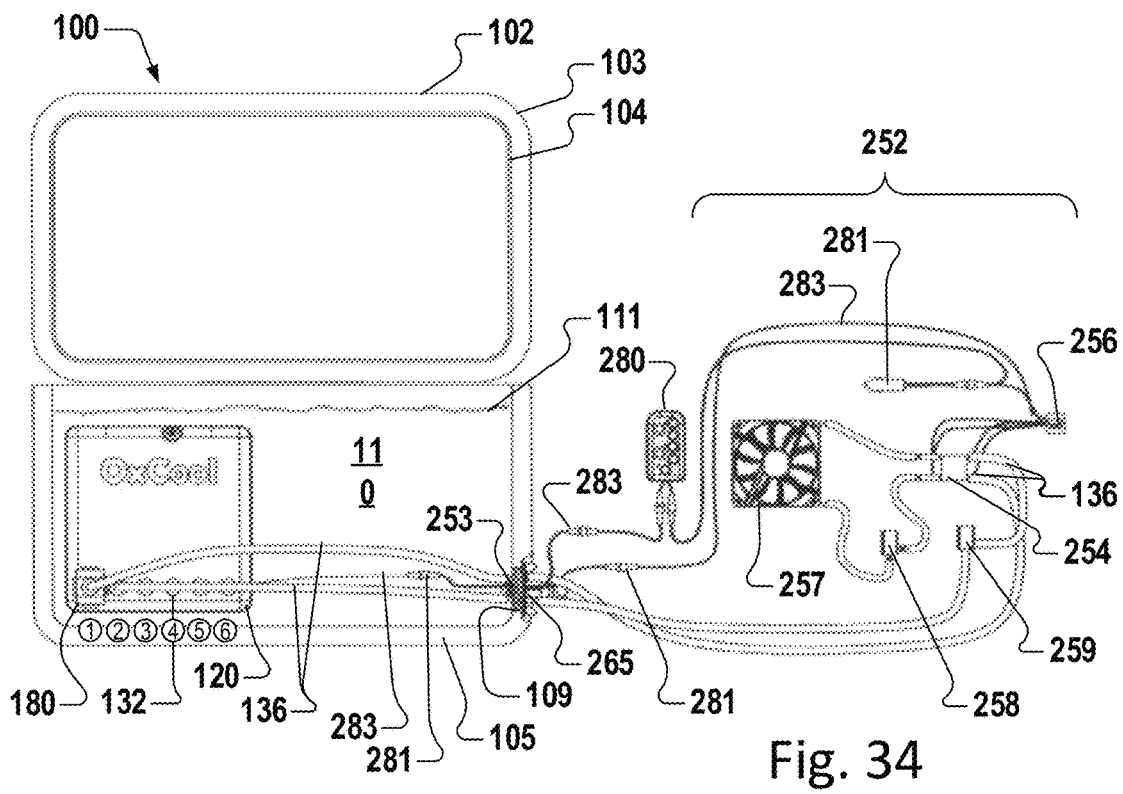
FIG. 34 is a front cut-away view of an ice chest system for dissolving gas in water using the mixing chamber, with external thermoelectric cooling.
Figure 35:
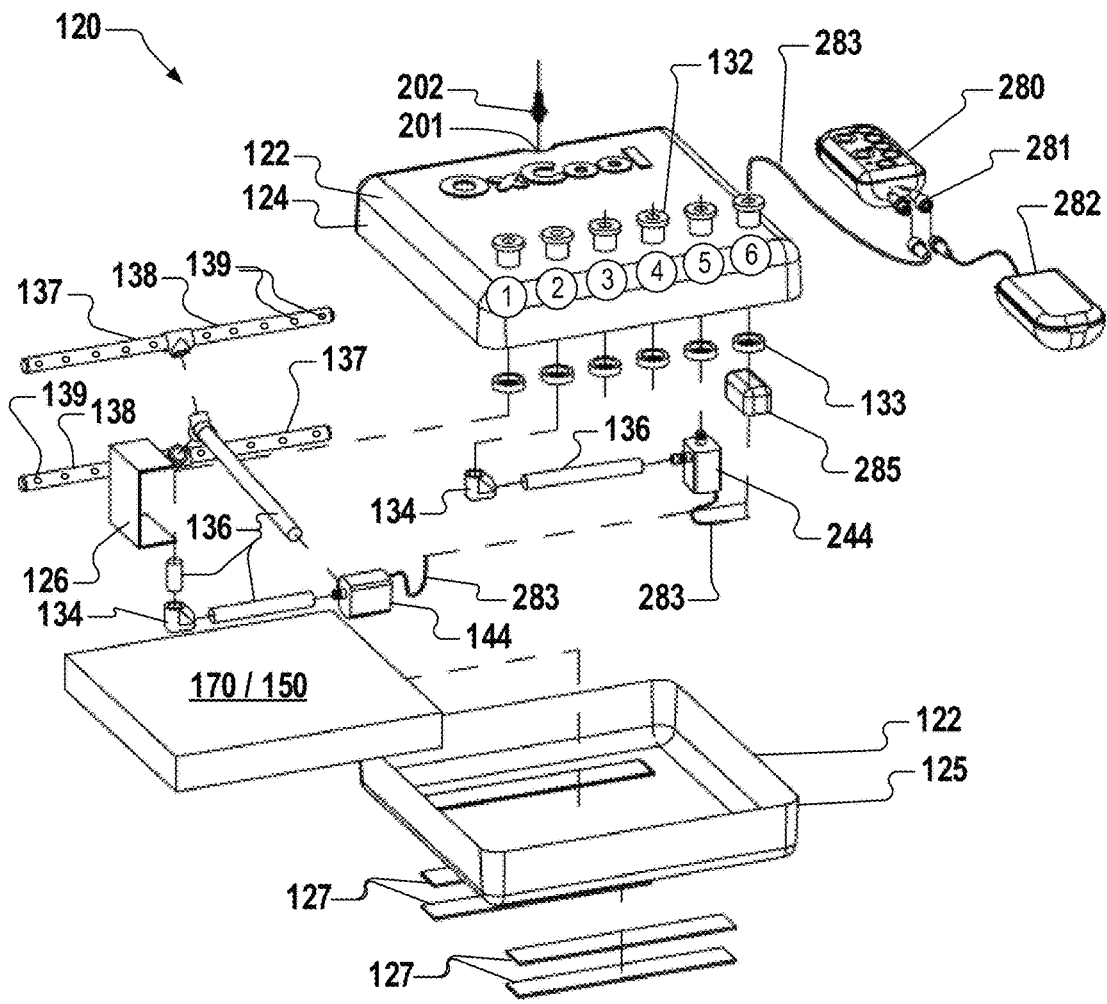
FIG. 35 is an exploded view of the rectangular mixing chamber of FIGS. 31-34.
Figures 36, 37:
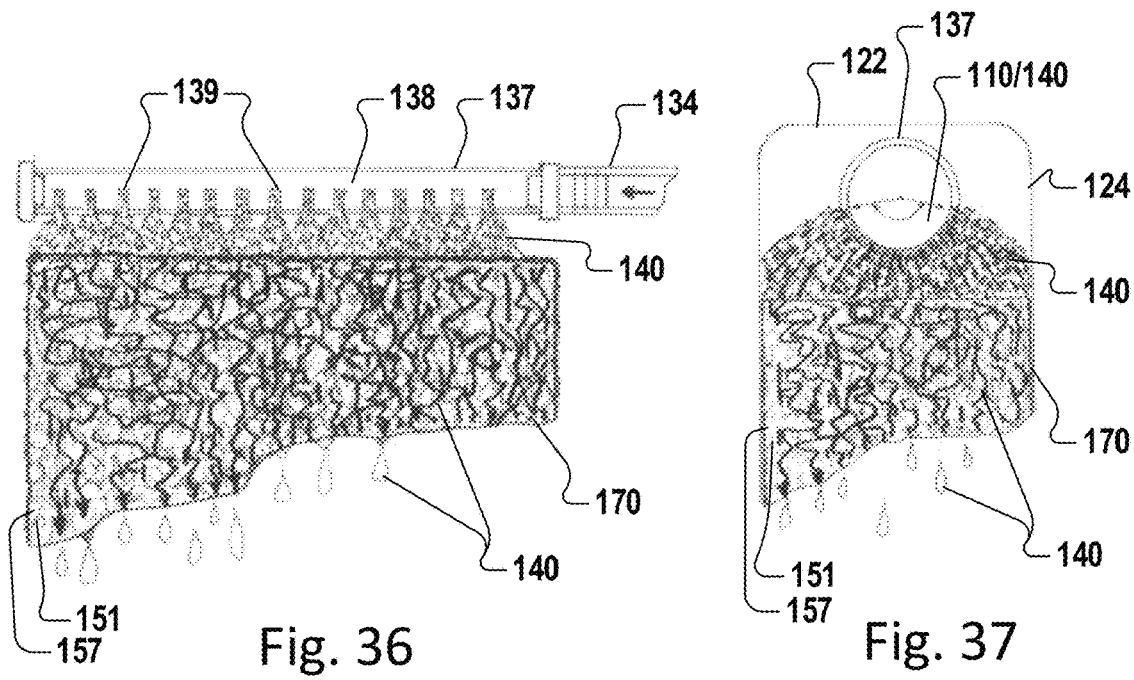
FIG. 36 illustrates a front view of spraying of the mixing medium in the mixing chamber.
FIG. 37 is a side view of the spraying of the mixing medium of FIG. 36.
Figure 39:
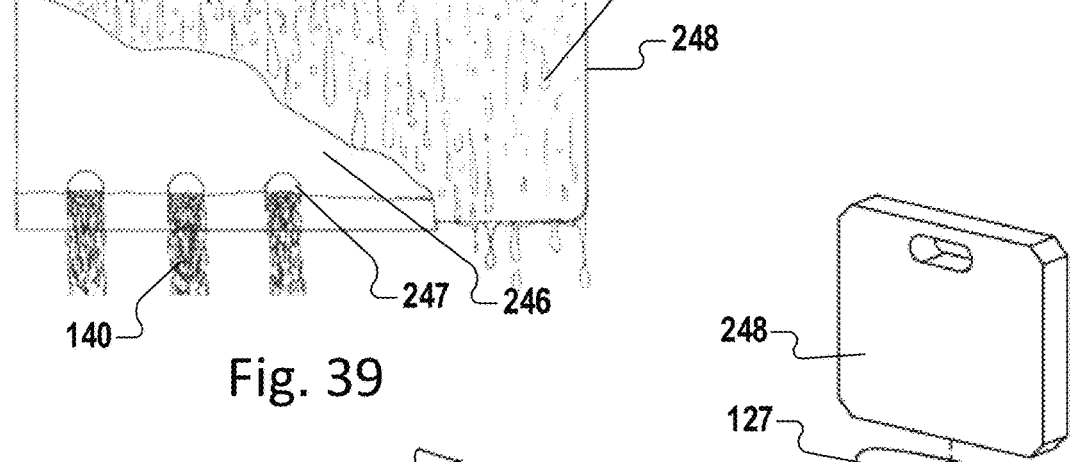
FIG. 39 illustrates spraying artificial ice with water in FIG. 31.
Figure 40:
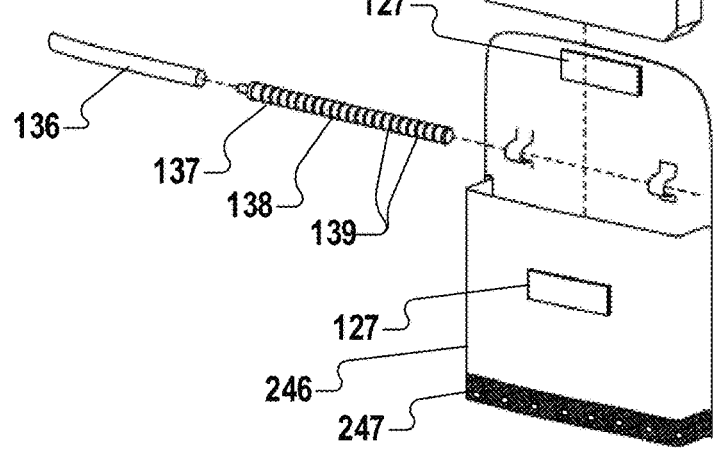
FIG. 40 is an exploded view of the artificial ice cooling of FIG. 31.

FIG. 35 illustrates an exploded view of one embodiment of the mixing chamber 120 of FIGS. 31-34. This configuration of mixing chamber 120 may have a size of about 12"×12"×3", but mixing chambers 120 may be a variety of sizes fit for their intended use. Generally, the first port 132 takes water 110, 140 in via water inlet/outlet fitting 134, tubing 136, and DC water fill pump 144 that is a water recirculation pump. The water 110, 140 is pumped to spray bars that are distributors 137 having walls 138 with apertures 139 configured to send water 110/140 through the voids 157 and along the strands 151 of mixing medium 170/150 (see FIGS. 36-37), such that gas-saturated water 140 exits the fourth port 132 back into the container 102. The third port 132 is equipped with a gas line 214 or fill valve 215, 227 as shown and explained in later figures (for example, see FIG. 42). The fifth port 132 takes water 110 in from the container 102 via a water pump for cooling 244 and sends it along tubing 136 and water inlet/outlet fitting 134 through the second port 132 to a spray bar distributor 137 in an ice holder 246, as shown in FIGS. 39-40. The ice holder 246 may comprise mesh and/or be a pouch, bag, or other holder having holes 247 that allow cooled water 110, 140 to flow out after flowing across a block of artificial ice 248 or other cooling device and back into the water 110 in the container 102. In a closed recirculating live well 102, defined upper and lower temperature 34 limits are designed to conserve battery power 282 and reduce rapid cycling of the water cooling pump 244, which activates only when the established temperature 34 upper limit is reached. By cooling the entire mixing chamber 120, oxygenation increases up to about 27% greater than at normal container 102 temperature.

The ice holder 246 may be held to the container's lid 103 by Velcro 127, although placement is not limited to the lid 103 and attachment is not limited to Velcro or other releasable attachment. Distributors 137 are not limited to a bar or the configurations shown. The water inlet/outlet fitting 134 may comprise a 90° barbed slip fitting for a $5/16$" or 8 mm ID hose 136. One of skill in the art will understand that these and other dimensions given herein may be altered as long as the same functionality is rendered. Also shown in FIG. 35, the mixing chamber 120 comprises vent port 201 with vent fitting 202, nuts 133 for securing bulkhead fittings (ports) 132 to the housing front 124, potted electrical junction box 285, housing back 125, and housing support 126 that provides structural support to the assembled housing 122. Structural support 126 is not limited to the C-beam shown.

Figure 32:
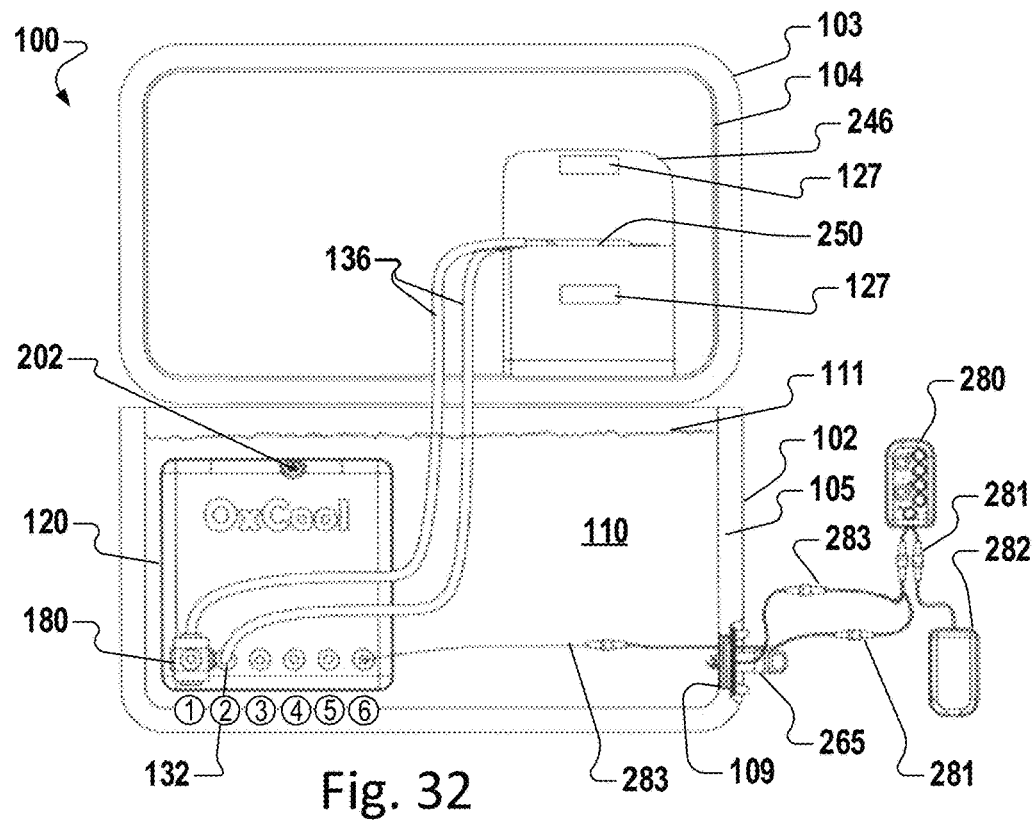
FIG. 32 is a front cut-away view of an ice chest system for dissolving gas in water using the mixing chamber, with heat exchanger and multi-port.
Figure 38:
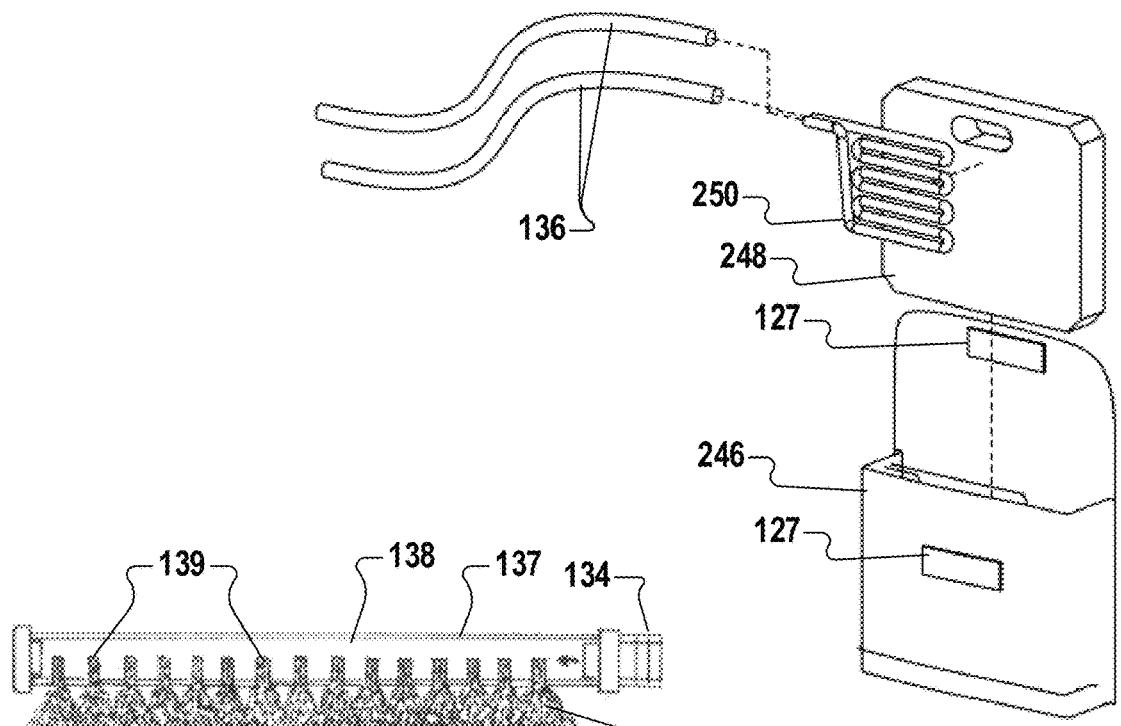
FIG. 38 is an exploded view of the heat exchanger cooling of FIGS. 32-33.

A cooling variant that utilizes a coil or heat exchanger 250 is illustrated in FIGS. 32-33 and 38. In this configuration, water 110 is sent out the second port 132 through tubing 136 to the heat exchanger 250 that is located adjacent to artificial ice 248 that cools the water 110 in the heat exchanger 250. In FIG. 33, the cooled water 110 returns via tubing 136 directly to the first port 132. In FIG. 32, a multi-port 180 is installed at the first port 132, and the cooled water 110 flows to the multi-port 180. (The multi-port will be described in FIGS. 46-50. The multi-port 180 may also be used to feed gas 210 into the first port 132.) Controller 280 determines whether the cooled water 110 at the multi-port 180 will be directed into the first port 132 or into the container 102 bypassing the first port 132. Bypass occurs when the container 102 already has enough gas-saturated water 140 and only needs cooling.

Another cooling variant that utilizes a Peltier or thermoelectric cooler 252 is illustrated in FIG. 34. The thermoelectric cooler 252 utilizes a special bung plug assembly 265 to allow its components to reside outside of the container 102 and to communicate via wiring 283, electrical connectors 281 for power source 282 (not shown) and controller 280, and tubing 136. In use, water 110 flows from the second port 132 out the bung plug assembly 265, through a closed cool loop, and back through the bung plug assembly 265 with thermocouple 253 to multi-port 180 at the first port 132. Various parts include a cold boost pump 259, hot/cold thermoelectric chips 254 connected with a digital temperature controller 256, a forced air radiator fan 257, and a hot side radiator pump 258. The hot side of the thermoelectric chip 254 has a heat sink, and the cold side has a cool water chamber. Various sensors (not shown) activate and protect the circuitry and components. Temperature controller 256 is operator-programmed based on specie requirements or the depth temperatures 34 of the waters 10 being fished, as well as power requirements, cooling capacity, and cooling time limits. The system 100 cycles on and off as needed to control the target temperature range. Conversion to Peltier cooling may be done without any need for the operator to touch or reprogram the controller 280 and without expensive, heavy, noisy, high horsepower refrigeration equipment. The thermoelectric cooler 252 has an "unlimited" cooling capacity when compared to artificial ice 248 and is useful for long-term cooling, such as overnight, provided external power is available. One of skill in the art will understand that thermoelectric cooling is known and that the present invention is not limited by this abbreviated discussion of the technology.

Figure 41:
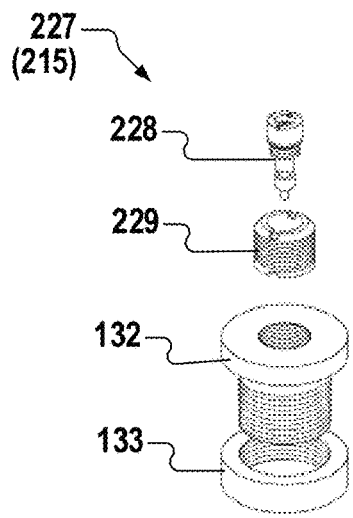
FIG. 41 is an exploded view of a check valve for introducing oxygen to the mixing chamber.
Figure 42:
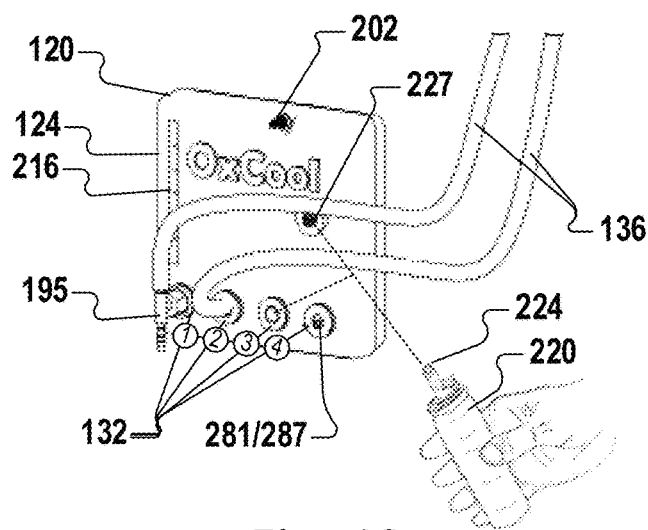
FIG. 42 illustrates a smaller mixing chamber having options for introducing gas.
Figure 43:
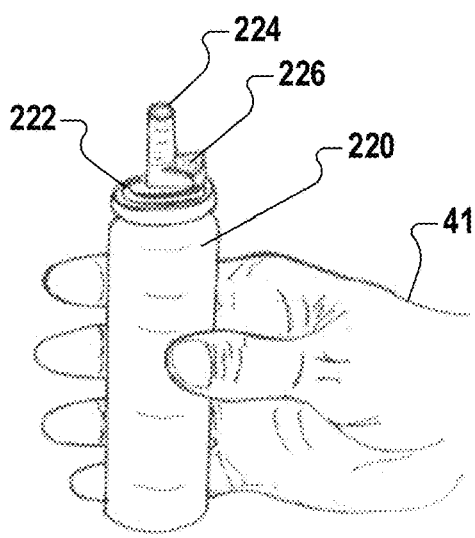
FIG. 43 illustrates a handheld disposable gas can.

An important aspect of intermediate and smaller sized configurations of the present system for dissolving gas in water 100 is that low-pressure, low-volume disposable gas cans 220, such as an aluminum canister, may be employed in place of high-pressure oxygen tanks 5 and may be sized to hold a volume of gas 210 configured for a specific container 102 size, such that one "dose" will service the container 102. FIGS. 41-43 present options for introducing said gas 210 below the water line 111 for greater safety. An additional safety benefit is that such a gas source 211 may be easily removed from the area and stored away from heat and people. In FIG. 41, a butane valve or check valve 227 for charging the mixing chamber 120 with gas 210 is a gas fill valve fitting 215 that comprises a valve 228, valve adapter 229 for bulkhead fitting port 132 that is paired with a bulkhead fitting nut 133. The assembled check valve 227 is installed as an option in FIG. 42 on a central portion of a mixing chamber 120 that is configured for a small container 102. This configuration of mixing chamber 120 may have a size of about 8"×8"×2". As with previously discussed mixing chambers 120, the housing front 124 comprises an air volume gauge 216, vent fitting 202, and cooling tubes 136 that run to a heat exchanger 250. However, there are only four ports 132. The fourth port 132 comprises an electrical connector 281 and an LED 287 light. The second port 132 sends water 140 to the heat exchanger 250 and back to a T-port or T-shaped bypass fitting 195 at the first port 132. When "on," the bypass fitting 195 allows cool water to flow to the mixing chamber 120 to cool water pump 244. When "off," the bypass fitting 195 lets the cool water 140 flow to the live well or container 102. The disposable gas can 220 may be put into the container 102 by hand 41 such that its nozzle 224 may be inserted into the third port 132 (which may be a standard water out port 132 or gas fill port 132 with or without gas fill valve 215) or inserted into check valve 227. FIG. 43 shows a low-pressure, low-volume adapter 222 that comprises the nozzle. The adapter 222 may have a push button or other operative gas release 226. The mixing chamber 120 is not limited to four or five ports 132 or to the configuration just described. Another benefit to having the mixing chamber 120 below water 110 is that leaks will be visible to the user.

Figure 44:
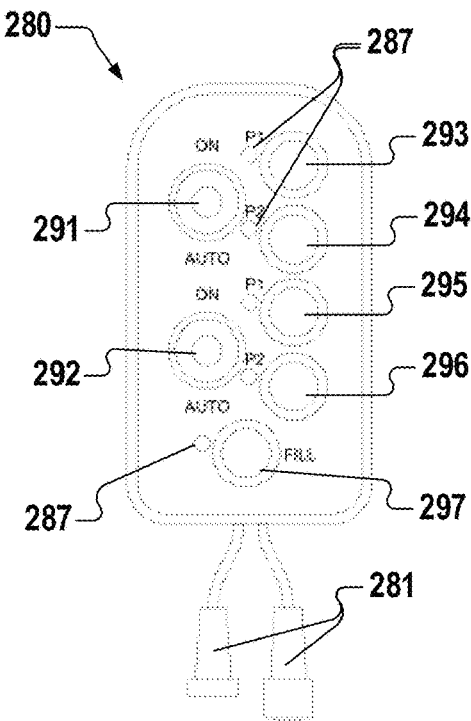
FIG. 44 is a front view of a handheld controller.
Figure 45:
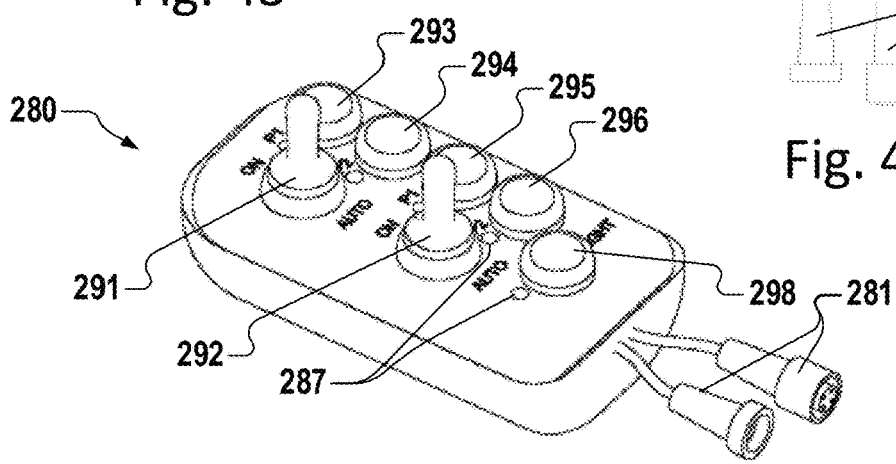
FIG. 45 is a perspective view of a controller.
Figure 46:
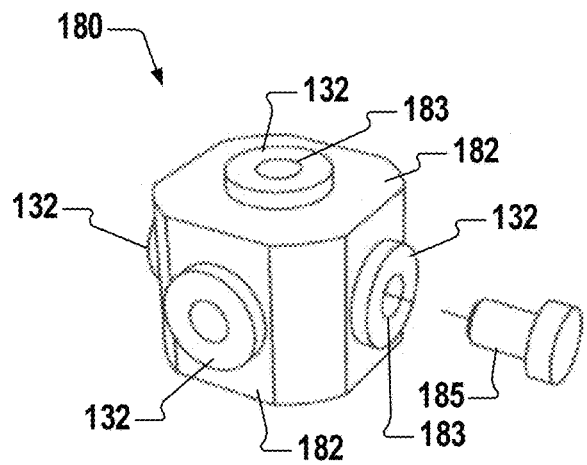
FIG. 46 is a perspective view of a multi-port.
Figure 47:
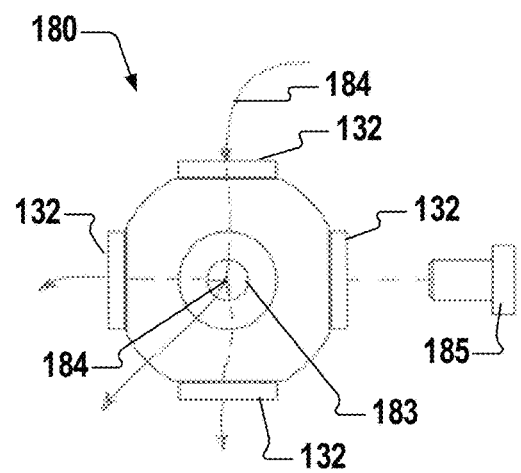
FIG. 47 is a side view of the multi-port of FIG. 46.

FIGS. 44-45 illustrate the handheld pendant controller 280 in greater detail. Two versions of the controller 280 differ in that the one for small containers 102 such as ice chests and buckets makes use of the bottommost button or light switch 298 to turn an LED 287 light on the mixing chamber 120 on and off. For boat 40 mounted systems that may not use the multi-parameter settings described below, the bottom "fill gas" switch 298 is a momentary switch that activates the mixing chamber vent/purge fitting 202 or gas fill valve fitting 215 (via "gas in" solenoid 217). Controller 280 comes with electrical connectors for wiring and power 281, as well as indicator LEDs 287 to indicate what programs the controller 280 is set to run.

On the left side of the controller 280 are two raised switches 291 and 292 that are single-pole, double-throw. On the right side of the controller are four momentary-on programming switches 293, 294, 295, 296. There are two such programming switches (P1/P2), each having a related LED 287, associated with each of the two raised switches 291, 292.

Water pump switch 291 "On" provides manual control of the water fill pump 144 for dissolving gas (manual oxygenation mode, for example).

Water pump switch 291 "Auto" gives water fill pump 144 control to electronic timers (automatic oxygenation mode). The user pushes (P1) "program gas on" switch 293 to program the gas "on" timer. The user pushes (P2) "program gas off" switch 294 to program gas "off" timer. In "Auto" mode, the controller runs the programmed P1/P2 timer cycles unless those cycles are changed.

Cooling pump switch 292 "On" provides manual control of the water cooling pump 244 for cooling the water in the container (manual cooling control mode).

Cooling pump switch 292 "Auto" gives water cooling pump 244 control to electronic timers (automatic operation mode). The user pushes (P1) "program cool on" switch 295 to program the cool "on" timer. The user pushes (P2) "program cool off" switch 296 to program the cool "off" timer. In "Auto" mode, the controller runs the programmed P1/P2 timer cycles unless those cycles are changed.

Momentary actuation of a P1 switch will adjust the "On" time by adding a pre-selected time factor for each activation of the switch. For example, if the time factor is one minute, each activation of the P1 button will add one minute of total run time. Thus, five depressions of the P1 switch equals 5 minutes run time. The P2 switch is programmed similarly, but for "Off" time after the "On" time has expired. Operation is the same for each switch group.

Program mode is entered by holding the P1/P2 switches down simultaneously while switching to the "Auto" mode of operation. Releasing P1/P2 simultaneously allows programming to begin. P1 switch is depressed the desired number of times to add up to the total number of timing units required (seconds/minutes/hours). P2 switch is depressed the desired number of times to add up to the total number of timing units required (seconds/minutes/hours). Switch the mode switch to "Off" and the timer is programmed. Switching the mode switch to "Auto" will automatically start the pumps and programmed timing events on a recurring cycle until stopped. Once programmed the unit will automatically run pump timing events at each use in the automatic mode. Removal of power will not change the programs. Time factors are pre-programmed from the factory.

The purge vent/fill switch normally is not timed, but may be. The controller 280 is not limited to the above configuration and programming. Advanced configurations may retain and use previous sounding data by hardwire or wirelessly and may include barometric pressure, barometric trend tracking, humidity, outside temperature, heat index calculations, wind and moon phase data, etc.

Figure 48:
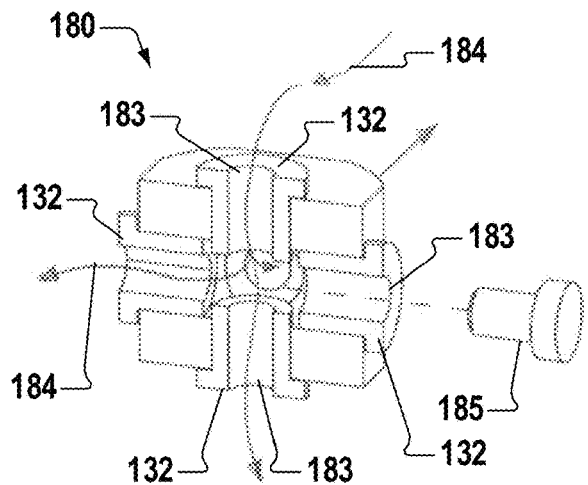
FIG. 48 is a cut-away view of fluid flow through the multi-port of FIG. 46.
Figure 49:
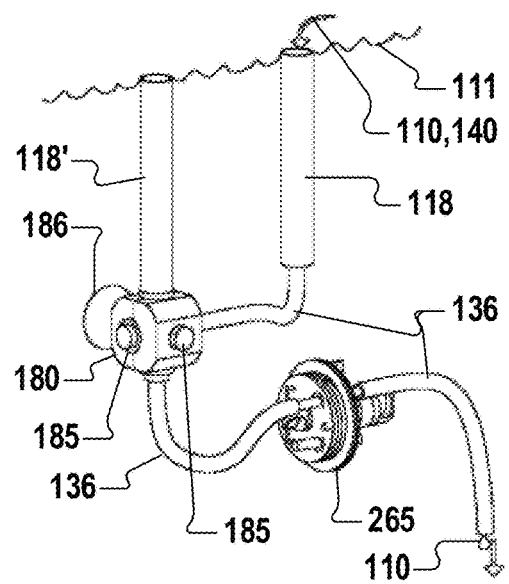
FIG. 49 is a perspective view of a multi-port installed as an overflow tube.

FIGS. 46-50 show the multi-port 180 in greater detail. The multi-port 180 is not limited to the number of faces 182 and ports 132 shown, but typically has four or more ports 132 having "joined" apertures 183 that generally allow fluid to flow 184 throughout the multi-port 180 and its various ports 132 unless cap plugs 185 or other attachments are in place to change the flow 184. The cross-section of FIG. 48 illustrates possible flow 184, which may be water or gas depending upon the application. In FIG. 49, a multi-port having six ports 132 comprises two cap plugs 185 that block flow 184, a rear-mounted suction cup 186 that blocks flow 184 and secures the multi-port 180 to a wall 105 of a container 102, tubing 136 that leads to overflow tube 118 at water level 111, vent tube 118' that helps water 110 travel down the overflow tube 118, and tubing 136 that lets water 110 flow through bung plug assembly 265.

Figure 50:
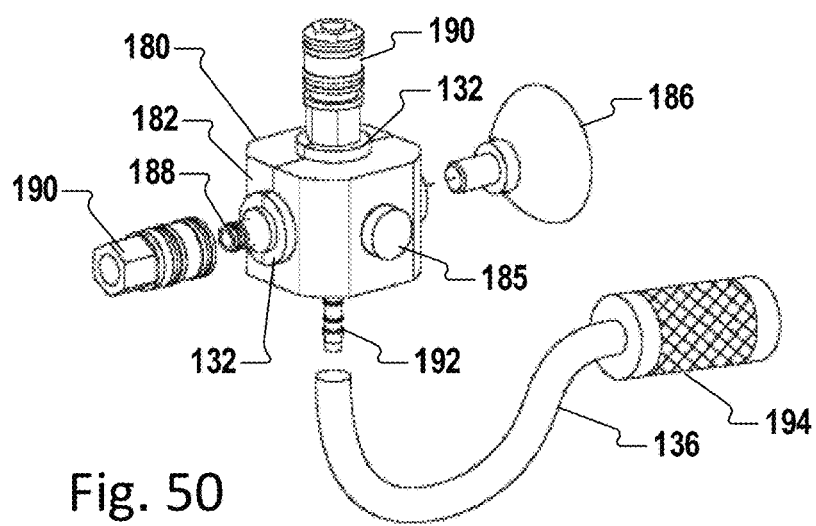
FIG. 50 is a perspective view of a multi-port with various attachments.

Alternatively, the multi-port 180 of FIG. 50 comprises at least one cap plug 185, a suction cup 186, a port 132 having a nipple 188 configured to receive a female QD valve 190, a port 132 with QD valve 190 already in place, and a hose barb 192 configured to receive tubing 136 with a filter 194. Of course, male and female fittings may be reversed. The multi-port 180 is not limited to the configurations shown, as these are only examples.

Figure 51:
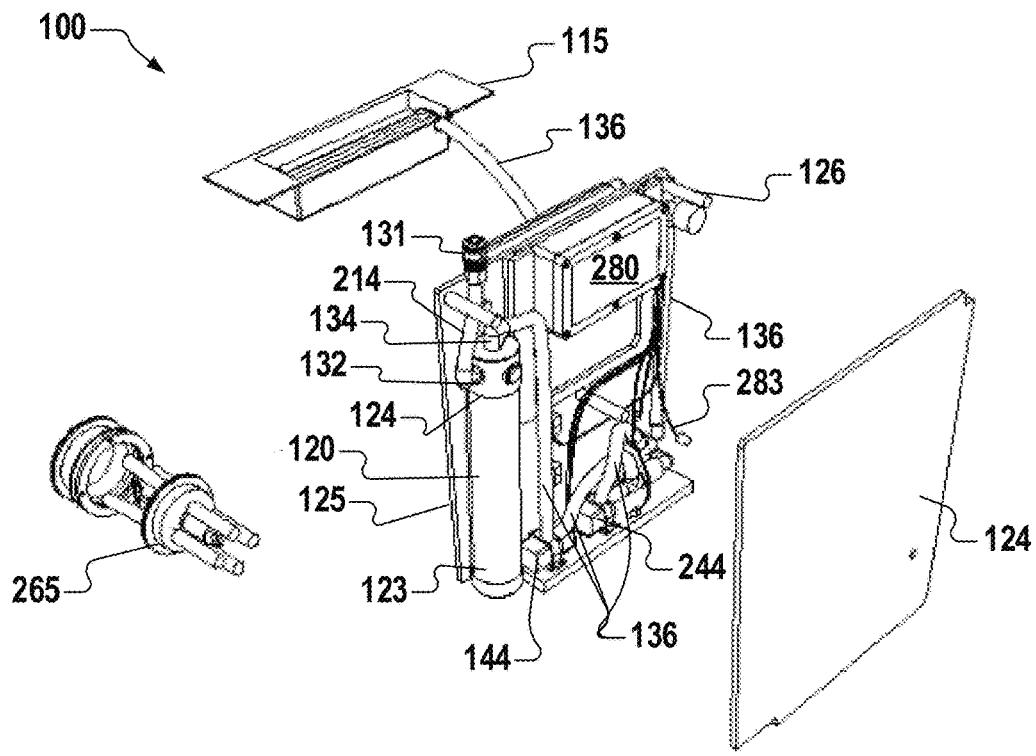
FIG. 51 is a front left perspective view of a drop-in system for an ice chest.
Figure 52:
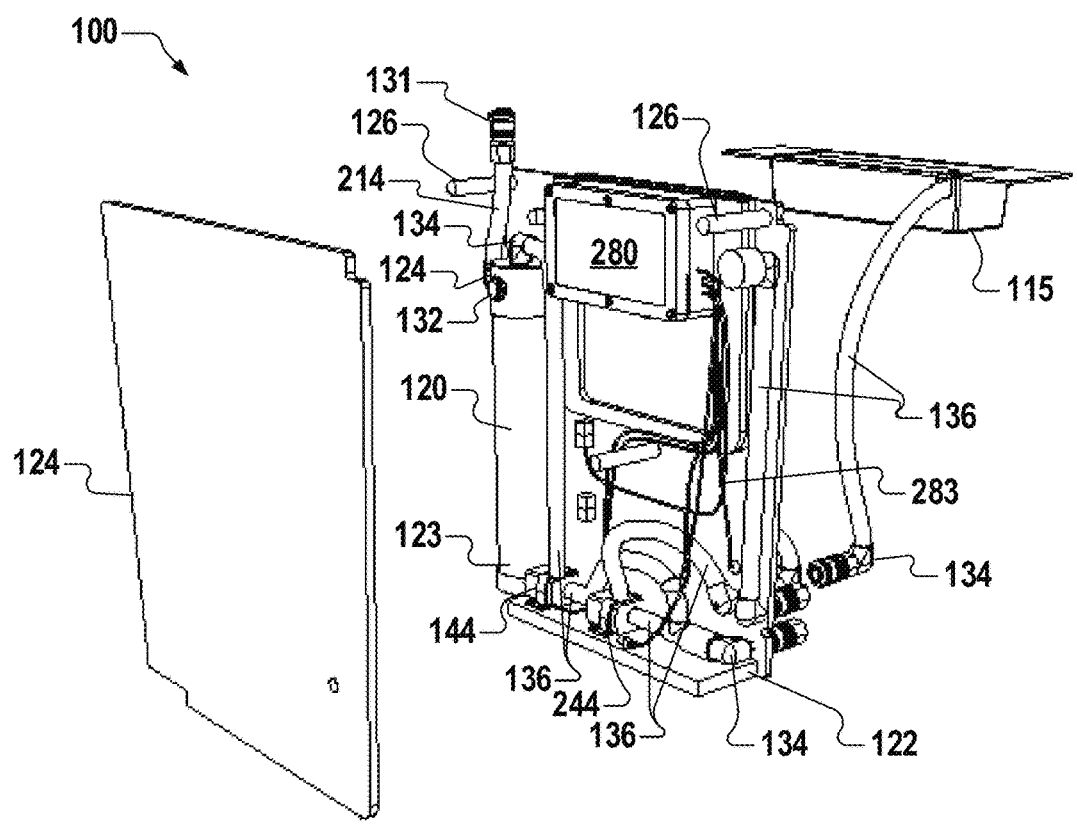
FIG. 52 is a front right perspective view of FIG. 51.
Figure 53:
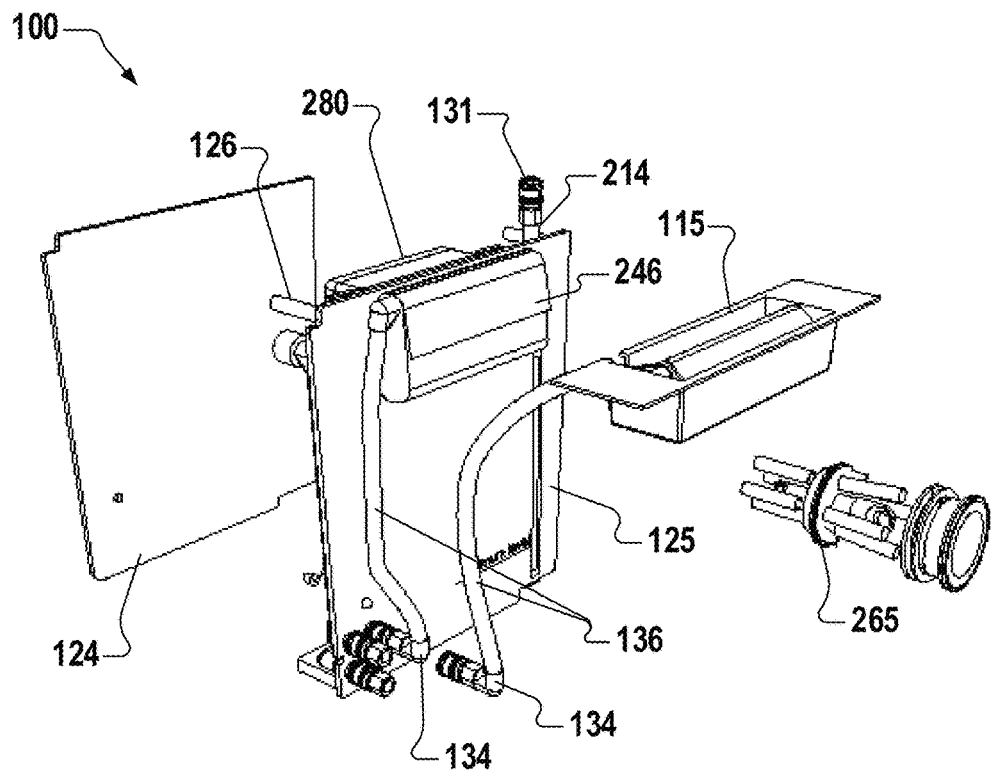
FIG. 53 is a rear perspective view of FIG. 51.

FIGS. 51-53 illustrate an earlier, less compact configuration of the system for dissolving gas in water 100 as shown in the provisional application. The novel ice chest drop-in comprises a housing 122 of plastic panels (front 124, back 125) joined by housing supports 126 to accommodate and protect the components. The housing 122 is sized to match the insert grooves inside typical ice chests. If the chest or container 102 has no groove, other attachment such as magnets or suction cups may be used, and various orientations within the ice chest are possible. Additional dividers may be added to separate different aquatic species. The system 100 may be totally self-contained within the ice chest or may reside partially outside of the ice chest via the bung plug assembly 265. Waterproof controller 280 monitors and controls the ice chest temperature and oxygenation for keeping fish 20 via wiring 283. If dividers are used, oxygenation may be adjusted for each divided area.

Water fill pump 144 draws water 110 from the ice chest or container 102 via water inlet/outlet fitting 134 and tubing 136 and provides that water 110 via water inlet/outlet fitting 134 to a small cylindrical mixing chamber 120 like the one shown in FIG. 19. Oxygen gas 210 is introduced to the mixing chamber 120 through gas inlet/outlet fitting 131 and gas line 214. Water cooling pump 244 sends water 110, 140 to ice holder 246 and, optionally, to bait tray 115. Alternatively, bait tray 115 may hold an extra ice block 248. This configuration utilizes quick disconnect fittings 130 and fill and drain systems as already discussed, as well as an optional "lid open" sensor 288 that triggers illumination within the ice chest 102, light control 298, and display 290.

Figure 54:
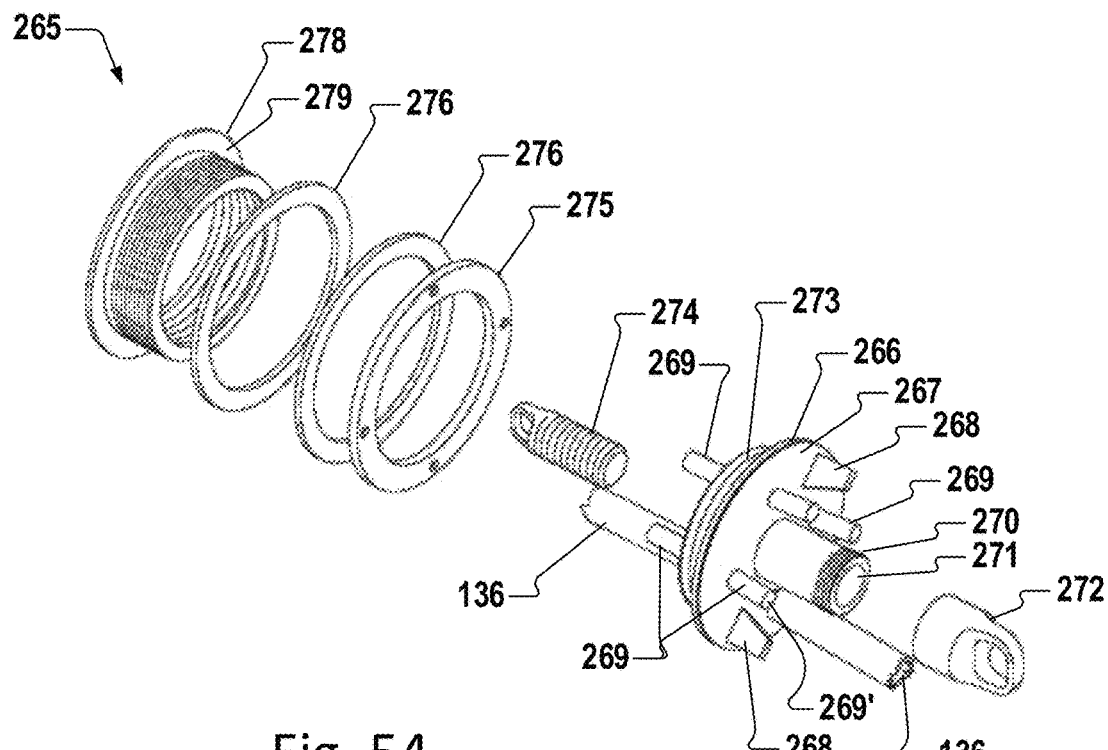
FIG. 54 is an exploded view of a bung plug assembly.

The bung plug assembly 265 of FIGS. 54-60 is novel based on its own merits. FIG. 54 illustrates a bung plug assembly 265 utilized when a hole is drilled into an existing ice chest or container 102. The outer face 267 of bung plug 266 comprises wingnut flanges 268 for tightening, ducts 269, stem 270 (essentially a bung within a bung) having stem aperture 271 and outer cap 272. The stem 270 and outer cap 272 may have cooperating threads. Ducts 269 have duct apertures 269' that allow wiring and/or fluids to pass through the bung plug 266, and the ducts 269 are often attached to tubing 136 or gas lines 214.

Inside the container 102, bung plug 266 has a threaded inner face comprising ducts 269 aligned with the ducts 269 on the outer face 267, and an inner plug 274 that may be threaded and is configured to cooperate with the stem 270. The bung plug 266 is secured to the ice chest or container 102 using round nut 275, one or more gaskets 276, and a flanged nut 278 having flange 279. One of skill in the art will understand that the bung plug assembly 265 is not limited to the configuration described, particularly the nuts, gaskets, threads, and other commonly understood elements.

Figure 55:
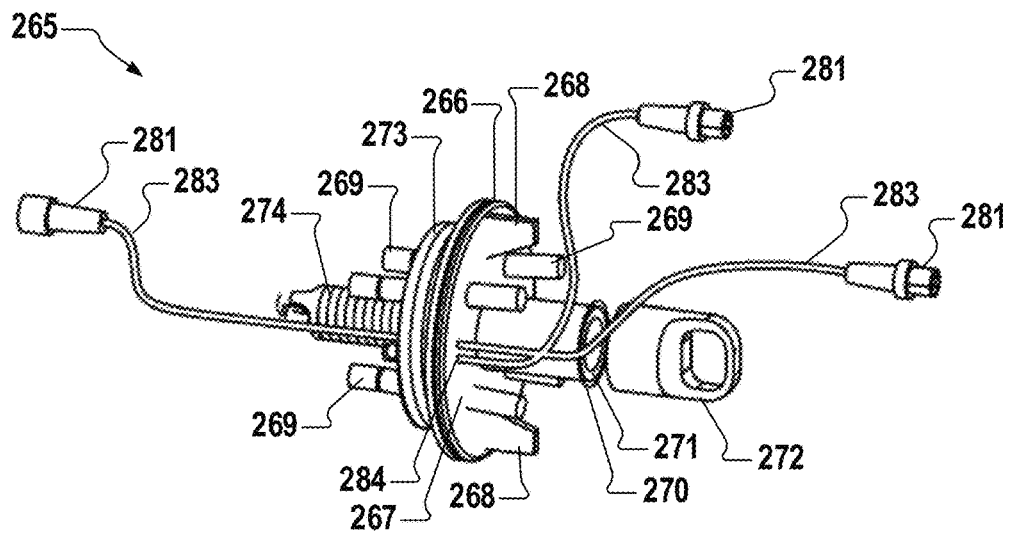
FIG. 55 is a perspective view of a bung plug assembly with wiring.
Figure 56:
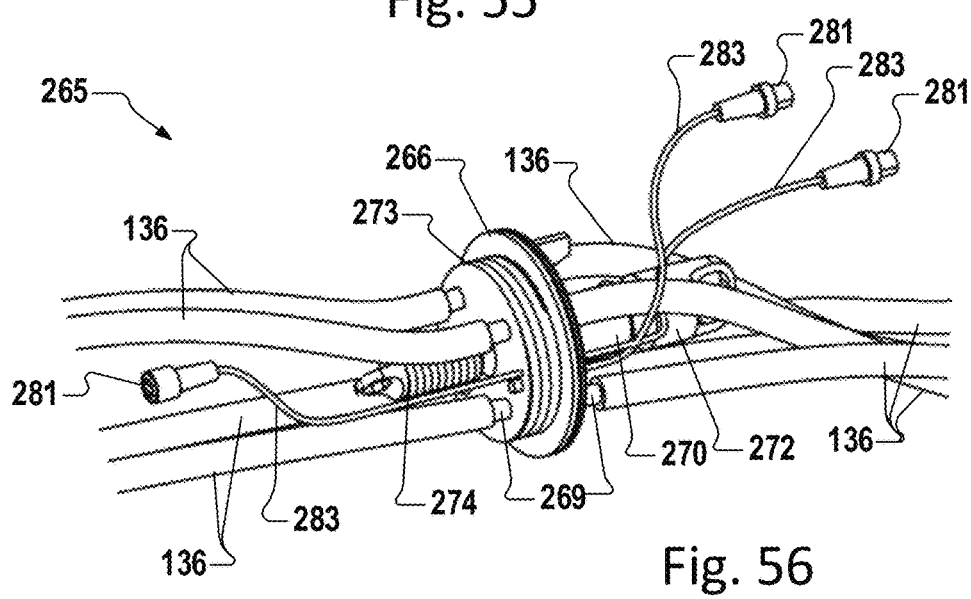
FIG. 56 is a reverse perspective view of the bung plug assembly of FIG. 55, with tubing.

FIGS. 55-60 illustrate the bung plug assembly 265 configured to fit existing bung holes of standard ice chests or containers 102. In FIG. 55, wiring 283 having M12 electric connectors 281 for power 282 and controller 280 runs through wiring apertures 284 in the outer face 267 of bung plug 266. Any apertures 269', 271, 284 in the bung plug assembly 265 may be sealed with glue or potting compound, for example, or a silicone seal that allows wires 283 to "slide" in and out. The assembly 265 is not limited to the types of seals mentioned here. FIG. 56 is a reverse view of FIG. 55.

Figure 57:
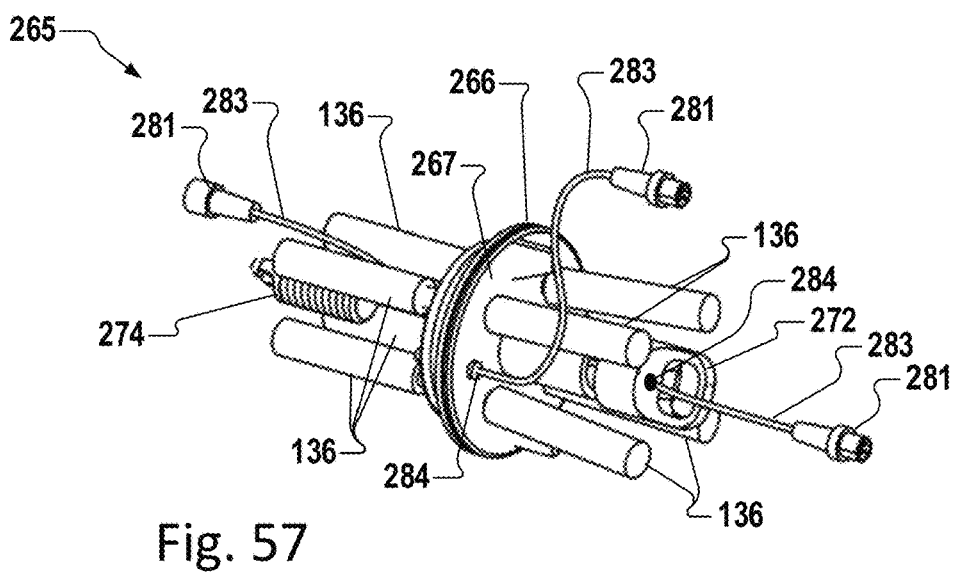
FIG. 57 is a perspective view of a bung plug assembly.
Figure 58:
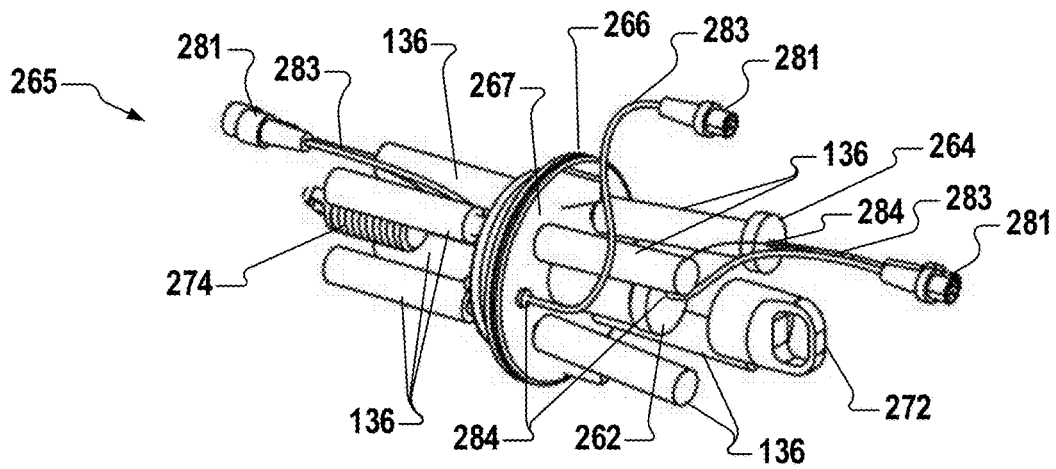
FIG. 58 is a perspective view of a bung plug assembly.
Figure 59:
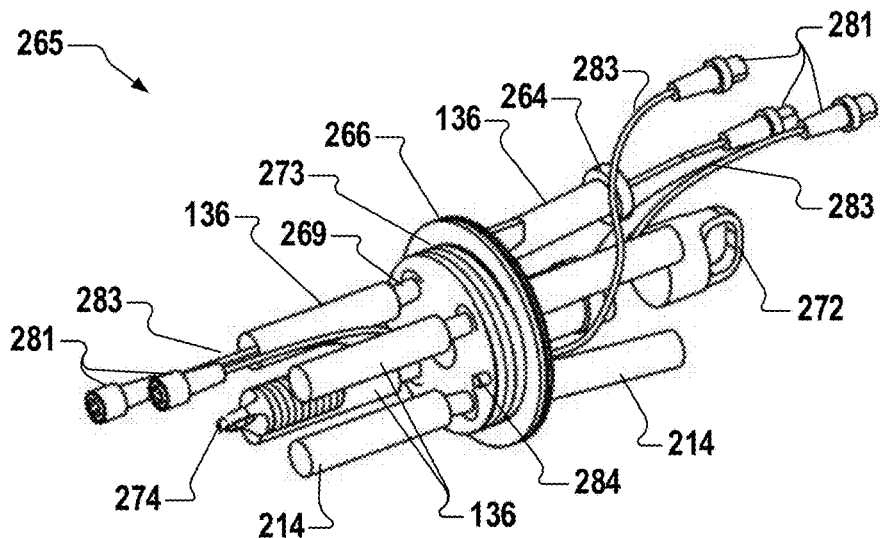
FIG. 59 is a reverse perspective view of the bung plug assembly of FIG. 58.
Figure 60:
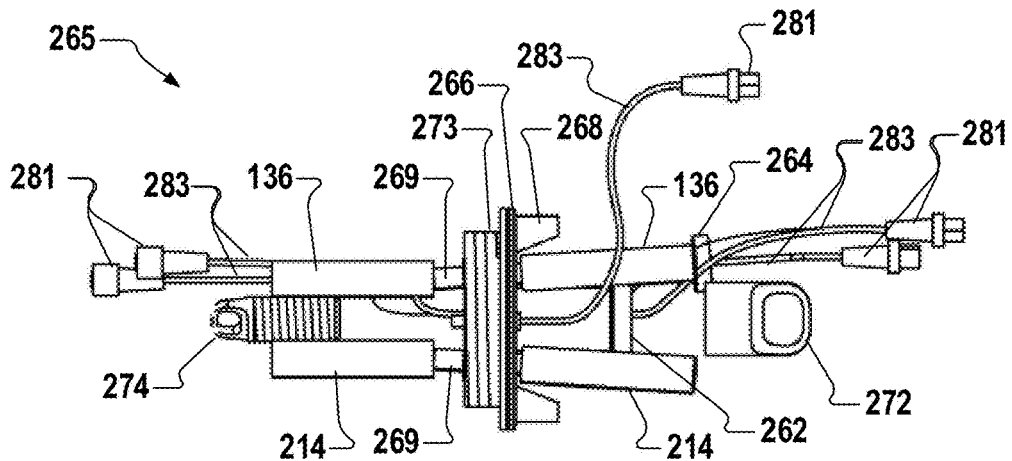
FIG. 60 is a side view of the bung plug assembly of FIG. 58.

In FIG. 57, the outer cap 272 on the stem 270 has a wiring aperture 284. Alternatively in FIG. 58, the stem 270 has an outer plug 262 comprising a wiring aperture 284. In that same figure, tubing 136 above the outer cap 272 has a grommet seal 264 (plug) with wiring aperture 284. FIG. 59 is a reverse view of FIG. 58, and FIG. 60 is the side view. The watertight bung plug assembly 265 may interface with, among other things, tubing 136 for water fill, overflow, drain, and cooling in and out; electrical wires 283; and gas lines 214. Externally mounted components may be adapted to a bag or other enclosure for safe keeping on the outside of the ice chest or container 102.

Bucket Live Well Systems

Maintaining a very high density of fish 20 in a small volume of water 110 places great demands on live well control systems. A bucket 102 may hold one large fish nose down or many smaller fish as a baitwell. The operational requirements based on any given species can vary widely. The present system for dissolving gas in water 100 is able to handle any scenario. Lively bait is the best bait, and the present invention provides the solution for transporting active bait.

Oxygenated Bucket Live Well System

FIGS. 61-67 illustrate a 5-7 gallon plastic bucket or container 102 for keeping and transporting fish 20, wherein the mixing chamber 120 is small (whether rectangular, tubular, or another shape) and preferably mounted on the outside wall 105 of the bucket 102 with most other components to allow unfettered access to the fish 20. The interior of the container 102 is configured with a retention groove or shelf 178 to hold a top ring 173 that supports a net 172 that contains the fish 20. The top ring 173 may be attached to the net 172 and comprise compression tabs 174 that allow the net 172 to be removed from the bucket 102 as an assembly. The net may further comprise a net closure 175 at the top and a bottom ring 176 to help the net 172 maintain its bucket shape. Magnets or another form of releasable ring attachment 177 at the bottom of the container 102 help to releasably anchor the bottom ring 176 to the bottom of the container 102. The rings 173, 176 may be metal, but are not limited to metal. The container itself is not limited to plastic, but may be made of other materials that are water-resistant and meet the functionality required. Outside, the bucket 102 has two-handed and/or one-handed handles 50 and 51, respectively, and may have tie-downs 51 attached by mechanical anchors 52 such as screws.

The bucket 102 has an insulated bucket blanket 230 of durable foam that resists water and mold and may include a bottom insulator 232 to provide shielding from ground heat radiating into the interior water 110, 140. The insulated bucket blanket 230 may comprise a window or opening 231 that fits around the mounted mixing chamber 120. Insulation moderates temperature and extends artificial ice 248 cooling time. A canvas or other type of bucket cover 234 may have a variety of small pouches 235 to hold a controller 280, battery or power source 282, or other items and a larger mixing chamber pouch 237 that fits over the mixing chamber 120 and has a vent access 238 opening to allow a user to easily vent the mixing chamber 120. The insulating blanket 230 and bucket cover 234 may be one or separate components. The bucket 102 may have a permanent or removable non-skid, tip-resistant base or bottom grip 179 that may be omitted for use in a kayak that provides a recess for carrying a crate or bucket 102. The insulating blanket 230 and bucket cover 234 are not limited to the materials described, but may comprise materials that deliver the same performance.

The bucket 102 has a lid 103 that may double as a removable swivel seat. The lid 103 may be a flip top or have a seal 104 (Gamma Seal®, for example) that screws on water-tight, preventing splashing and loss of water 110, 140. Prior art bucket lids 3 have ventilation slots to allow ambient air 15 to reach the water's surface 9 to transfer oxygen, thus preventing a sealed lid 3. One improvement of the present invention is that seal 104 allows a traditionally wet, messy, smelly transport of bait to be performed with absolute security and without damage from saltwater. Additionally, the seal 104 traps cooling energy and increases the useful life of artificial ice 248. In any other bait bucket, this seal 104 would be deadly to bait fish 20 because the only additional oxygen available would be ambient air 15, and the bait would suffocate in short order. Under the lid 103 and/or seal 104 a block of artificial ice 248 may be suspended via Velcro or other releasable attachment 127. Any time Velcro is used, it comprises both hook and loop strips. A spray bar or other distributor 137 is configured to direct water 110, 140 from the mixing chamber 120 to the artificial ice 248. When a seat is used to cover the bucket 102, the interior seal 104 portion may be removed for easier bucket 102 access, and the artificial ice 248 may be removed from under the lid 103 and transferred to under the swivel seat using the same removable attachment 127. The seat/second lid 103 then resides over an indexed flange mount (not shown) to provide proper seat/lid 103 location for the spray bar and proximity sensor or "lid open" sensor 288 alignment.

Figure 63:
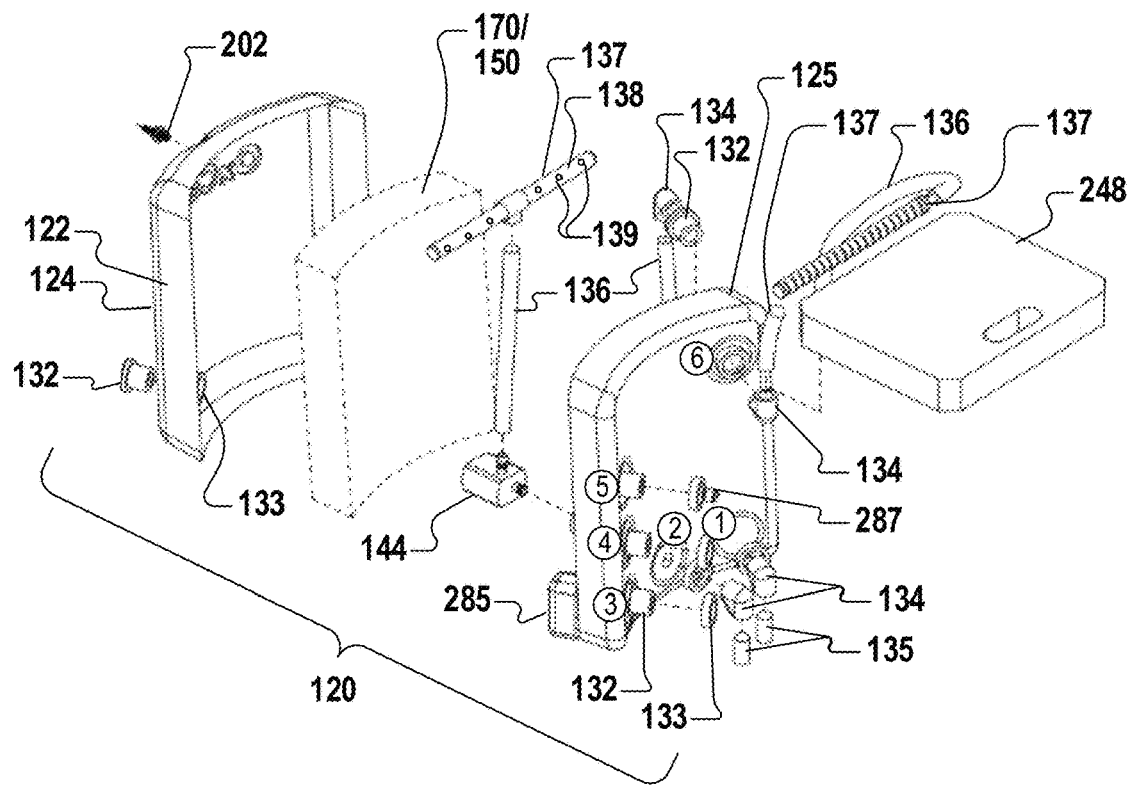
FIG. 63 is a rear exploded view of the mixing chamber of FIG. 61.
Figure 64:
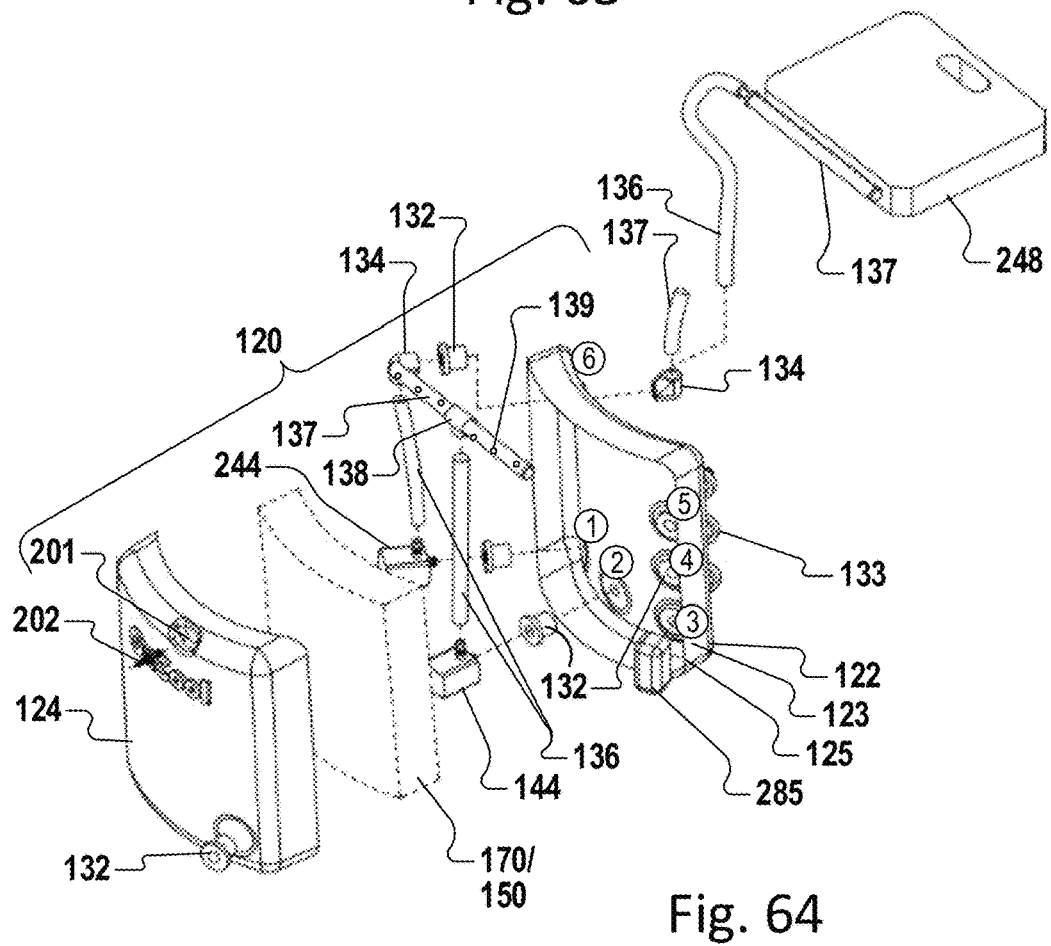
FIG. 64 is a front exploded view of the mixing chamber of FIG. 62.

The mixing chamber 120 for a bucket container 102 is detailed in FIGS. 63-64. Housing 122 comprises a housing front 124 with vent port 201 and vent fitting 202 and a housing back 125 that is shaped to fit the curvature of the container 102. A port 132 secured by a nut 133 on the housing front 124 is configured for wire 283 that runs outside the mixing chamber 120 to the controller 280 and power source 282 for powered configurations. On the housing back 125, ports 132 and nuts 133 secure the mixing chamber 120 to the bucket 102. The fourth port 132 is for gas 210 charging. In this small container 102, a single charge might last an entire weekend for fishing.

Water fill pump 144 pulls water 110 from the bucket 102 through water inlet/outlet fitting 134 through filter 135 and the second port 132 at the lower portion 123 of the housing 122. The water 110 is sent up a feed tube or tubing 136 to a single mist or spray bar or distributor 137 having walls 138 with distributor apertures 139 that direct the water 110 toward mixing medium 170. Gas-saturated water 140 exits the mixing chamber 120 through the fourth port 132 and returns to the container 102. Cooling water pump 244 pulls water 110, 140 from the container 102 through water inlet/outlet fitting 134 through filter 135 and the first port 132, then sends the water 110, 140 through tubing 136, two water inlet/outlets 134 at the sixth port 132 to a spray bar distributor 137 inside the bucket 102 such that the sprayed water 110, 140 is directed onto the artificial ice 248 under the lid 103. Alternatively, a short piece of tubing 136 inside the container 102 may act as a spray tube or distributor 137 and the spray bar omitted. Thus, the water 110, 140 in the container 102 is cooled. Generally, the configurations of the present invention are not limited to one or two spray bars for distributors 137.

The foregoing is an obvious improvement over prior art buckets 2 having a battery powered diaphragm pump 5 that creates heat as it pumps ambient air 15 into the bucket bottom via a hose 7 and air bubbler stone 12.

Junction box 285 pairs with the third port 132 for optional placement of the controller 280 and power source 282 (battery) inside the container 102. The fifth port 132 also comprises an LED 287 light to illuminate the interior of the container 102. This LED 287 and others, such as a line-illuminating light at the lid 103, may be controlled by sensors 288 that indicate "lid open," for example. Power adapters or sources 282 may include battery packs, cigarette lighter adapters, 220 VAC/110 VAC 12 VDC adapters, and battery clip adapters.

FIGS. 65-67 present an earlier, less compact configuration of the bucket-sized system for dissolving gas in water 100 as described in the provisional application. Parts correspond to the bucket configuration discussed above in the same way that the earlier ice chest configuration corresponds to the more compact ice chest configuration described herein. The primary difference in the earlier configuration of the bucket system 100 of FIGS. 65-67 is that the gas source 211 with regulator 212 and gas line 214 feeds to the top of the small cylindrical mixing chamber 120 of FIG. 19, and lower portion 123 of the mixing chamber housing 122 is not directly open to the container 102. Gas-saturated water 140 flowing from the mixing chamber 120 is required to travel up a hose to the bucket 102 in order to maintain a hydraulic vacuum lock in the mixing chamber 120 to prevent loss of gas 210. A disposable gas can 220 without regulator is an attractive option for any bucket configuration.

In practice, the lid 103 is removed and bait shop live well or native water 110 is added to the bucket 102. Artificial ice 248 is installed under the lid 103. (In another configuration, artificial ice 248 may be installed at the bucket's exterior wall 105 adjacent to a heat exchanger 250 that cools circulating water 110, 140.) The net 172 is installed with the weighted or releasably attachable bottom ring 176 placed at the bottom of the bucket 102 and the top ring 173 set in its groove or shelf 178. The optional cooling spray bar distributor 137 is installed. The controller 280 is programmed with temperatures and oxygenation levels and activated. Bubble-less water 140 issues. Bait fish 20 are placed in the container 102. The lid 103 with artificial ice 248 is sealed to be water- and air-tight. Upon arrival at the fishing destination the bucket 102 is placed in a shaded spot, if possible, and the lid 103 is removed so the user may transfer the artificial ice 248 to a swivel seat lid 103 if desired. The bucket 102 is always covered, except when removing bait or partially replacing water 110 to eliminate toxic ammonia buildup. Removal of the lid 103 activates the night light LED 287 at the bottom of the container 102 for easy viewing. Various LED 287 placements are viable for convenient, line-illuminating night light, including between the user's legs while seated, whether automatically or manually activated. Similar to the ice chest version, the bucket 102 can be manually drained or power drained. A benefit of power draining is that the mixing chamber 120 will remain charged with gas 210. Alternatively, an inexpensive configuration may allow for manual filling with gas 210 and manual pumping of water 110, 140 in lieu of a controller 280.

Boat Live Wells

Figure 68:
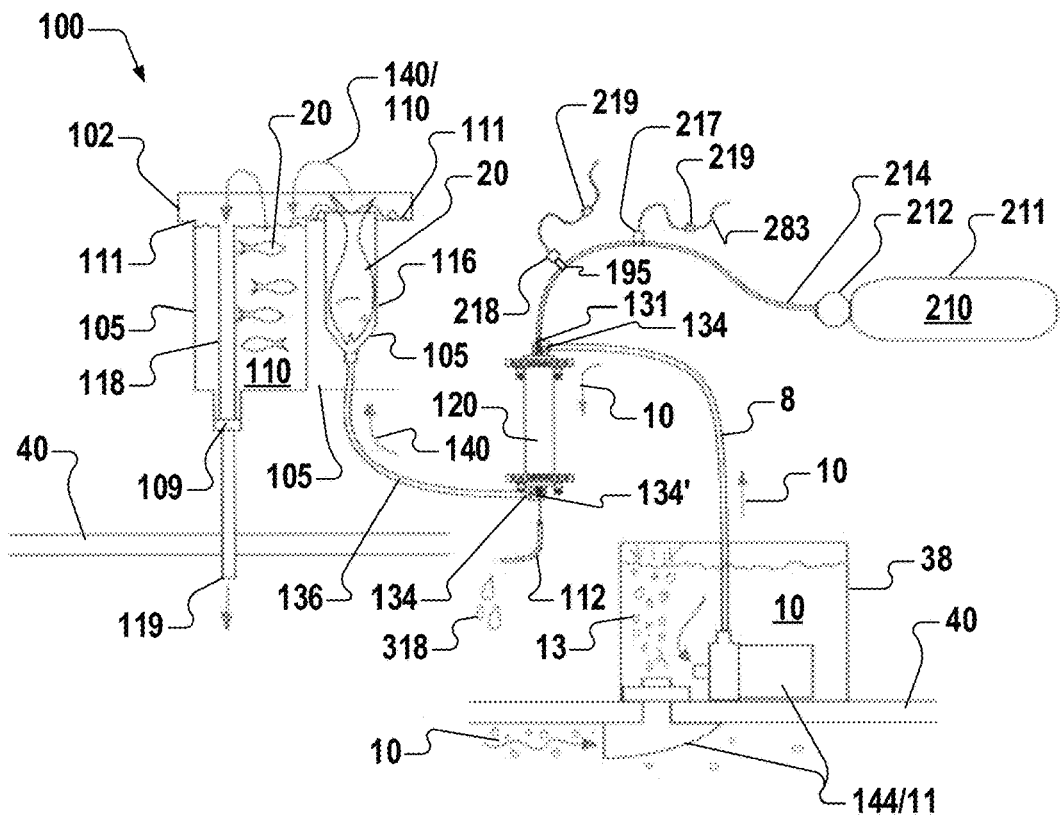
FIG. 68 illustrates a flow-thru system for dissolving oxygen in water in a big boat.
Figure 69:
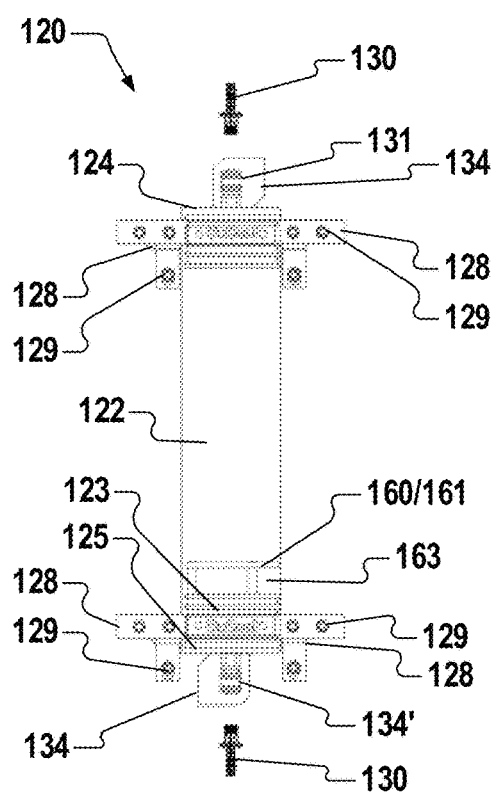
FIG. 69 is a front view of the cylindrical mixing chamber of FIG. 7.
Figure 70:
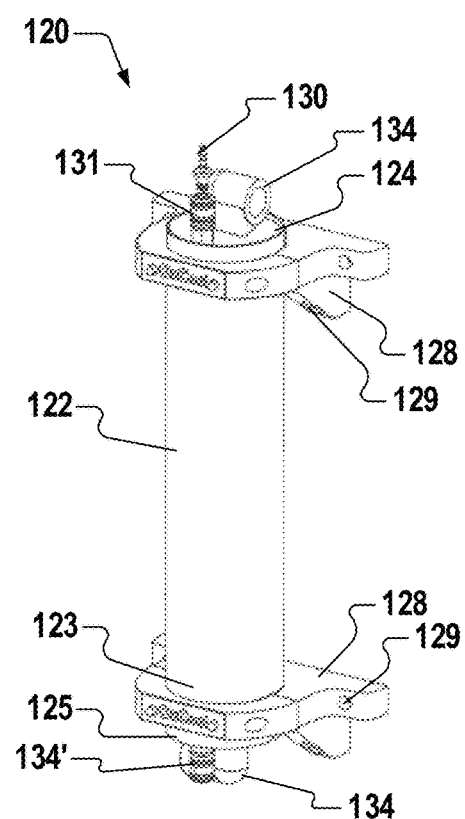
FIG. 70 is a perspective view of the mixing chamber of FIG. 69.
Figure 71:
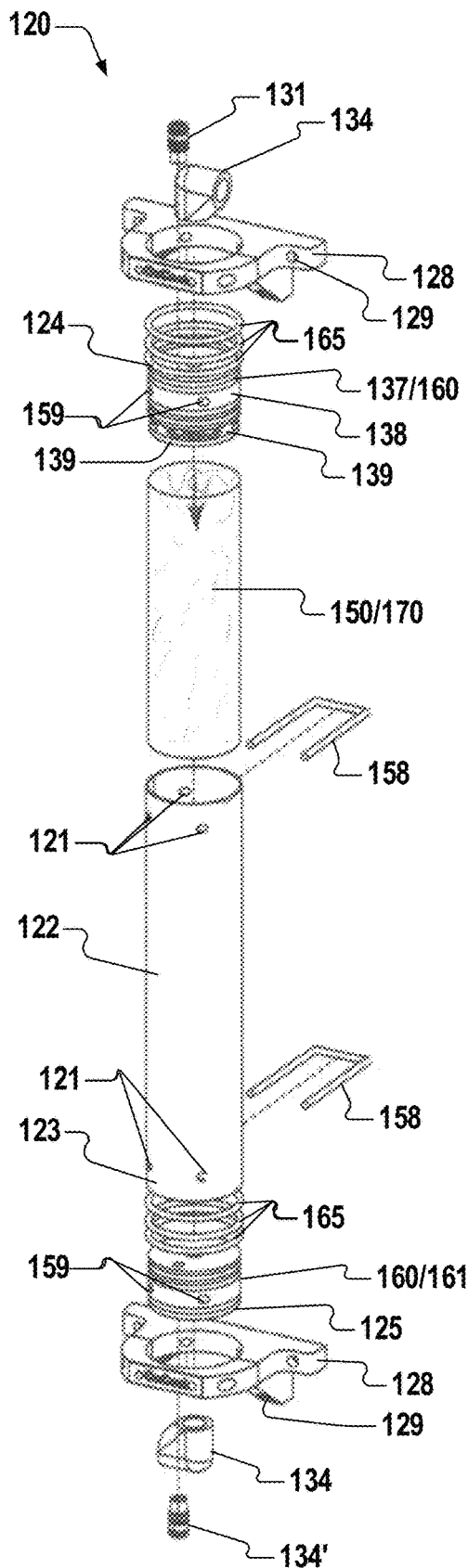
FIG. 71 is an exploded view of the mixing chamber of FIG. 69 with mixing medium added.
Figure 72:
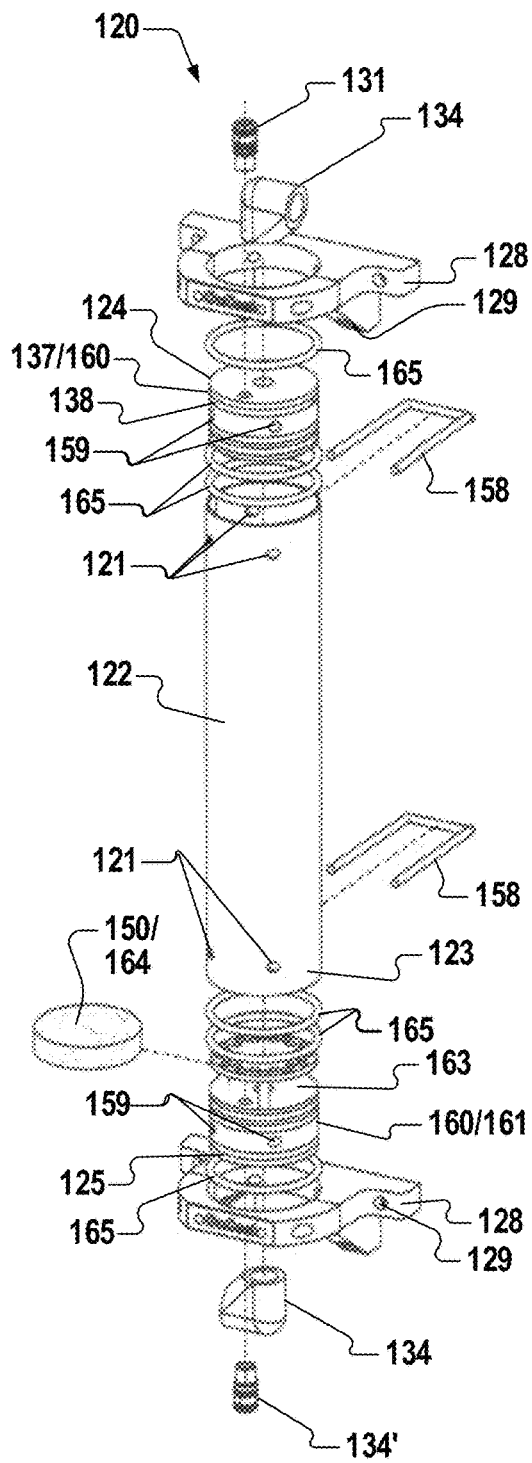
FIG. 72 is an exploded view of the mixing chamber of FIG. 69 with impingement medium added.
Figure 73:
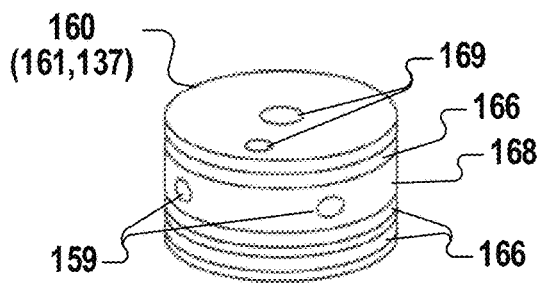
FIG. 73 is a perspective view of a diverter plug.

For boats such as the ones that will be described in FIGS. 68 and 79, the perfect live well container 102 is padded and dark, at the same temperature 34 as the depth 36 at which the fish was caught, with no current flow, zero physical obstructions, simple shapes, rounded corners, smooth edges, no in-water electrical noise, limited physical noise, and reasonable water volume for protection in rough water. Additionally, the live well 102 would be protected when the boat 40 travels on plane and its pump intake 11 is out of the water 10, so the in-well temperature 34 does not rise and rapidly deplete oxygen levels.

The present invention delivers a system for dissolving gas (oxygen) in water 100 that may integrate with existing boat designs and angler behavior. The controller 280 minimizes the physical complexity of boat systems, including current and future interfaces to on-board sensors, switches, and multi-functional displays 290. The intelligent controller 280 allows for fewer pumps and plumbing lines while managing multiple live wells 102, and a system-wide framework allows the manufacturer to lower overall cost via rapid assembly, installation, and activation. An equally attractive, easy retrofit installation system 100 allows older boating systems to be upgraded to the same new technology. The system 100 can be remotely controlled and maintained via a multi-functional display 290 that may be located or mirrored on a website, smart phone, tablet, and/or computer communicating via wired or wireless technologies to inform the angler of changes and provide video of the live well 102 in real-time.

Multi-chamber Oxygenation System

Turning to FIGS. 68-78, the system for dissolving gas in water 100 is illustrated as applied to a big boat 40 flow-through system that uses oxygen gas 210 to preserve fish 20. A water fill pump with intake 144/11 on the hull of the boat 40 draws water 10 into a sea chest 38 at a rate of 2,500 GPH, for example, causing bubbles 13 of ambient air 15 and other gases. The water 10 is pumped through water hose 8 that is part of the boat's existing system through the water inlet/outlet fitting 134 on a large cylindrical mixing chamber 120 as described in FIGS. 7-17. The mixing chamber 120 is filled with water 10. "On" switch 219 installed on a bypass T-fitting 195 off of gas line 214 is normally closed, but switches on momentarily to activate vent/purge solenoid 218 to clear the mixing chamber 120 of ambient air 15 and other gases via gas inlet/outlet fitting 131. Then a second "On" switch 219 momentarily activates "gas in" solenoid 217 causing gas 210 to flow from gas source 211 and regulator 212 through the gas line 214 and gas inlet/outlet fitting 131 to deliver a volume of gas 210 to the mixing chamber 120. A single charge may be sufficient to provide enough oxygen 210 for any loading of fish 20, for long periods of time. Water fill pump with intake 144/11 pumps water 10 through the gas in the mixing chamber 120, in this instance usually without a mixing medium 170. This process may repeat frequently, regularly pushing gas-saturated water 140 out water inlet/outlet fitting 134 through tubing 136 and into container 102 at, for example, the nose of a tuna tube 116. Cooling methods such as thermoelectric cooler 252 are employed as described elsewhere in this specification, and any resultant heat is vented out of the boat 40. In this way, the valuable fish 20 is preserved. The tuna tube 116 water level 111 is higher than the water level 111 of the part of the container 102 holding smaller fish 20, so water 140, 110 spills over to those fish 20. Overflow tube 118 allows water 140, 110 to escape through drain hole 109 and the boat drain 119 as freshly oxygenated water 140 is sent to the container 102. When desired, the user may drain the mixing chamber 318 via a mixing chamber drain line 112 attached to the water drain fitting 134'.

FIGS. 69-72 provide more detail on the configuration of this cylindrical mixing chamber 120. A housing 122 has housing mounts 128 at top and bottom. The housing mounts 128 comprise apertures 129 for attaching the mixing chamber 120 to a boat 40 or other structure. The housing top 124 may be the top of a diverter plug 160 (see FIGS. 73-78) inserted into the top housing mount 128 and sealed with an O-ring 165 in a groove 166 in the diverter plug 160, which is then inserted into the housing 122 tube with two additional O-rings 165 in two grooves 166 and secured by a U-shaped or other bolt 158 through housing apertures 121 and bolt apertures 169 in the diverter plug. Mixing medium 170 may or may not be used. In this position diverter plug 160 serves as a distributor 137 to direct water 110 into the mixing chamber 120 from water inlet/outlet 134. Gas 210 may enter through gas inlet/outlet fitting 131 that usually is a QD valve. The diverter plug 160 is the housing top 124.

Likewise, at the bottom portion of the housing 123, a second diverter plug 160 is inserted into the housing 122 tube and sealed with two O-rings 165 in two grooves 166 in the diverter plug 160 and secured by a U-shaped or other bolt 158 through housing apertures 121 and bolt apertures 169 in the diverter plug. The bottom 125 of the diverter plug 160 is inserted into the lower housing mount 128 and sealed with an O-ring 165 in a groove 166 in the diverter plug 160. In this position diverter plug 160 serves as an impingement plug 161 that may have a bubble trap 163 and an impingement medium 164 to retain bubbles 13 of gas 210 in the mixing chamber 120. Gas-saturated water 140 may exit the water inlet/outlet fitting 134 into container 102, and water drain fitting 134' is a QD fitting that may be used to drain the mixing chamber 318. The diverter plug 160 is the housing bottom 125. One of skill in the art will appreciate the streamlined design of the mixing chamber 120 and understand that the mixing chamber 120 is not limited to this design. For example, a housing mount 128 may be formed with or incorporate features of a diverter plug 160. The mixing chamber may be about 4" diameter×19" long, but is not limited to that size. Many variations may be made with similar performance and/or for different desired performance, all delivering gas-saturated water 140 that is substantially or totally free of bubbles 13.

Figure 74:
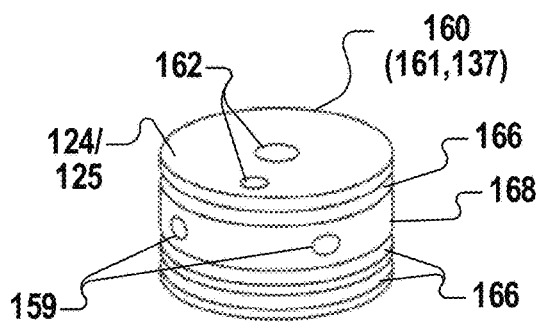
FIG. 74 is a bottom perspective view of the diverter plug of FIG. 73.
Figure 75:
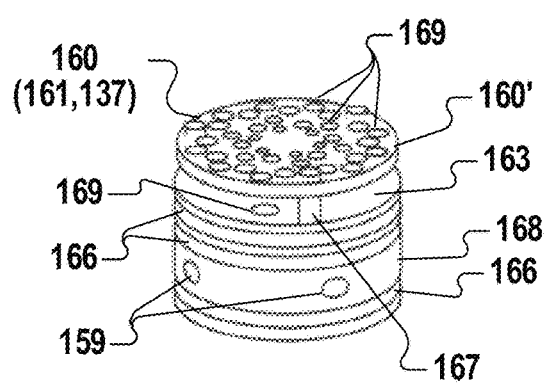
FIG. 75 is a perspective view of a diverter plug.
Figure 76:
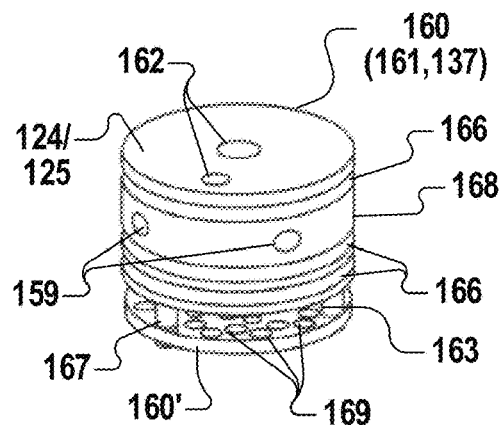
FIG. 76 is a bottom perspective view of the diverter plug of FIG. 75.
Figure 77:
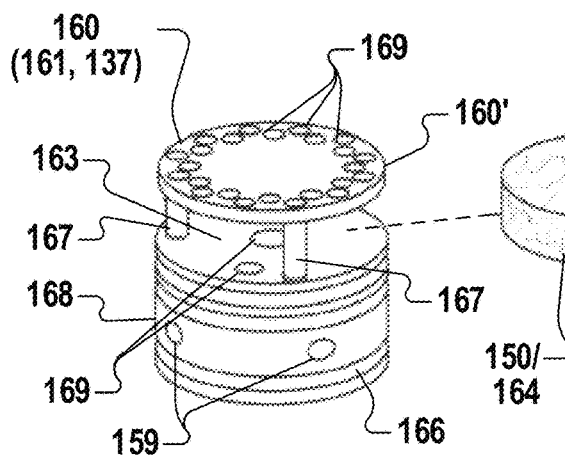
FIG. 77 is a perspective view of a diverter plug.
Figure 78:
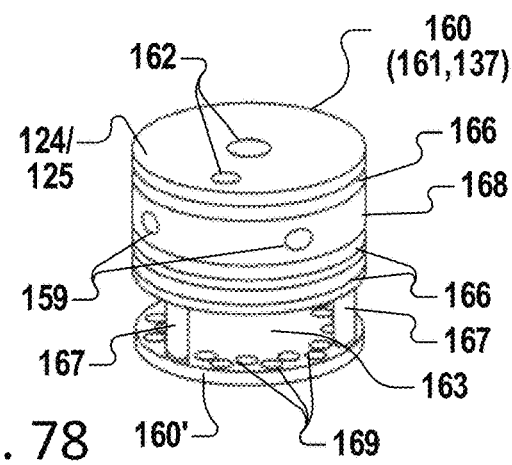
FIG. 78 is a bottom perspective view of the diverter plug of FIG. 77.

Diverter plugs 160 may come in far more varieties than those shown in FIGS. 73-78, but in general each may function as a distributor 137 or an impingement plug 161 depending on its orientation in the mixing chamber 120. The plug wall 168 usually has bolt apertures passing 159 through and grooves 166 etched around for use as described. As shown in FIGS. 74, 76, and 78 the mounting apertures 162 for gas and/or water inlet outlet fittings, 131, 134 will always be at the housing top 124 or housing bottom 125. When the diverter plug 160 of FIG. 76 is installed at the top, with its diverter plate 160' separated from the rest of the plug by spacers 167 has apertures 169 that will direct water 110 as a distributor 137 from a water inlet/outlet fitting 134 and into the mixing chamber 120. When the same diverter plug 160 is flipped vertically to resemble FIG. 75 and is installed at the housing bottom 125, then the diverter plate 160' acts as an impingement plug 161 and holds bubbles 13 as a bubble trap 163 so they do not pass out of the water inlet/outlet fitting 134 and into the container 102, yet water 140 can pass. The same is true for FIGS. 78 and 77, but an impingement medium 164 that is a multi-strand matrix 150 may be added to enhance the bubble trap 163. Rigid materials such as PVC, carbon, and other durable materials are favored for this use as diverter plugs 160, so they survive saltwater and provide strength to the mixing chamber 120. Workable materials allow for easy configuration of various spacers 167, apertures 169, 159, plates 160', etc., which are not limited to the configurations provided herein. One diverter plug 160 does not have to serve multiple functions.

In use, the operator activates the system 100, and the pressure relief or vent/purge solenoid 218 is opened by the computer or controller 280 to purge air 304 by the rising water 110 in the mixing chamber 120. Source water 10 is pumped into the live well 302 to displace as much air 15 as possible from both chambers 102, 120. When the controller 280 senses maximum water fill, it deactivates the water pump 11/146, closes the vent/purge solenoid 218, and opens the oxygen "gas in" solenoid 217 via a preset pressure device to provide a slow fill of gas to the oxygenation mixing chamber 306. This is a filling, a constant pressure, not a flow of oxygen 210 through the mixing chamber 120.

Pure oxygen 210 displaces water 110 from the mixing chamber 120, which causes the live well container 102 to overflow into the source waters 10. A maximum oxygen gas 210 volume is set by a sensor (not shown) that senses loss of water 110 presence and deactivates the oxygen flow 308. Oxygenated 140 and main live well water 110 may be exchanged by natural movement of water 140, 110 thru several flow-thru grates and/or ports 132 in a common wall, typically at a lower portion of the housing 123, and a water fill pump 144 may more rapidly allow the dissolved oxygen transfer 310 to the main live well 102. The recirculation water fill pump 144 sprays into the oxygenation mixing chamber 120, creating thin streams of water 110 exposed to a pure-oxygen 210 environment under water weight pressure from the main live well 102, significantly increasing the oxygen gas 210 to solution 110 rate of uptake. The mixing chamber 120 will always remain at a higher static air pressure than the surface 111 of the main live well 102, allowing eventual 100%+ dissolved oxygen container 102 capacity without pump assist, saving a significant amount of power, and providing a substantially bubble-free methodology of gas transfer to the water 300. As the cycle is repeated, the mixing chamber 120 concurrently oxygenates and strips nitrogen and $CO_2$ from the water 110, 140 for venting. When needed, a "mini-cycle" of the system 100 (see FIG. 27, block 320) is often able to infuse sufficient oxygen 210, without referencing rates and look-up tables.

To drain the live well container 102, the operator starts the water fill pump 144 and slowly vents the oxygen gas 210 from the mixing chamber 120 so water 110 displaces oxygen gas 210 at ambient pressure out the vented port fitting 202. When maximum water presence is sensed, the water fill pump 144 pulls the water out of the live well(s) 316, and a vacuum is formed in the mixing chamber 120 to draw ambient air 15 in and dilute any residual oxygen 210 at safe levels. A sensor informs the controller 280 to shut all systems off, and the mixing chamber may be drained 318.

Tournament Fishing System

Figure 79:
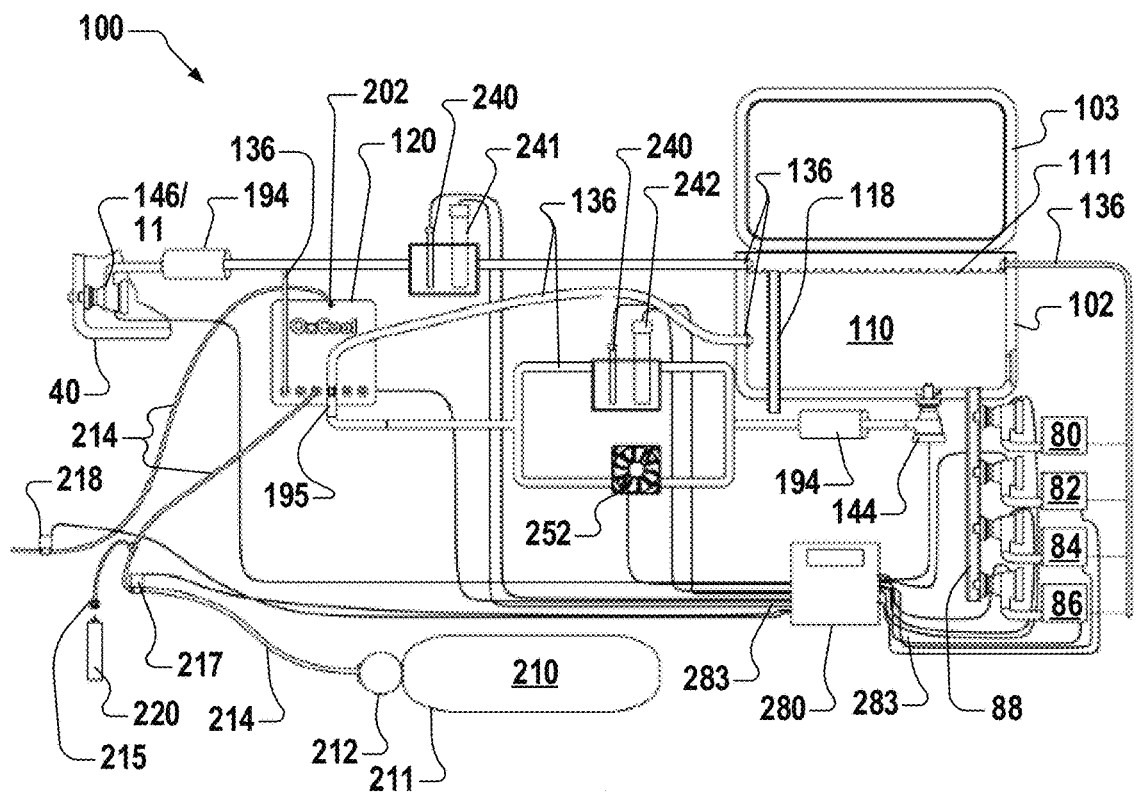
FIG. 79 illustrates a system for dissolving oxygen in water in a tournament fishing boat.

FIG. 79 illustrates a flow-thru live well system for dissolving gas in water 100 configured for use by professional anglers and guides that includes a conductivity probe or salinity sensor 241 (salinity is measured by conductivity, for saltwater use only) and a digital oxygen probe or sensor 242. DO sensor 242 is a low-maintenance design that senses a "voltage equivalent" of dissolved oxygen content and requires calibration only once a year. A microprocessor translates these voltages to a look-up table and compares this table to the temperature 34 of the live well water 110, 140, displaying all sensor levels in real time 290.

A multi-parameter controller 280 monitors and controls (FIG. 27, block 380) sensors and pumps/relays via plentiful wiring 283 or wirelessly. The mixing chamber 120 may be centrally located and shared thru valve switching with multiple containers 102, though only one is illustrated here. Each container 120 would have a water volume sensor and a dedicated pump to move its water 110, 140. The controller 280 may select a container 102 to monitor with its sensors for a short period of time before moving to another container 102.

The boat 40 transom may have a water pump with intake 11 at the surface or a thermocline pump 146 to pull water 10 from an optimum depth. Water 10 is pumped for a fixed period of time through filter 194 and tubing 136 to fill the live well or container 102 having lid 103. The incoming water 10 passes a temperature sensor 240 and a salinity sensor 241. Water fill pump 144 is a recirculation pump that pulls water 110, 140 from the container 102 to feed all of the devices monitored. Vent solenoid 218 on a gas line 214 from the vent fitting 202 on the mixing chamber 120 is activated for a fixed time to flood the mixing chamber 302 and vent ambient air 304. After the vent solenoid 218 closes, the oxygen "gas in" solenoid 217 on gas line 214 to the third port 132 is activated for a fixed time to allow the mixing chamber 120 to be fully charged with gas 306 (pure oxygen gas 210) from gas source 211 and regulator 212. The "gas in" solenoid 217 is then closed. Alternatively, a low-pressure disposable gas can 220 is tapped into gas line 214 using a gas fill valve fitting 215. On the way to the mixing chamber 120, water 110, 140 passes a second filter 194, a dissolved oxygen sensor 242, and a second temperature sensor 240. Optionally, water 110, 140 may be routed to thermoelectric cooler 252 on the way to the mixing chamber 120, while any resultant heat is vented from the boat 40. All water 110, 140 arrives at the fourth port 132 on the mixing chamber 120 equipped with a bypass such as a T-shaped bypass fitting 195. The controller 280 dictates whether the water 110, 140 goes into the mixing chamber 120 or bypasses and goes to the live well container 102 via tubing 136. Oxygenated or gas-saturated water 140 exits the first port 132 up tubing 136 to travel down the main water fill line 136 to container 102. The water level 111 in the container 102 is maintained via overflow tube 118.

The controller 280 initially establishes baseline data of the water 110 in the live well container 102. Upper and lower maintenance limits may be preset or manually set for dissolved oxygen content, salinity, and temperature based on target depth 36 values before fish 20 are placed in the live well 120. Additionally, as water pump with intake 146/11 is activated, the salinity levels of the live well 120 are compared to outside waters 10. If the outside waters 10 are not within preset limits, the controller 280 shuts off the pump with intake 146/11 to prevent salinity shock. Similarly, differences in outside and inside water temperatures are monitored to prevent thermal shock. The pump with intake 146/11 is typically off except for occasional refills used to add cooler, oxygenated, and/or clean water or for flushing ammonia buildup from the live well 102.

The controller 280 controls the speed of water fill pump 144 to the mixing chamber 120 based upon sensor measurements. Concurrently, if the container 120 temperature is not within limits, the thermoelectric cooler 250 will activate on a parallel branch of the recirculation circuit, cooling (or heating) water 140, 110 back to the mixing chamber 120 and live well 102. When cooling or oxygenating, the cooler water 140, 110 is presented to the mixing chamber 120 first. Cooler water increases oxygen saturation capabilities of the mixing chamber 120.

Common recirculation pump manifold 88 gives live well access via tubing 136 to treat water 110 and/or fish 20 at any stage determined and programmed by the operator (occasionally, continuously, or final clean-up). Various treatments may include pre-treating water, disinfection of fish, stabilization or medical treatment of fish, water chemistry, eliminating parasites or invasive species, disinfection of the live well and support systems, and other processes and treatments. Multiple pumps on the manifold 88 enable multiple devices, including ammonia abatement 80, UV sterilization 82, ozone generation 84, and peristaltic pump 86. These devices are discussed further below.

Sanitizing Systems

Ammonia abatement device 80 may be an "ammonia locker" that absorbs ammonia in recirculating water 110. Alternatively, the ammonia locker may be placed directly in the live well 102. Such an ammonia abatement device 80 may be used to eliminate ammonia poisoning when new water cannot be pumped into the live well or to avoid bringing in new water for other reasons.

An ultraviolet light sterilizer 82 is well suited for unseen, hard to kill organisms. (A zebra mussel flagellate, for example, cannot be seen floating in the live well.) The UV sterilizer 82 is a multi-pass, recirculating system component that destroys the tissue and DNA of invasive species at this level, as well as other living organisms such as viruses and bacteria. The entire live well 102 volume of water 110 is passed thru this sanitizing device several times in an hour. This sanitizer will not kill organism residing on the interior of a live well wall 105. UV light is chemical-free, environmentally friendly, and may be used in tandem with other treatments.

Ozone generators 84 are a well-known sanitizers of air and water 110 that may be used to prevent fish infections from the bacteria and viruses that reside in a typical live well 102. This configuration utilizes the same methodology as typical ozone treatment but provides for more dissolved ozone, as well as more varied amounts, to kill any living organism thru continued exposure. Sanitized live well water 110 may also be used to sanitize surfaces that include the boat 40, bilges, fishing equipment, and trailer.

An in-line peristaltic pump 86 is yet another sanitizing alternative. Any chemical may be dosed with great precision, which is needed when using high concentration chemicals in low-volume live wells 102. Concentrates allow for lower storage volume of corrosive/toxic chemicals. Chlorine is cheap and efficient, and marine organisms are especially sensitive to chlorine even in very small doses. Concurrent use of hyper-saturated oxygen and chlorine in solution will exponentially expand the sanitizing power of both systems. The precise dosing helps prevent residual chlorine in the live well and ensures that excess chemical will not be pumped overboard into the native waters. The system may include a specialized wash down spray pump to allow previously sanitized live well water to be used in a wash down process.

Finally, the present system 100 can produce hyper-oxygenated/heated water by reversing the polarity (DC power) to the thermoelectric cooler 252 and raise oxygenation levels rapidly to ~300%. Highly oxygenated water 140 is a chemical-free sanitizer with power and speed to kill invasive species. Once the day's catch is removed from the live well 102, the mixing chamber 120 can be activated to produce levels of dissolved oxygen beyond anything normally found in nature. This use is not limited to oxygen, but may use other gases 210.

Treatment of Fish

The peristaltic pump 86 may be used to timely and precisely dose fish 20 with stabilizing chemicals to increase post-release survival rates. Various beneficial chemicals can be injected into the live well 102 at strategic times to protect a fish's slime coat, treat damage from hooks, reduce respiration rates and stress, and more. Treatment may vary with species of fish and season and be provided with minimal operator attention.

Alternatively, an ozone generator 84 may output ozone in general solution to sanitize and treat potential infections caused by the hooking, capture, handling, penning, and release of fish. The ozone gas generator 84 may have a dedicated mixing chamber 120 according to previously discussed configurations.

Kayak Live Well

Figure 80:
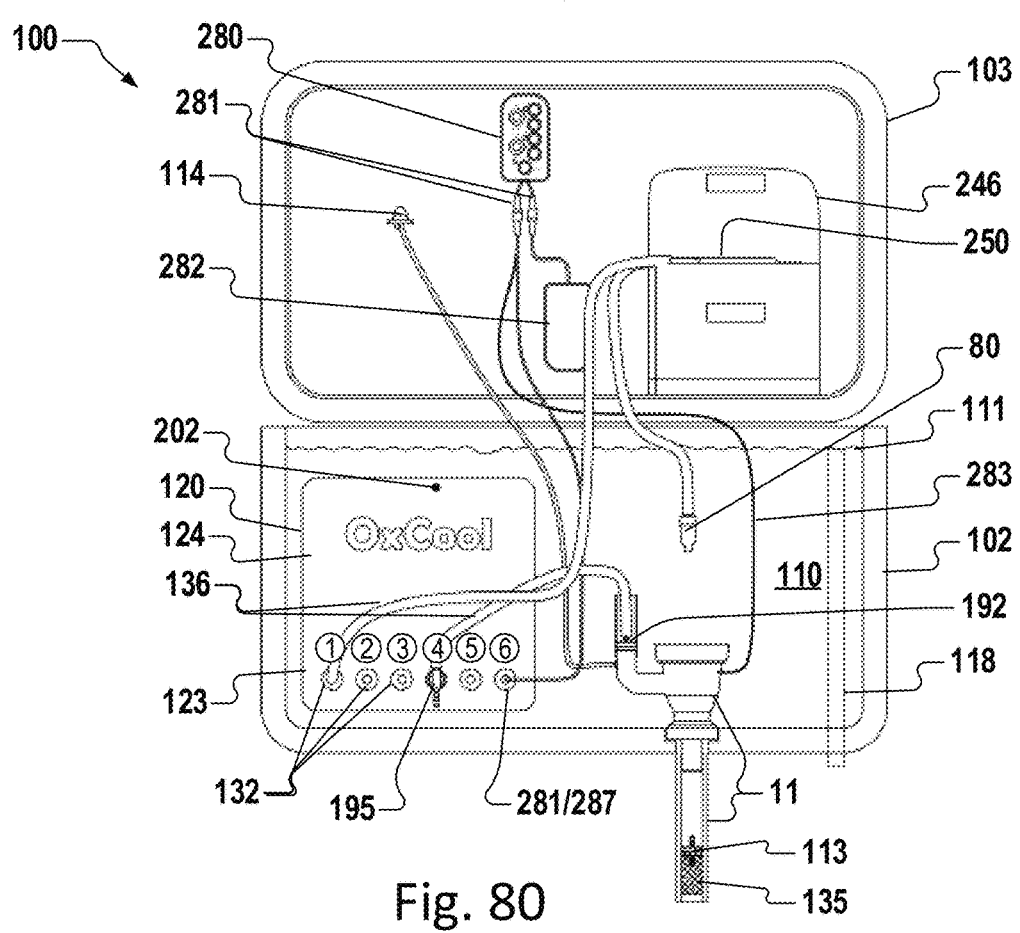
FIG. 80 illustrates a system for dissolving oxygen in water in a kayak.

FIG. 80 illustrates a kayak live well 102 having a volume of about 3-20 gallons. Container 102 having lid 103 has mixing chamber 120 having housing front 124, vent fitting 202, and six ports 123 at a lower portion of the housing 123. (Although a mixing chamber 120 sized as in FIG. 42 may also be used.) Pump primer 114 displaces air in a vertical column in water pump with intake 11 between check valves 192 and 113 to hold a water column and keep the pump 11 primed. Filter 135 protects the pump 11 from debris. Controller 280 activates pump 11 to pull surface water 10 through tubing 136 to the T-shaped bypass fitting 195 at the fourth port 132 on the mixing chamber 120. The controller 280 either lets the incoming water 10 flow into the container 102 to fill the live well 102 or directs the incoming water 10 into the mixing chamber 120 for gas-enrichment and/or cooling. Gas-saturated water 140 may be released out of a port 132 into the container 102. Alternatively, oxygenated water 140 may be pumped out the first port 132 through ice holder 246, heat exchanger 250, and optional ammonia abatement device 80 (when installed in a closed system) in order to introduce cooling to the container 102. Water level 111 is maintained via overflow pipe 118 in a flow-thru system.

A 12 VDC or 6 VDC battery and timer will run the pump 11 full speed to rapidly fill the container 102 and go into a fixed refill on/off cycle every few minutes with zero operator interface. New water 10 is pumped in every few minutes to replenish dissolved oxygen levels and flush out ammonia. The on/off times may be adjusted with controller 280.

Water pump 11 may perform multiple functions and take the place of water fill pump 144 normally located inside the mixing chamber 120, similar to the big boat configurations previously discussed. In a flow-thru system ammonia will never build to toxic levels with reasonable programming because fresh water is brought in at every gas-saturation cycle. The disadvantage is that incoming water 10 makes temperature regulation and water. The better solution is to have independent water fill pump 144 run water 110, 140 across the artificial ice 248/heat exchanger 250 to cool any new, incoming water 10. The advantages of this configuration are that cooling control is possible, fresh water is only brought in to flush ammonia, and less power is used. No incoming water 10 need be allowed if it is undesirable.

Live Wells in Other Transports

Beyond the portable configurations discussed thus far, live wells or containers 102 may be utilized in trucks, shipping containers, and other forms of transport. The previous embodiments may be implemented in mobile applications, benefitting from the efficiency, environmental control, and safety factors of a bubble-less system. Most transport systems like fish trucks utilize a form of oxygen bubbler to provide very high densities of fish with oxygen. These systems suffer the same problems as in smaller live well systems discussed previously. The constant flow of oxygen in a refrigerated vehicle on the road is costly, and the hazards of carrying high pressure tanks of oxygen over the road are well documented. They have an inherent build-up of oxygen within the fish tank air spaces, creating a flash fire hazard. Exposure to heat in the open environment increases the risk of an accidental oxygen fire.

Many of these systems do not provide for CO2/Nitrogen scrubbing of these highly loaded fish tanks, and they have no ability to control fish tank temperatures while in transport or to temper the fish wells to a target temperature at a release site. Many of these systems don't have the ability to automatically chemically pre-treat fish for ammonia toxicity or for release. These issues on a typical fish transport truck are eliminated by the previous novel embodiments.

Other Uses (and Use of Other Gases)

Hydroculture-Aquaponics/Hydroponics—To aid hydroculture in rapid growth of plants, $CO_2$ gasses are pumped into bubblers within large pools of nutrient laden water, often in a closed greenhouse environment. Excess gas escapes as $CO_2$ bubbles break open at the surface of the water, contaminating the air where humans are present. Long term low level exposure can cause harm to humans. Short-term high levels of exposure can cause unconsciousness and death. This gas has no odor and cannot be seen. These systems of $CO_2$ infusion require a constant flow and are a highly inefficient use of a greenhouse gas. The gas is a major cost factor in the practice of aquaponics farming. This embodiment utilizes the previous novel mixing chamber and control systems for aquaponics farmers to dissolve $CO_2$ and other gasses into these nutrient rich waters. This system can be scaled up to be used in aquaponics, but prior art systems are too cumbersome and large to be able to say the reverse.

Aquaculture—Use of the embodiments discussed herein, with their demonstrated efficiencies, would benefit the aquaculture industry. The ability to better utilize oxygen in this industry is a major operational cost factor. The present technology can be scaled upwards to address the needs for better efficiency in this non-portable industry. The reverse cannot be said for the ability to downscale prior art refrigerated oxygen storage tanks and three-phase powered heavy air compressor systems into a portable carry solution.

Waste Processing—The waste processing industry could benefit from the discussed embodiments as the efficient use of oxygen is a major cost factor in this industry. Many municipalities utilize inefficient air/oxygen bubblers to treat sludge, which is difficult to treat at the bottom of the sludge tank. The oxygenation mixer would allow significantly higher oxygenation of sludge at lower sludge levels than the current technology. In practice, allowing a shorter conversion treatment process of the sludge reduces retention times of the treated waste.

Water Treatment—Municipal water treatment facilities often process drinking water for the public from native waters. Increasingly, these waters are contaminated with aquatic invasive species that infect water processing structures. Buildup of these animals on pipe interiors reduces flow rates and efficiencies of these facilities. The embodiments disclosed may be scaled to treat these invasive species without the use of dangerous chemicals or laborious pigging operations.

Swimming Pools—Recreational systems typically use a chlorine sanitizer (whether solid, liquid, or gas) to oxidize bacteria, viruses, molds, fungus, and waste. The cost of chlorine in any form is significant in the overall maintenance of a pool system. Chlorine is toxic and hazardous to transport, store, or apply. Typically, pools that are treated with chlorine must also be treated with muriatic acid or sulfuric acid to maintain pH levels friendly to swimmers. The present invention can dissolve chlorine gas into the pool water, as well as monitor and inject acid and other chemicals to reduce or eliminate human maintenance exposure. To reduce or eliminate cost, low-cost carbon dioxide gas will process easily in the mixing chamber to produce carbonic acid at high rates for sanitization of the pool water. Use of carbonic acid is a self-correcting, stabilizing component in maintaining constant levels of pool chemistry.

Notes from Experimentation

The following discussion details certain of the inventor's findings during development, when oxygen was the gas 210 being dissolved in water 110 for the purpose of preserving fish 20. To prove the process for dissolving gas in water 300, a common glass 5-gallon aquarium 2/102 was used as a test tank with a 6-inch diameter by 10" long, clear plastic mixing chamber 120 to mimic a closed reservoir live well system (CRLW). The container 102 was filled and later topped off with water 110. Trapped ambient air 15 was manually purged. After the mixing chamber 120 was flooded by the venting process 304, the vent 202 was closed.

The mixing chamber 120 was designed to put only appropriate amounts of pure oxygen 210 or gas comprising oxygen into the water 110 without introducing toxic levels of any gas 210. The top 124 of the cylinder 120 was capped air- and water-tight and fitted with an oxygen inlet/outlet fitting 131. A gas line 214 from the oxygen supply 211 was attached to fitting 131, and an additional T fitting 195 tapped into the same line 214 with the valve/vent fitting 202 for purging ambient air 15 (about 21% oxygen/78% nitrogen) from the mixing chamber 120. Gas line 214 was attached to a pressurized oxygen source 211 that was permitted to flow via regulator 6 to displace the water 110 in the mixing chamber until it was about ¼" from the chamber bottom 125. The fill process was visible via the clear plastic housing 122. The gas line 214 could use a one-way or two-way valve to comprise a quick release fitting for the oxygen tank 211. With the gas inlet valve 131 closed the oxygen was retained within the chamber 120 under pressure from the reservoir's water weight. (Mixing chamber 120 efficiency increased with increased reservoir pressure. The deeper the mixing chamber 120 was submersed, the greater the effective pressure on all gas components in the mixing chamber 120.)

The mixing chamber cap 124 also included a water inlet fitting 134 attached by hose 136 to the water fill pump 144 that brought static container water 110 into the mixing chamber 120. If the pump 144 was not mounted below the lowest $O_2$ level in the chamber 120, a check valve would be installed. The water fill pump 144 would flow a volume of water 110 at a specific flow rate into the top of the mixing chamber 120 to partially flood the pure oxygen gas volume 310. The pump 144 added pressure into the mixing chamber 120 and also displaced some of the chamber's water 110, 140 when operating.

In one test, the mixing chamber 120 was vented and primed as above and then filled to 50% volume with pure oxygen 210. The pump 144 was activated, providing a jet stream of water 110 precisely injected inside the center of the mixing chamber 120. The water jet drove hard into the oxygen air space, crashing oxygen bubbles deep into the building water toward the bottom of the chamber 123. The bubbles 13 in the stream of water 110 lost their in-flow energy, their buoyancy overcame the force of the in-flow current, and they returned to the mixing chamber's oxygen/water line 141. This water inflow was repeated in a rapid continuous motion. The pump volume and pressure were regulated to prevent oxygen bubbles 13 from exiting the mixing chamber's bottom port 132. The novel design made rapidly rising larger volume bubbles 13 and prevented finer bubbles 13.

To assist the bubbles' 13 return to the surface 141, a bubble impingement return plate 160' was installed at the end of the bubble stream range of motion. Bubbles struck the impingement device 160' and literally bounced back to the oxygen/water line 141 and broke open, returning the oxygen 210 for reuse. Water fill pump 144 volume/jet pressure was critical to prevent bubble 13 loss outside the chamber 120. A finer bubble capture impingement medium 164 was added to insure that no bubbles 13 escaped the mixing chamber 120 by trapping any stray fine bubble 13 in the medium 164, the bubble 13 eventually releasing back to the mixing chamber water surface 141 for reuse. Bubbles were trapped with 100% success.

In the test tank of 11" depth, the internal mixing chamber pressure was ~2 PSI. Gas-saturated water 140 under pump 144 pressure was displaced from the bottom 123 of the mixing chamber 120 as oxygenated water 140. The rate of saturation was significant. Submersion of the mixing chamber 120 in the water 110, 140 provided for visual leak detection and safety when utilizing oxygen gas 210. Modulation of the mixing chamber's $O_2$/water height/pump pressure and impingement medium 164 allowed configurable DO saturation rates and provided performance adequate for most any live well container 102.

In another test, the goal was to increase the saturation rate and total saturation to meet the challenge of portable live well systems, because running a system for longer than absolutely necessary reduces functional operating times of the system 100. Breaking the process 300 into a much smaller interface between the gas 210 and solution 110 was key to efficiency and was accomplished by breaking the mixing chamber's 120 water flow into ever increasing streams across micro-filaments in a mixing medium 170 suspended in a predominantly oxygen gas 210. Reservoir water 110 was pumped into the top of the mixing chamber 120 and through a distributor 137 that spread the water flow somewhat equally into the mixing medium 170 that further broke down those streams into many thousands of stochastic or random filament streams.

Turbulence in the voids 157 of the mixing medium 170 and fine water streams following the filaments 151 increased the dwell time and exposure to the oxygen gas 210. Very fine flow streams increased the $O_2$ departure time ("wetted surface dwell time") from the mixing chamber 120, increasing the solution's availability for saturation to the oxygen gas 210. "Wetted surface saturation" was a compromise of water volume over an expanded surface area within a given mixing chamber and mixing medium volume. Stated differently, functionality of the medium was dependent upon the size and shape of the mix chamber, which dictated both the O2 volume and water volume. Oxygenation was best achieved with a highly porous medium filling the mixing chamber.

To the inventor's surprise, the water 110 clearly followed the filaments 151 at the walls of the chamber 120 and even wicked water 110 off the chamber wall 122. The water fell downward naturally following the micro filaments until gravity eventual dispensed highly oxygenated water 140 from the bottom of the mixer 123 into the container 102. The medium's 150 ability to retain a volume of water 110, 140 and concurrently allow oxygenated water 140 to flow into the container 102 using pulsed flow control of the mixing chamber 120 was a novel solution to oxygenation. In a closed reservoir system 100, the process 300 was continually repeated until the reservoir water 140, 110 is at a targeted degree of saturation.

A quantity of oxygenated water 140 was retained within the mixing chamber's medium 150, which held the water somewhat like a "sponge." This remaining solution 140 in medium 150 suspension was then 100% available to the oxygen gas 210 for the duration of the "off" time cycle. The wetted medium 150/170 and solution 140, under pressure, quickly reached hyper-saturation levels with no power applied and no user interface. The next manual or timed pump "on" cycle flushed the hyper-saturated solution 140 into the container 102, providing an initial boost of hyper-saturated dissolved oxygen into the container 102 and raising the average dissolved oxygen levels.

The speed of saturation was influenced by many design factors, including the shape and volume of the mixing chamber 120, temperature 34, ambient atmospheric pressure, mixing chamber pressure, type of medium 150, flow rates, fresh or salt water 10, pH, turbidity, total dissolved solids, and water distribution on entry and through the mixing chamber 120, to name a few. For purposes of this specification, "saturation" may refer to degrees approaching 100% saturation (for example, 50%, 60%, 75%, 90%), 100% saturation, and greater than 100% saturation unless otherwise stated. Similarly, "bubble-less" and "bubble-free" may be substantially free of bubbles, and may refer to that status reached after the gas fill is stabilized in the mixing chamber 120 and/or the mixing chamber's gas 210 and water 110 interaction reach equilibrium. Bubble ejection would typically be less than 1% of the total volume of the mixing chamber 120 (water and gas volume once charged and the system 100 is running). Alternatively, "substantially free of bubbles" means that the amount of oxygen released in an oxygenation cycle results in an oxygen concentration in the upper part of the container 102 of no more than 50%. In other words, a small volume of bubbles escaping versus a much larger volume of gas being processed without bubbles may be substantially free of bubbles or even "bubble-free."

The mixing chamber 120 inflow volume showed excellent flow thru characteristics without overwhelming the mixing medium 170 or causing pump backpressure, cavitation, or ejection of $O_2$ gas. Pump 144 flow rates (GPH) of appropriately sized pumps were fitted to mixing chamber's 120 unique requirements. Test results demonstrated that the 5-gallon test container 102 was oxygen-saturated faster than the dissolved oxygen test meter display could settle, overloading the dissolved oxygen meter (>250%) in a 5-gallon tank in <3 minutes, with absolutely zero bubbles 13 escaping into the container 102. The container 102 had a final dissolved oxygen level greater than 250% and retained a dissolved oxygen level of 100% for three days with the water fill pump 144 off.

During a cycling test, the dissolved oxygen level would rise rapidly and stabilize in a short period of time, then rapidly rise to test meter overload. This delay was attributed to the dead flow areas of the 5-gallon tank. In addition to the unique capability to rapidly convert oxygen gas 210 to solution 140, the mixing chamber 120 also concurrently and rapidly stripped $CO_2$ and nitrogen from the solution/container, the mixing medium 170 functioning as the stripping facilitator from water 110, 140 into gases within the chamber 120. The ability to strip toxic gases (to fish) from the container 102 extended the useful life of the container's original water 110, rather than lose previously oxygenated water, temperature control, and balance of pH and salinity adding fresh water 10.

There are major benefits to a pump performing its job quickly and efficiently, which equates to money saved in energy consumed, wear and tear on the pumps, and their replacement lifecycle. In many portable applications, the energy capacity to run a pump can be limited, as in battery-driven pumps. The fast rate of oxygenation in the present invention will have many benefits. The present invention utilizes a single $O_2$ charge to dissolve oxygen 210 into incredibly large volumes of water 110.

SUMMARY

In general, a system for dissolving gasses in water held in a container comprises a mixing chamber configured to hold a volume of gas (and may be pressurized by the water held in the container), a gas delivery system in communication with the mixing chamber to introduce the volume of gas into the mixing chamber through a gas inlet, a pump configured to pump a volume of water to the mixing chamber, a water inlet configured to introduce the water into the mixing chamber and through the gas in the mixing chamber to dissolve the gas and produce 60% or greater saturation of the water with the gas, and an outlet configured to release gas-saturated water that is substantially free of bubbles (for example, less than 1% after equilibrium is reached) from the mixing chamber into the container. The pump is configured to be mounted at or below the lowest level of the gas in the mixing chamber, and the gas is any water-soluble pure gas or combination of water-soluble gases, including oxygen, carbon dioxide, nitrogen, and/or chlorine, and/or including ambient air.

The mixing chamber, which may be mounted inside or outside of the container, may have an impingement plate and/or medium, wherein the water inlet is configured to emit water toward the impingement medium. The impingement plate and/or medium may be configured to trap gas bubbles and hold gas-saturated water within the mixing chamber. The pump and mixing chamber are configured to discharge some of the trapped gas-saturated water into the container upon the next use of the pump. The mixing chamber may further comprise a mixing medium, such that water is distributed through the volume of gas in the mixing medium. The mixing medium comprises a porous multi-strand matrix configured to generate turbulent circulation as the pumped water streams among and over the surfaces of the strands. A distributor is configured to direct water from the water inlet toward the mixing medium.

The system may have a power connector, an electronic controller, a dissolved oxygen sensor, and a temperature control system and be configured to simulate aquatic life environments and to make the gas more soluble. The system may include the container, which may be a live well built into a transport or be a bucket, cooler, chest, bag, or other container that is portable by hand or cart. The container may have a fluid-tight lid that can be opened without contact with pure gas, and a bung plug may be configured to carry plumbing and electrical lines through the wall of the container. The system may also include the gas and/or an adapter configured to deliver the gas from a low-volume, low-pressure gas source to the mixing chamber without use of a regulator.

In general, a method of dissolving gasses in water held in a container comprises providing a mixing chamber configured to hold a volume of gas and to be pressurized by the water held in the container, flooding the mixing chamber with water and venting ambient air from the mixing chamber, introducing the volume of gas into the mixing chamber via a gas delivery system in communication with the mixing chamber, pumping a volume of water through an inlet configured to introduce the water into the mixing chamber and through the gas in the mixing chamber, to generate turbulent circulation, and to dissolve the gas and produce 60% or greater saturation of the water with the gas, and releasing gas-saturated water through an outlet configured to release gas-saturated water that is substantially free of bubbles from the mixing chamber into the container.

The method may include providing the container (which may be a live well built into a transport or be a bucket, cooler, chest, bag, or other container that is portable by hand or cart), providing a medium that is a porous multi-strand matrix configured to be located inside the mixing chamber, configuring the multi-strand matrix to strip nitrogen and carbon dioxide from the water while simultaneously infusing oxygen, providing a power connector and an electronic controller, and/or providing a temperature control system and configuring the controller to simulate aquatic life environments and to make the gas more soluble. Dissolving the gas may produce, for example, 90%, 100%, or greater saturation of the water with the gas, with hyper-saturation to about 300%.

It will be understood that many modifications could be made to the embodiments disclosed herein without departing from the spirit of the invention. Having thus described exemplary embodiments of the present invention, it should be noted that the disclosures contained in the drawings are exemplary only, and that various other alternatives, adaptations, and modifications may be made within the scope of the present invention. Accordingly, the present invention is not limited to the specific embodiments illustrated herein, but is limited only by the following claims.

I claim:

1. A system for dissolving gasses in water held in a container, the system comprising:
 (a) a mixing chamber configured to hold gas and arranged in relation to the container so that the water in the container pressurizes the gas held in the mixing chamber;
 (b) a gas delivery system in communication with the mixing chamber to introduce the gas into the mixing chamber through a gas inlet;
 (c) a pump configured to pump water to the mixing chamber;
 (d) a water inlet configured to introduce the water into the mixing chamber and through the gas in the mixing chamber; and
 (e) an impingement plate and/or medium facing the water inlet; and
 (f) an outlet configured to release gas-saturated water that is substantially free of bubbles from the mixing chamber into the container.

2. The system of claim 1, wherein the impingement plate and/or medium is configured to bounce bubbles toward a surface of the water in the mixing chamber.

3. The system of claim 1, wherein the impingement plate and/or medium is configured to trap gas bubbles within the mixing chamber and comprises a plurality of apertures that allow bubble-free gas-saturated water to migrate outside of the mixing chamber and into the container.

4. The system of claim 1, wherein the mixing chamber is configured to be mounted outside of the container.

5. The system of claim 1, further comprising an adapter configured to deliver the gas from a low-volume, low-pressure gas source to the mixing chamber without use of a regulator.

6. The system of claim 1, wherein the system includes the container, and the container is a bucket, cooler, chest, bag, or other container that is portable by hand or cart.

7. The system of claim 1, wherein the system includes the container, and the container is a live well built into a transport.

8. The system of claim 3, wherein the pump and mixing chamber are configured to discharge some of the trapped gas-saturated water into the container upon the next use of the pump.

9. A system for dissolving gasses in water held in a container, the system comprising:
   (a) a mixing chamber comprising a mixing medium and configured to hold gas and arranged in relation to the container so that the water in the container pressurizes the gas held in the mixing chamber;
   (b) a gas delivery system in communication with the mixing chamber to introduce the gas into the mixing chamber through a gas inlet;
   (c) a pump configured to pump water to the mixing chamber;
   (d) a water inlet configured to introduce the water into the mixing chamber and through the gas in the mixing chamber, wherein water is distributed through the gas in the mixing medium; and
   (e) an outlet configured to release gas-saturated water that is substantially free of bubbles from the mixing chamber into the container.

10. The system of claim 9, wherein the mixing medium comprises a porous multi-strand matrix configured to generate turbulent circulation as the pumped water streams among and over the surfaces of the strands.

11. The system of claim 9, the mixing chamber further comprising a distributor configured to direct water from the water inlet toward the mixing medium.

12. A system for dissolving gasses in water held in a container, the system comprising:
   (a) a mixing chamber configured to hold gas and arranged in relation to the container so that the water in the container pressurizes the gas held in the mixing chamber;
   (b) a gas delivery system in communication with the mixing chamber to introduce the gas into the mixing chamber through a gas inlet;
   (c) a pump configured to pump water to the mixing chamber;
   (d) a water inlet configured to introduce the water into the mixing chamber and through the gas in the mixing chamber;
   (e) an outlet configured to release gas-saturated water that is substantially free of bubbles from the mixing chamber into the container; and
   (f) a power connector and an electronic controller.

13. The system of claim 12, further comprising a temperature control system and configured to simulate aquatic life environments and to make the gas more soluble.

14. A system for dissolving gasses in water held in a container, the system comprising:
   (a) a mixing chamber configured to hold gas and arranged in relation to the container so that the water in the container pressurizes the gas held in the mixing chamber;
   (b) a gas delivery system in communication with the mixing chamber to introduce the gas into the mixing chamber through a gas inlet;
   (c) a pump configured to pump water to the mixing chamber, wherein the pump is configured to be mounted at or below the lowest level of the gas in the mixing chamber;
   (d) a water inlet configured to introduce the water into the mixing chamber and through the gas in the mixing chamber; and
   (e) an outlet configured to release gas-saturated water that is substantially free of bubbles from the mixing chamber into the container.

15. A system for fostering aquatic life, the system comprising:
   (a) a container configured to hold water;
   (b) a mixing chamber comprising a medium that is a porous multi-strand matrix and configured to hold water-soluble gas and to be pressurized by the water held in the container;
   (c) a gas delivery system in communication with the mixing chamber to introduce the gas into the mixing chamber through a gas inlet;
   (d) a pump configured to pump water to the mixing chamber;
   (e) a water inlet configured to introduce the water into the mixing chamber and through the gas in the mixing chamber, to generate turbulent circulation as the pumped water streams among and over the strands; and
   (f) an outlet configured to release gas-saturated water that is substantially free of bubbles from the mixing chamber into the container.

16. The system of claim 15, the mixing chamber further comprising a distributor configured to direct water from the water inlet toward the mixing medium.

17. The system of claim 15, further comprising a power connector, a controller, a temperature control system, and a dissolved oxygen sensor.

18. The system of claim 17, wherein the temperature control system comprises artificial ice or a thermoelectric cooler.

19. The system of claim 15, wherein the mixing chamber is configured to be mounted outside of the container.

20. The system of claim 15, further comprising an adapter configured to deliver the gas from a low-volume, low-pressure gas source to the mixing chamber without use of a regulator.

21. The system of claim 15, wherein the container is a bucket, cooler, chest, bag, or other container that is portable by hand or cart.

22. The system of claim 15, wherein the container is a live well built into a transport.

23. The system of claim 15, the container further comprising a bung plug configured to carry plumbing and electrical lines through the wall of the container.

24. The system of claim 15, further comprising a fluid-tight lid on the container that may be opened without contact with pure gas.

25. A method of dissolving gasses in water held in a container, the method comprising:
   (a) providing a mixing chamber configured to hold gas and to be pressurized by the water held in the container;

(b) flooding the mixing chamber with water and venting ambient air from the mixing chamber;
(c) introducing the gas into the mixing chamber via a gas delivery system in communication with the mixing chamber;
(d) pumping water through an inlet configured to introduce the water into the mixing chamber and through the gas in the mixing chamber, to generate turbulent circulation, and to dissolve the gas and produce 60% or greater saturation of the water with the gas; and
(e) releasing gas-saturated water through an outlet configured to release gas-saturated water that is substantially free of bubbles from the mixing chamber into the container.

26. The method of claim 25, wherein the method includes providing the container, and the container is a bucket, cooler, chest, bag, or other container that is portable by hand or cart.

27. The method of claim 25, wherein the method includes providing the container, and the container is a live well built into a transport.

28. The method of claim 25, further comprising providing a medium that is a porous multi-strand matrix configured to be located inside the mixing chamber.

29. The method of claim 28, further comprising configuring the multi-strand matrix to strip nitrogen and carbon dioxide from the water while simultaneously infusing oxygen.

30. The method of claim 25, wherein dissolving the gas produces 100% or greater saturation of the water with the gas.

31. The method of claim 25, further comprising providing a power connector and an electronic controller.

32. The method of claim 29, further comprising providing a temperature control system and configuring the controller to simulate aquatic life environments and to make the gas more soluble.

* * * * *